(12) United States Patent
Mitsuishi et al.

(10) Patent No.: US 6,385,608 B1
(45) Date of Patent: May 7, 2002

(54) METHOD AND APPARATUS FOR DISCOVERING ASSOCIATION RULES

(75) Inventors: Akitoshi Mitsuishi; Yasushi Obata, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/186,356

(22) Filed: Nov. 5, 1998

(30) Foreign Application Priority Data

| Nov. 11, 1997 | (JP) | ............................................. 9-308445 |
| Mar. 13, 1998 | (JP) | ........................................ 10-063413 |
| Jun. 29, 1998 | (JP) | ........................................ 10-182416 |

(51) Int. Cl.[7] .............................................. G06F 17/30
(52) U.S. Cl. ................................. 707/6; 707/5; 706/47
(58) Field of Search ................................ 707/1–3, 5–6; 706/47; 705/10

(56) References Cited

U.S. PATENT DOCUMENTS

| 5,615,341 A | * | 3/1997 | Agrawal et al. ............... 705/10 |
| 5,724,573 A | * | 3/1998 | Agrawal et al. ............... 707/6 |
| 5,742,811 A | * | 4/1998 | Agrawal et al. ............... 707/6 |
| 5,794,209 A | * | 8/1998 | Agrawal et al. ............... 705/10 |
| 5,812,997 A | * | 9/1998 | Morimoto et al. ............. 707/2 |
| 5,819,266 A | * | 10/1998 | Agrawal et al. ............... 707/6 |
| 5,842,200 A | * | 11/1998 | Agrawal et al. ............... 707/1 |
| 5,884,305 A | * | 3/1999 | Kleinberg et al. ............. 707/6 |
| 5,920,855 A | * | 7/1999 | Aggarwal et al. ............. 707/3 |
| 5,933,821 A | * | 8/1999 | Matsumoto et al. ........... 707/1 |
| 5,983,222 A | * | 11/1999 | Morimoto et al. ............. 707/6 |
| 5,991,752 A | * | 11/1999 | Fukuda et al. ................. 707/1 |
| 6,023,571 A | * | 2/2000 | Matsumoto et al. ........... 703/2 |
| 6,061,682 A | * | 5/2000 | Agrawal et al. ............... 707/6 |
| 6,092,064 A | * | 7/2000 | Aggarwal et al. ............. 707/6 |
| 6,094,645 A | * | 7/2000 | Aggarwal et al. ............. 706/47 |
| 6,138,117 A | * | 10/2000 | Bayardo ........................ 707/6 |

FOREIGN PATENT DOCUMENTS

JP   08 287106 A   11/1996

OTHER PUBLICATIONS

Savasere et al. "Mining for Strong Negative Associations in a Large Database of Customer Transactions", Proceedings of the 14th International Conference on Data Engineering, Feb. 23–27, 1998, pp. 494–502.*

Srikant, R. and Agrawal, R. "Mining Generalized Association Rules", Proceedings of the 21st VLDB Conference, 1995, pp. 1–13.*

Savasere, A. et al. "Mining for Strong Negative Associations in a Large Database of Customer Transactions", Proceedings of the 14th International Conference on Data Engineering, Feb. 23–27, 1998, pp. 494–502.*

(List continued on next page.)

Primary Examiner—Jean R. Homere
Assistant Examiner—Luke S Wassum

(57) ABSTRACT

A candidate-itemset generating unit generates a candidate-itemset composed of at least one candidate item to be included in the left hand side or the right hand side of the association rule. A candidate-itemset verifying unit selects itemsets having frequencies (appearing times in the database) more than the minimum frequency out of the candidate-itemsets, as large-itemsets. A candidate rule generating unit generates candidate association rules based on a large-itemset of k–1 long and a large-itemset of 1 long. A chi-square testing unit generates an association rule set based on the candidate association rules by performing a chi-square test in which a $\chi^2$ statistics and a significant level are used as parameters.

18 Claims, 56 Drawing Sheets

OTHER PUBLICATIONS

Gunopulos, D. et al. "Data Mining, Hypergraph Transversals, and Machine Learning—Extended Abstract", Proceedings of the 16th ACM SIGACT–SIGMOD–SIGART Symposium on Principles of Database Systems, May 11–15, 1997, pp. 209–216.*

Yen, S–J., and Chen, A. "An Efficient Data Mining Technique for Discovering Interesting Association Rules", Proceedings of the 8th International Workshop on Database and Expert Systems Applications, Sep. 1–2, 1997, pp. 664–669.*

Srikant, R. and Agrawal, R. "Mining Quantitative Association Rules in Large Relational Tables", Proceedings of the 1996 ACM SIGMOD International Conference on Management of Data, Jun. 3–6, 1996, pp. 1–12.*

Agrawal, R. et al. "Mining Association Rules between Sets of Items in Large Databases", Proceedings of the 1993 ACM SIGMOD International Conference on Management of Data, May 25–28, 1993, pp. 207–216.*

Aho, A. et al. "Data Structures and Algorithms", Reading:Addison–Wesley, 1983, pp. 189–194. QA76.9.D35A38 1982.*

Savasere et al. "Mining for Strong Negative Associations in a Large Database of Customer Transactions", Proceedings of the 14th International Conference on Data Engineering, Feb. 23–27, 1998, pp. 494–502.*

Srikant, R. and Agrawal, R. "Mining Generalized Association Rules", Proceedings of the $21^{st}$ VLDB Conference, 1995, pp. 1–13.*

Agrawal, et al., "Fast Algorithms For Mining Assoication Rules", IBM Research Report RJ9839, Jun. 1994.

The Institute of Electronics, Information and Communication Engineers, Technical Report of IEICE., DE95–6 (1995–05), Takeshi Fukuda et al. Tokyo Research Laboratory, IBM Japan Ltd. p. 41.

IBM Almaden Research Center, Ramakrishnan Srikant et al., pp. 1–13, Proceedings of the $21^{st}$ VLDB Conference Zurich, Swizerland.

IBM Almaden Research Center, Rakesh Agrawal et al., pp. 487–499, Proceedings of the $20^{th}$ VLDB Conference Santiago, Chile, 1994.

* cited by examiner

BEFORE PRUNING

AFTER PRUNING

BEFORE DIVIDING

AFTER DIVIDING

Fig. 33 RELATED ART

| Record ID | Items |
|-----------|-------|
| 1 | 1, 3, 5, 7 |
| 2 | 2, 3 |
| 3 | 1, 2, 3, 7, 8 |
| 4 | 4, 6 |
| 5 | 5, 7, 8, |
| ... | ...... |

BEFORE PRUNING

AFTER PRUNING

WHOLE HASH-TREE

DIVIDED HASH-TREE (a) FIRST PARTIAL TREE (b) SECOND PARTIAL TREE (c) THIRD PARTIAL TREE

Fig. 41
(1) PARTIAL TREE OF LARGE ITEMSET (LENGTH 2=L2)
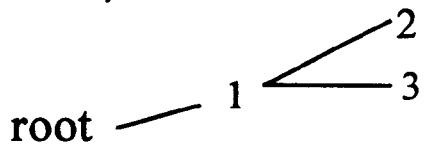
(2) L2→C3
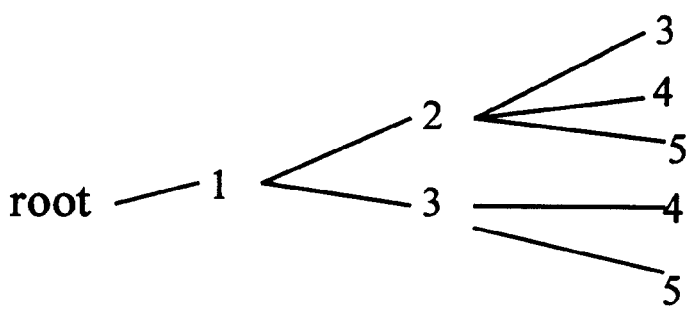
(3) C3→L3
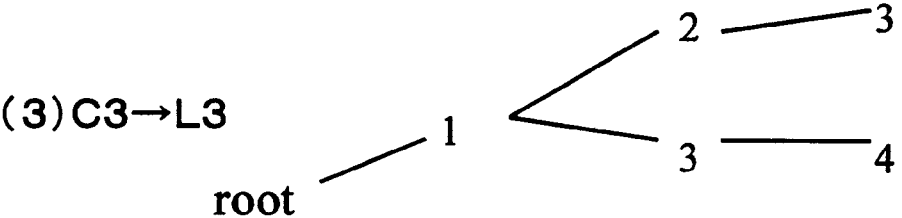
(4) PARTIAL TREE IN GENERATING RULE
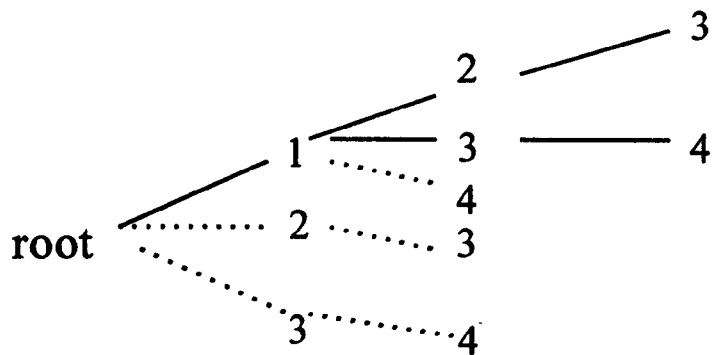

Fig. 44

LARGE ITEMSET FILE

| | |
|---|---|
| 1,2 | f=10 |
| 1,3 | f=10 |
| 1,4 | f=23 |
| 2,3 | f=13 |
| 2,4 | f=15 |
| 3,4 | f=12 |
| ... | |

READ POSITION (between 1,3 and 1,4)

HASH-TREE STORING WHOLE LARGE ITEMSETS

EMBODIMENT 21 CASE

EMBODIMENT 22 CASE

Fig. 51

| Record ID | Items |
|---|---|
| 1 | 1, 3, 5, 7 |
| 2 | 2, 3 |
| 3 | 1, 2, 3, 7, 8 |
| 4 | 4, 6 |
| 5 | 5, 7, 8, |
| ... | ....... |

BEFORE PRUNING

AFTER PRUNING

METHOD AND APPARATUS FOR DISCOVERING ASSOCIATION RULES

BACKGROUND OF THE INVENTION

1. Field of the Invention

The present invention relates to a data processing system, especially to a hash-tree operation performed in mining data for discovering unknown rules in databases and in calculating algorithm for the data mining.

2. Description of the Related Art

It is known well that there are association rules in knowledge obtained by data mining for a large database. The association rules usually relate to sets of items often appearing in the same record. The rules are typically utilized for marketing strategies in retail sales. For example, an association rule is discovered by analyzing customer purchase records or accumulated sales receipt data in order to find a purchase tendency. Based on the purchase tendency, things or services bought at the same time can be known, which helps to develop sales and implement marketing strategies. The "record" in this specification means a list of items bought by a customer.

As a method of discovering an association rule in database relating to itemsets in a record, an algorithm called "Apriori" by R. Agrawal et al. is disclosed in the article, "Fast Algorithms for Mining Association Rules" (Proc. of 20th VLDB, 1994) and in Unexamined Japanese Patent Publication 8-287106 (Priority is claimed in U.S. Priority Number; 415006, Priority Date: Mar. 31, 1995).

In "Apriori", two indexes "support" and "confidence" are used as a criterion for discovering an association rule. However, we herein use another criterion "frequency" instead of the "support" to explain "Apriori" in view of our present invention.

An example of association rule will be described. When there are two itemsets [A, B, ..., X] and [Y], the association rule between the itemsets is expressed by the form

A, B, ..., X→Y where the number of records including all of A, B, ..., X, Y is called a frequency of the rule and a ratio of records including A, B, ..., X, Y to the records including A, B, ..., X is called a confidence.

In the "Apriori", an association rule having a frequency and a confidence respectively greater than a predefined lowest value (minimum frequency and minimum confidence) is selected.

By implementing an association rule discovering system shown in FIGS. 30 and 31, the "Apriori" can be realized. Now, the procedure of this method is explained with reference to FIG. 31, using database of FIG. 33 to simply explain the association rule discovering. Each record in the database of FIG. 33 has a record ID and includes items expressed by integers equal to or more than 1.

An itemset having k items is called a k-itemset. (k is an integer equal to or more than 2.) A set of k-itemsets whose frequencies are equal to or more than a minimum frequency is called a large-itemset Lk having length k. A set of k-itemsets potentially to be elements of the large-itemset Lk is called a candidate-itemset Ck having length k. Namely, k-itemsets, whose frequencies are equal to or more than the minimum frequency, in Ck are selected to be elements of Lk.

At a user input step 100 in FIG. 31, a minimum frequency and a minimum confidence are obtained from the user through a user input unit 10. At an L1 generating step 110, a candidate itemset verifying unit 21 selects a record from a database 1 one by one, counts appearing times of each item in the record, and increases a counting number (frequency) of the item. If a new item appears, a counting area for the new item is newly provided. After all the items in all the records have been counted, only items each of which has a total counted frequency more than the minimum frequency are registered in a hash-tree.

FIG. 34 shows the case that each frequency of five items, 1, 2, 3, 4, and 5 is more than the minimum frequency and the five items have been registered in the hash-tree. Both ends of each branch of the hash-tree are called nodes and generally item numbers are correspondingly assigned to the nodes. At the beginning end of the hash-tree, no item number is assigned to the node, which is called a root. The number of branches, from the root to the last node, is called a branch length. Therefore, each branch length in FIG. 34 is 1.

At a Ck generating step 120, a candidate-itemset Ck is generated from a large-itemset Lk−1 having length k−1 by a candidate-itemset generating unit 22. In the initial state shown in FIG. 34, k equals 2 and C2 is generated from L1.

Now, the case of C3 being generated from L2 will be explained. FIG. 35 illustrates a hash-tree made up to the state of L2. The detail of the Ck generating step of FIG. 31 is shown in a block diagram of FIG. 32 having two-step procedures: a join step 121 and a prune step 122.

Referring to FIGS. 35 and 36A, the join step 121 is described with reference to a node (called an original node here) at a branch end of k−1 long. New branches are extended in order to make child nodes for the original node. The child nodes should have item numbers larger than the item number assigned to the original node out of item numbers assigned to other nodes having the same parent node as the original node. For instance, the node shown as root→1→3 in FIG. 35 is expressed by [1, 3]. (This expression is used hereinafter for representing a node in the hash-tree). With respect to the node [1,3], nodes [1,4] and [1,5], which have the same parent node as the node [1,3] and whose item numbers 4 and 5 are larger than 3, are joined to the node [1,3] to be [1,3,4] and [1,3,5]. With respect to the node [1,4], the node [1,5] is joined to be [1,4,5]. No new branch is extended for the node [1,5] because there is no larger item number than 5 for [1]. The above procedure is illustrated in FIG. 36A as a state before pruning.

The prune step 122 will now be explained. A branch indicating an itemset, whose length is extended to k, has been made at the join step 121. Then, every (k−1)-itemset, made by deleting one item from the k-itemset, is checked whether the (k−1)-itemset is included in Lk−1 or not. Only when all the (k−1)-itemsets are included in Lk−1, the k-itemset is left to be utilized. If there is at least one (k−1)-itemset which is not included in Lk−1, the k-itemset is deleted.

For instance, in the case of checking [1,3,4], three 2-itemsets [1,3], [1,4], and [3,4] are checked to be in L2 or not. Referring to FIG. 36A, as all of these three itemsets are included in L2, [1,3,4] is left. In the case of checking [1,3,5], three 2-itemsets [1,3], [1,4], and [3,4] and [3,5] are checked to be in L2 or not. Since [3,5] does not exist in L2, [1,3,5] is deleted.

All the k-itemsets made in the join step 121 are checked at the prune step 122. A hash-tree after the pruning is shown in FIG. 36B.

After the Ck generating step 120, an Lk generating step 130 is performed by the candidate-itemset verifying unit 21. In the Lk generating step 130, a record is selected from the database one by one to count the number of k-itemsets in Ck. Then, only k-itemsets whose frequencies are more than the minimum frequency are left to be elements of Lk. Matching is performed between the record and the hash-tree in counting the number of k-itemsets.

Now, the matching will be explained. First, a record is selected from the database one by one, and checking is performed for the selected record along the hash-tree from the root. Then, it is checked whether an item corresponding to a child node of the root exists in the record or not. If such an item does not exist in the record, the matching for the record is finished to check the next record. When such an item exists in the record, it is checked whether an item corresponding to a next child node (grandchild node of the root) exists in the record or not.

This operation is repeatedly performed. If a child node does not have any branch at its lower level in the hash-tree, such a child node is called a leaf. In checking a record, when a node's child node is a leaf and an item corresponding to the leaf exists in the record, the frequency counting for the leaf node is increased, which means that the matching for the record is completed. At the time of all the matching procedures having been completed for every record, the frequency count value for each leaf node represents the frequency of each k-itemset (an itemset from the root to the leaf node).

As stated above, the frequency of each k-itemset is counted, and then a large-itemset Lk is generated by selecting k-itemsets having frequencies more than the minimum frequency as the elements of the large-itemset Lk.

If, at the Lk generating step, no k-itemset is selected to be an element of Lk, it goes to a candidate rule generating step 150. The candidate rule means a rule having a possibility to be defined as an association rule. When there is a k-itemset to be included Lk, one is added to k and it goes back to the Ck generating step 120.

At the candidate rule generating step 150, a candidate rule generating unit 41 generates a candidate for the association rule from the large-itemsets generated through the previous steps. Accordingly, k candidate rules are generated from a k-itemset in Lk. In the right hand side (RHS) of the k candidate rules, an item out of items in k-itemset is described. In the left hand side (LHS) of the k candidate rules, k−1 items made by deleting the item in RHS from the items in k-itemset are described. This candidate rule generating process is performed for all the k-itemsets in Lk in the case of k>=2.

The RHS indicates an itemset to be a conclusion of the association rule and the LHS indicates itemsets to be conditions of the association rule. The definition of the RHS and LHS is also applied to the candidate association rules.

At a rule testing step 160, a confidence calculating unit 42 calculates a confidence of each candidate rule. When the confidence of a candidate rule is larger than the minimum confidence, the candidate rule is added to an association rule set. As stated above, the confidence of the candidate rule A1, A2, . . . , Ak→B is calculated by the following expression:

confidence=s(A1,A2, . . . ,Ak,B)/s(A1,A2, . . . ,Ak)

where s (θ) is frequency of itemset θ.

Another related art is disclosed by R. Srikant et al. as an improved art of Apriori, which is entitled "Mining Generalized Association Rules", in Proceedings of the 21$^{st}$ VLDB Conference, 1995. The following procedures are described in this improved art:

(1) obtaining an association rule using Apriori
(2) eliminate statistically meaningless rules out of the association rules obtained at (1), by using a chi-square test. Consequently, an association rule whose confidence is larger than a minimum confidence and also which has statistical meaning can be selected.

The operation of hash-tree storing itemsets is very significant for the algorithm used in discovering association rules. When the number of itemsets is large, it may happen that the hash-tree is too large to be included in the computer memory. In such a state of too many itemset kinds, paging of hash-tree node data happens at the time of matching between the record and the hash-tree, which enormously decreases data processing speed.

In calculating frequencies at the Lk generating step, a record is selected from the database one by one to perform matching between each record and the hash-tree. The matching process between a record and the hash-tree, which is performed by recursively utilizing a matching function, will now be explained.

As shown in FIG. 56, a hash-tree node and a partial sequence (p) of a record are used as parameters of the matching function. When the matching function is firstly utilized, a root is used as the node and a record is used as the partial sequence. The partial sequence is a set of some items located at and after a specific position in the record. For instance, {2,3 } is the partial sequence at and after the second item in the record of {1,2,3}.

FIG. 56 is a block diagram showing a conventional matching function. At a step 2100, it is checked whether or not an input hash-tree node is an end of a branch having a leaf node at the other end, in other words it is checked whether or not the input hash-tree node is one level upper than the leaf node.

If the input hash-tree node is not one level upper than the leaf node, at a step 2110, a hash function is applied to the first item (i) of a partial sequence in order to examine whether a node corresponding to the item i (nodei) exists in the lower level or not. When the corresponding node (nodei) exists in the lower level, a matching function where the node (nodei) and another partial sequence made by deleting the node item (i) from the original partial sequence (p) are used as parameters is recursively utilized at a step 2120. The original partial sequence (p) is updated by deleting the item (i) corresponding to the node from the original partial sequence at a step 2130. If the corresponding node (nodei) does not exist in the lower level at the step 2110, only the partial sequence is updated at the step 2130 without recursively utilizing the matching function.

The process from the step 2110 to 2130 is repeatedly performed until it is judged at a step 2140 that all the items in the original partial sequence have been deleted, meaning no item exists in the partial sequence (p).

When the node input at the step 2100 is one level upper than a leaf node, the hash function is applied to each item (i) in the parameter partial sequence (p), at a step 2150. Then, if the corresponding leaf node (nodei) exists, the frequency of the leaf node is increased by one.

FIG. 57 shows the case that the matching function is applied to the hash-tree root and a partial sequence {1,2,3} of a record {1,2,3}. As the height of the hash-tree is 2, the matching function is recursively utilized.

[1] exists at the lower level of the root. After the steps 2100 and 2110, the matching function where the node [1] and the partial sequence {2,3} are used as parameters is recursively utilized at the step 2120. The partial sequence {1,2,3} is updated to {2,3} at the step 2130. Similarly, at the step 2120, after the steps 2100 and 2110, the matching function where the node [2] and the partial sequence {3} are used as parameters is recursively utilized. At the step 2130, the partial sequence {2,3} is updated to {3}. Then, at the step 2120, after the steps 2100 and 2110, the matching function where the node [3] and the partial sequence { } are used as parameters is recursively utilized. At the step 2130, the partial sequence {3} is updated to { }. As no item exists in the partial sequence at the step 2140, the loop process is finished.

The operation of the matching function where the node [1] and the partial sequence {2,3} are used will now be explained. This node is judged to be one level upper than a leaf node, at the step 2100. Then, at the step 2150, the hash function is applied to each of items 2 and 3 in the partial sequence. At a step 2160, it is checked whether there are branches to nodes [1,2] and [1,3] or not, and it goes to the next step as there are branches. At a step 2170, each frequency of the nodes [1,2] and [1,3] is increased by one. Similarly, when the matching function of the node [2] and the partial sequence {3}, which is recursively utilized, is used, the frequency of the node [2,3] is increased by one. When the matching function of the node [3] and the partial sequence { } is utilized, the process is finished without increasing the frequency.

In the conventional art, candidates for the association rules are generated based on large-itemsets having frequencies more than the minimum frequency. Therefore, if a large-itemset has a both sides (BS) frequency, meaning a frequency of itemset made of all the items in RHS and LHS, less than a minimum frequency, it is impossible to obtain an association rule for the case. Namely, a negative association rule showing a tendency, for instance, that an item and another item rarely appear in the same record, can not be obtained.

Negative association rules sometimes show, depending upon databases, as significant information as positive association rules. For instance, the following, information can be obtained by negative association rules: the information, based on machine maintenance data, that machines given treatment A seldom have failure B, and the information, based on product manufacturing data, that products made of material C seldom have defect D. Since BS frequencies of negative association rules are very low, it is impossible to obtain the negative association rules by using only large-itemsets. Conventionally, an association rule in the case of frequencies of RHS and LHS being more than a minimum frequency but a frequency of BS being less than the minimum frequency can not be obtained, even if the association rule has a statistical significance.

The conventional art "Apriori" discovers association rules based on a criterion "minimum confidence" and sometimes discovers rules statistically useless. Namely, association rules by Apriori do not have good quality. In another conventional art by Mr. Srikant, rules statistically useless are removed out of conclusions obtained by Apriori, by performing a chi-square test, which needs more processes than Apriori. In addition, some rules, which are to be statistically significant and to be judged being significant by the chi-square test, are not discovered because their confidences are lower than minimum confidence.

In the conventional art, it is impossible to effectively and respectively discover a positive association rule and a negative association rule.

In the conventional art, it is impossible to effectively obtain association rules because users are needed to input a minimum frequency and the tests are may be performed even for candidate rules having useless frequencies.

In the conventional art, there is no means for effectively appointing candidate items to be included in RHS or LHS of an association rule. For instance, the rule, in which 2 or 4 is included in RHS and 1 or 3 is included in LHS, can not be appointed. Therefore, the needed association rule is obtained only after all the steps being completed, which contains many useless processes.

In the conventional art, there is no means for effectively appointing items to be certainly included in RHS and LHS of an association rule. For instance, the rule, in which 1 and 4 are certainly included in RHS and 2 is certainly included in LHS, can not be appointed. Therefore, the needed association rule is obtained only after all the steps being completed, which contains many useless processes.

In the conventional art, it is impossible to restrict a domain in the database for obtaining association rules. For instance, there is no obtaining rules with restricting records, each of which includes an item 3.

In the conventional art, numbers such as integers corresponding to items are assigned regardless of frequencies of the items in the database. Therefore, a hash-table size at each hash-tree node is indefinite, which makes the hash function complicated.

In the conventional art, the matching between each record and a hash-tree is performed for all the combinations of items in the record with the hash-tree. Therefore, when the record is long, matching efficiency is extremely deteriorated.

In the conventional art, there is no means for effectively treating with the request that, for instance, 2 and 4 should not appear at the same time in association rules. Therefore, such requested association rules can be obtained by deleting non-requested association rules (rules including 2 and 4 at the same time, in this case) only after all the steps having been completed, which contains many useless processes. Now, an example of the reason for the above being requested will be explained. If customer purchasing record data at some retail shop includes an item "male" and another item "female", there is a possibility of discovering a useless negative association rule such as "the case of male never means the case of female". In addition, as to discovering a positive association rule, there is a case of retrieving and verifying an itemset including the items "male" and "female" because the itemset is included in a candidate itemset, which indicates useless processes have been executed.

In the conventional art, when a hash-tree becomes too large to be included in a memory, paging of hash-tree node data would happen at the time of matching the record with the hash-tree, which enormously decreases processing speed. In the case of the hash-tree being unbalanced, the paging still may happen even after dividing the tree, because the divided hash-tree may be still too large to be within the memory.

In the conventional art, it is necessary to retrieve database at the rule generating step, which makes the process speed slow.

In the conventional art, there are a lot of candidate-itemsets, which also makes the process speed slow.

In the conventional art, a record in the database is selected one by one to perform matching between each record and the hash-tree, in calculating frequencies at the Lk generating step. Therefore, the processes of recursively utilizing the matching function are frequent, which makes the matching process speed slow.

SUMMARY OF THE INVENTION

The present invention is provided to solve the above-mentioned problems. It is an object of the present invention to provide an association rule discovering method by which association rules can be effectively obtained.

It is another object of the present invention to provide an association rule discovering method by which association rules including negative association rules can be obtained regardless of a BS (both sides of the left hand side and the right hand side of an association rule) frequency.

It is another object of the present invention to provide an association rule discovering method by which only statistically significant association rules are obtained.

It is another object of the present invention to provide an association rule discovering method by which only positive association rules or only negative association rules are effectively selected.

It is another object of the present invention to provide an association rule discovering method in which the user does not need to input a minimum frequency and no candidate rule having a useless frequency is tested. Accordingly, the association rules can be effectively obtained.

It is another object of the present invention to provide an association rule discovering method by which association rules regarding specific items can be effectively obtained.

It is another object of the present invention to provide an association rule discovering method by which association rules, in the case of the domain being restricted, can be effectively selected.

It is another object of the present invention to provide an association rule discovering method in which paging in the hash-tree is suppressed in order to perform high-speed processing.

It is another object of the present invention to provide an association rule discovering method by which a set of items not to appear in the association rule at the same time is appointed.

It is another object of the present invention to provide an association rule discovering method by which it is not necessary to retrieve the database. Accordingly, the processing time can be reduced.

It is another object of the present invention to provide an association rule discovering method by which the number of candidate-itemsets is lessened. Accordingly the processing time can be reduced.

It is another object of the present invention to provide an association rule discovering method by which the times of recursively utilizing the hash function is lessened. Accordingly, high speed matching can be performed.

It is another object of the present invention to provide an association rule discovering apparatus by which association rules including negative association rules can be effectively obtained regardless of a BS frequency.

It is another object of the present invention to provide an association rule discovering apparatus by which paging in the hash-tree is suppressed in order to perform high-speed processing.

It is another object of the present invention to provide an association rule discovering apparatus by which the times of recursively utilizing the hash function is lessened. Accordingly, high speed matching can be performed.

According to one aspect of the present invention, a method for discovering an association rule existing between itemsets composed of one or more than one items, from a database storing a plurality of records composed of one or more than one items, where k is an integer equal to or more than 2, and n indicates an integer from 1 to k, when an itemset is composed of n items and a frequency, meaning a number of records including the n items, of the itemset has not been checked, the itemset is defined as a candidate-itemset Cn, and when a frequency of the candidate-itemset Cn is equal to or more than a lower limit value Smin, the candidate-itemset Cn is defined as a large-itemset Ln, the method comprises the steps of:
(a) user's inputting a parameter necessary for obtaining the association rule,
(b) generating a large-itemset, this step includes the steps of:
(b1) generating a large-itemset L1 by counting a frequency meaning a number of records including each item, and defining an itemset composed of items made of the each item having a frequency equal to or more than the lower limit value Smin as the large-itemset L1;
(b2) generating a candidate-itemset Ck by using a large-itemset Lk−1 and the large-itemset L1; and
(b3) generating a large-itemset Lk by selecting the large-itemset Lk from the candidate-itemset Ck; and
(c) generating and testing a hypothesis, this step includes the steps of:
(c1) generating a candidate association rule by using the large-itemset Lk−1 and the large-itemset L1, where the large-itemset Lk−1 is defined as a condition itemset called a left hand side (LHS) and the large-itemset L1 is defined as a conclusion itemset called a right hand side (RHS); and
(c2) testing a rule for testing the candidate association rule to be one of applied and not-applied as the association rule.

According to another aspect of the present invention, a method for discovering an association rule existing between itemsets composed of one or more than one items, from a database storing a plurality of records composed of one or more than one items, where k is an integer equal to or more than 2, and n indicates an integer from 1 to k, when an itemset is composed of n items and a frequency, meaning a number of records including the n items, of the itemset has not been checked, the itemset is defined as a candidate-itemset Cn, and when a frequency of the candidate-itemset Cn is equal to or more than a lower limit value Smin, the candidate-itemset Cn is defined as a large-itemset Ln, the method comprises the steps of:
(a) generating a large-itemset L1 by counting a frequency meaning a number of records including each item, and defining an itemset composed of items made of the each item which has a frequency equal to or more than the lower limit value Smin as the large-itemset L1;
(b) generating a candidate-itemset Ck by extending a branch of a hash-tree which stores a large-itemset Lk−1;
(c) dividing the hash-tree into partial trees to be within a specific amount;
(d) generating a large-itemset Lk by selecting the large-itemset Lk based on a matching between each divided partial tree and the database;
(e) generating a candidate association rule; and
(f) testing a rule for testing the candidate association rule to be one of applied and not-applied as the association rule.

According to another aspect of the present invention, a method for discovering an association rule existing between itemsets composed of one or more than one items, from a database storing a plurality of records composed of one or more than one items, where k is an integer equal to or more than 2, and n indicates an integer from 1 to k, when an itemset is composed of n items and a frequency, meaning a number of records including the n items, of the itemset has not been checked, the itemset is defined as a candidate-itemset Cn, when a frequency of the candidate-itemset Cn is equal to or more than a lower limit value Smin, the candidatei-itemset Cn is defined as a large-itemset Ln, and where a memory amount can be used for generating the association rule in a computer is defined as an allowable amount, and a large-itemset file is used for storing data on the large-itemset Ln, the method comprises the steps of:

(a) generating a large-itemset L1 by counting a frequency meaning a number of records including each item, defining an itemset composed of items made of the each item having a frequency equal to or more than the lower limit value Smin as the large-itemset L1, assigning optional continuous numbers to the each item in the large-itemset L1, and storing data on the large-itemset L1 in the large-itemset file;

(b) reading the large-itemset file for reading data on (k−1)-itemsets in a large-itemset Lk−1 from the large-itemset file; and storing the data in a hash-tree;

(c) generating a candidate-itemset Ck by extending a branch of the hash-tree;

(d) checking an amount by comparing an amount of the hash-tree which stores the candidate-itemset Ck with a specific amount less than the allowable amount, going back to the step of reading the large-itemset file when the amount of the hash-tree is less than the specific amount, and going to a next step when the amount of the hash-tree is equal to or more than the specific amount;

(e) generating a large-itemset Lk by selecting the large-itemset Lk based on a matching between the candidate-itemset Ck and the database; and (f) generating a rule by generating a candidate association rule and testing the candidate association rule to be one of applied and not-applied as an association rule.

According to another aspect of the present invention, a method for discovering an association rule existing between itemsets composed of one or more than one items, from a database storing a plurality of records composed of one or more than one items, where k is an integer equal to or more than 2, and n indicates an integer from 1 to k, when an itemset is composed of n items and a frequency, meaning a number of records including the n items, of the itemset has not been checked, the itemset is defined as a candidate-itemset Cn, and when a frequency of the candidate-itemset Cn is equal to or more than a lower limit value Smin, the candidate-itemset Cn is defined as a large-itemset Ln, the method comprises the steps of:

(a) generating a large-itemset L1 by counting a frequency meaning a number of records including each item, and defining an itemset composed of items made of the each item having a frequency equal to or more than the lower limit value Smin as the large-itemset L1;

(b) generating a candidate-itemset Ck;

(c) generating a large-itemset Lk by performing a matching between a set of records in the database and a hash-tree storing the candidate-itemset Ck, and selecting the large-itemset Lk;

(d) generating a candidate association rule; and (e) testing a rule for testing the candidate association rule to be one of applied and not-applied as the association rule.

According to another aspect of the present invention, an apparatus for discovering an association rule existing between itemsets composed of one or more than one items, where k is an integer equal to or more than 2 and n indicates an integer from 1 to k, the apparatus comprises:

(a) a database storing a plurality of records composed of one or more than one items;

(b) a user input unit for inputting a parameter necessary for obtaining the association rule;

(c) a memory area for storing a large-itemset Ln, when an itemset is composed of n items and a frequency, meaning a number of records including the n items, of the itemset has not been checked, the itemset is defined as a candidate-itemset Cn, and when a frequency of the candidate-itemset Cn is equal to or more than a lower limit value Smin, the candidate-itemset Cn is defined as the large-itemset Ln;

(d) a large-itemset generating unit, this unit includes:

(d1) a candidate-itemset verifying unit for counting a frequency meaning a number of records including each item, defining an itemset composed of items made of the each item which has a frequency equal to or more than the lower limit value Smin as a large-itemset L1, and selecting a large-itemset Lk from a candidate-itemset Ck; and (d2) a candidate-itemset generating unit for generating the candidate-itemset Ck by using a large-itemset Lk−1 and the large-itemset L1;

(e) a hypothesis generating and testing unit, this unit includes:

(e1) a candidate rule generating unit for generating a candidate association rule by using the large-itemset Lk−1 and the large-itemset L1, in the candidate association rule the large-itemset Lk−1 is defined as a condition itemset called a left hand side (LHS) and the large-itemset L1 is defined as a conclusion itemset called a right hand side (RHS); and (e2) a rule testing unit for testing the candidate association rule to be one of applied and not-applied as the association rule.

According to another aspect of the present invention, an apparatus for discovering an association rule existing between itemsets composed of one or more than one items, where k is an integer equal to or more than 2 and n indicates an integer from 1 to k, the apparatus comprises:

(a) a database storing a plurality of records composed of one or more than one items;

(b) a memory area for storing a large-itemset Ln, when an itemset is composed of n items and a frequency, meaning a number of records including the n items, of the itemset has not been checked, the itemset is defined as a candidate-itemset Cn, and when a frequency of the candidate-itemset Cn is equal to and more than a lower limit value Smin, the candidate-item set Cn is defined as the large-itemset Ln;

(c) a large-itemset generating unit, this unit includes:
  (c1) a hash-tree operating unit for dividing a hash-tree into partial trees to be within a specific amount;
  (c2) a candidate-item set verifying unit for
    counting a frequency meaning a number of records including each item,
    defining an itemset composed of items made of the each item which has a frequency equal to or more than the lower limit value Smin as a large-itemset L1, and
    selecting a large-itemset Lk based on a matching between each divided partial tree and the database;
  (c3) a candidate-itemset generating unit for generating a candidate-itemset Ck by extending a branch of the hash-tree which stores a large-itemset Lk−1;
(d) a hypothesis generating and testing unit, this unit includes:
  (d1) a candidate rule generating unit for generating a candidate association rule, and
  (d2) a rule testing unit for testing the candidate association rule to be one of applied and not-applied as the association rule.

According to another aspect of the present invention, an apparatus for discovering an association rule existing between itemsets composed of one or more than one items, where k is an integer equal to or more than 2 and n indicates an integer from 1 to k, the apparatus comprises:
(a) a database storing a plurality of records composed of one or more than one items;
(b) a large-itemset file for storing data on a large-itemset Ln,
  when an itemset is composed of n items and a frequency, meaning a number of records including the n items, of the itemset has not been checked, the itemset is defined as a candidate-item set Cn, and
  when a frequency of the candidate-itemset Cn is equal to or more than a lower limit value Smin, the candidate-itemset Cn is defined as the large-itemset Ln;
(c) a large-itemset generating unit, this unit includes:
  (c1) a candidate-itemset verifying unit for
    counting a frequency meaning a number of records including each item,
    defining an itemset composed of items made of the each item which has a frequency equal to or more than the lower limit value Smin as a large-itemset L1, and
    selecting a large-itemset Lk based on a matching between a candidate-itemset Ck and the database;
  (c2) a candidate-itemset generating unit for generating the candidate-itemset Ck by extending a branch of a hash-tree; and
  (c3) a hash-tree operating unit for
    assigning optional continuous numbers to the each item,
    storing data on the large-itemset L1 in the large-itemset file,
    reading data on (k−1)-itemsets in a large-itemset Lk−1 from the large-itemset file,
    storing the data in a hash-tree,
    comparing an amount of the hash-tree which stores the candidate-itemset Ck with a specific amount less than an allowable memory amount of a computer, and
    making go back to a step of reading the large-itemset file when the amount of the hash-tree is less than the specific amount, and making go to a next step when the amount of the hash-tree is more than the specific value; and
(d) a hypothesis generating/testing unit for generating a candidate association rule and testing the candidate association rule to be one of applied and not-applied as the association rule.

According to another aspect of the present invention, an apparatus for discovering an association rule existing between itemsets composed of one or more than one items, where k is an integer equal to or more than 2 and n indicates an integer from 1 to k, the apparatus comprises:
(a) a database storing a plurality of records composed of one or more than one items;
(b) a memory area for storing a large-itemset Ln,
  when an itemset is composed of n items and a frequency, meaning a number of records including the n items, of the itemset has not been checked, the itemset is defined as a candidate-itemset Cn, and
  when a frequency of the candidate-itemset Cn is equal to or more than a lower limit value Smin, the candidate-itemset Cn is defined as the large-itemset Ln;
(c) a large-itemset generating unit, this unit includes:
  (c1) a candidate-itemset verifying unit for
    counting a frequency meaning a number of records including each item,
    defining an itemset composed of items made of the each item which has a frequency equal to or more than the lower limit value Smin as a large-itemset L1, and
    selecting a large-itemset Lk based on a matching between a set of records in the database and a hash-tree which stores a candidate-itemset Ck; and
  (c2) a candidate-itemset generating unit for generating the candidate-itemset Ck;
(d) a hypothesis generating and testing unit, this unit includes:
  (d1) a candidate rule generating unit for generating a candidate association rule; and
  (d2) a rule testing unit for testing the candidate association rule to be one of applied and not-applied as the association rule.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

In the drawings,

FIG. 33 shows an example of database contents used for a conventional association rule discovering method and Embodiment 1 according to the present invention;

FIG. 41 shows states of hash-tree used in Embodiment 19 according to the present invention;

FIG. 44 shows an example of large-itemset file used in Embodiments 20 and 21 according to the present invention;

FIG. 51 shows an example of database used for Embodiment 18 according to the present invention;

DETAILED DESCRIPTION OF PREFERRED EMBODIMENTS

Figure 51:
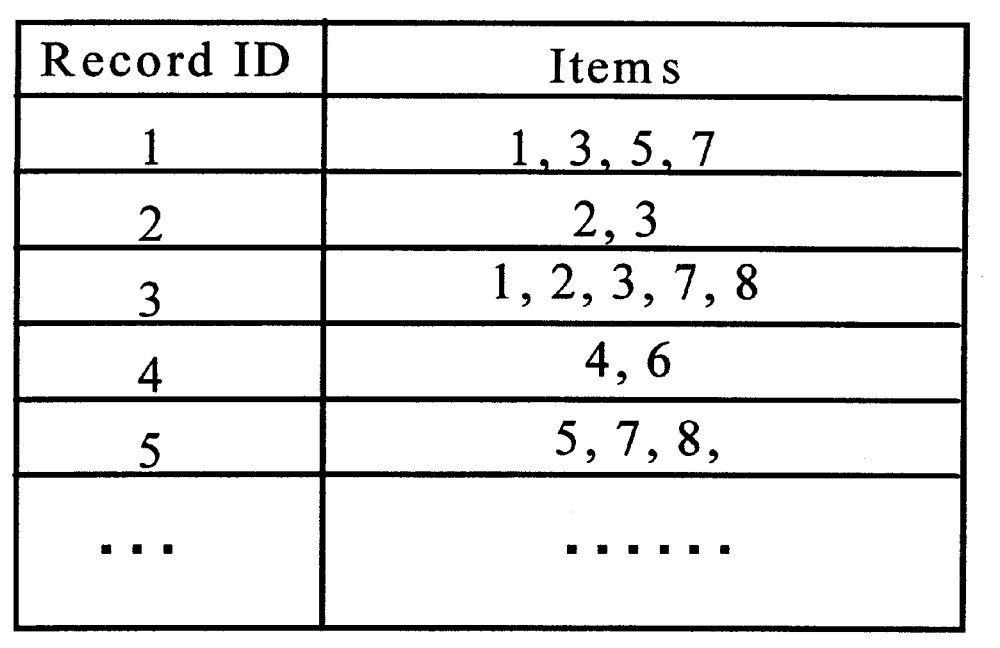

Before describing each Embodiment, common contents in all the Embodiments will now be explained. As shown in FIG. 51, the database used in Embodiments of the present invention is composed of records having each record ID and items expressed by integers equal to more than 1. An itemset having k items is called a "k-itemset" and the number of records including the k-itemset is called a "frequency" of the k-itemset.

An example of association rule will be described. When there are two itemsets [A, B, . . . , X] and [Y], the association rule between the itemsets is expressed by the form

A, B, . . . , X→Y where the number of records including all of A, B, . . . , X, Y is called a frequency of this association rule and a ratio of records including A, B, . . . , X, Y to the records including A, B, . . . , X is called a confidence.

The right hand side (RHS) indicates an itemset to be a conclusion of the association rule and the left hand side (LHS) indicates itemsets to be conditions of the association rule. The definition of RHS and LHS is also applied to candidate association rules.

In the above association rule, the number of records including A, B, . . . , X is called a LHS frequency, the number of records including Y is called a RHS frequency, and the number of records including A, B, . . . , X, Y is called a both sides frequency (BS frequency) meaning a frequency of itemset including all the items in RHS and LHS. The minimum value regarding the frequency and the confidence specified by the user are called a minimum frequency and a minimum confidence.

As stated above, an itemset having k items is called a "k-itemset". Then, a set of k-itemsets whose frequencies are equal to or more than a minimum frequency is called a large-itemset Lk having length k. A set of k-itemsets potentially to be elements of the large-itemset Lk is called a candidate-itemset Ck having length k. Namely, k-itemsets, whose frequencies are equal to or more than the minimum frequency, in Ck are selected to be elements of Lk. (k is an integer equal to or more than 1)

Regarding itemsets having the same length, their node numbers at the same height in the hash-tree are compared from the root until different numbers appear. An itemset having a smaller node number in comparing the different numbers is regarded smaller than the other itemset.

Embodiment 1.

Referring to FIGS. 1, 2, 32 through 36, an association rule discovering apparatus and method according to Embodiment 1 will now be explained.

Figure 1:
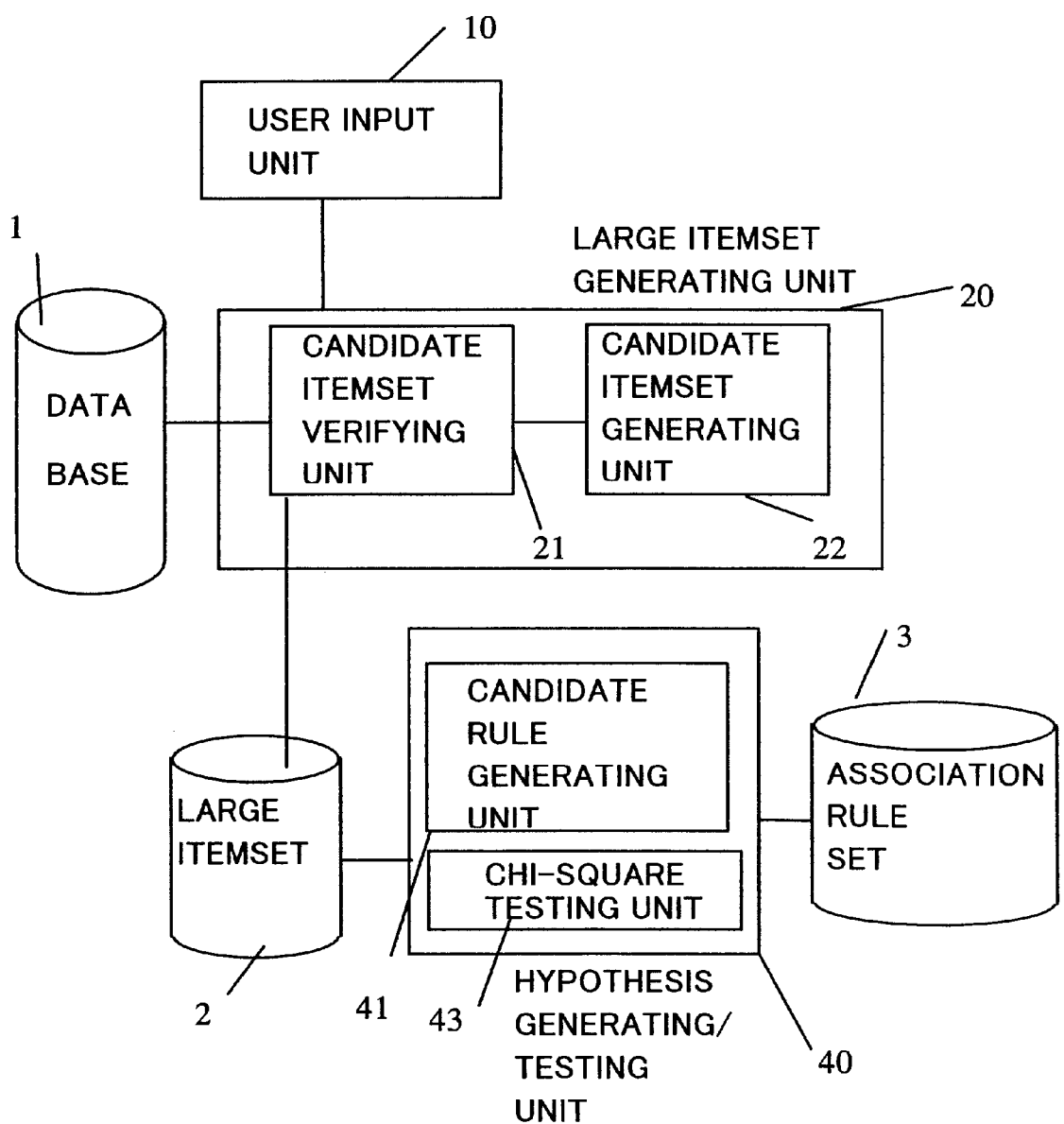
FIG. 1 shows a system of Embodiments 1 and 2 according to the present invention.
Figure 2:
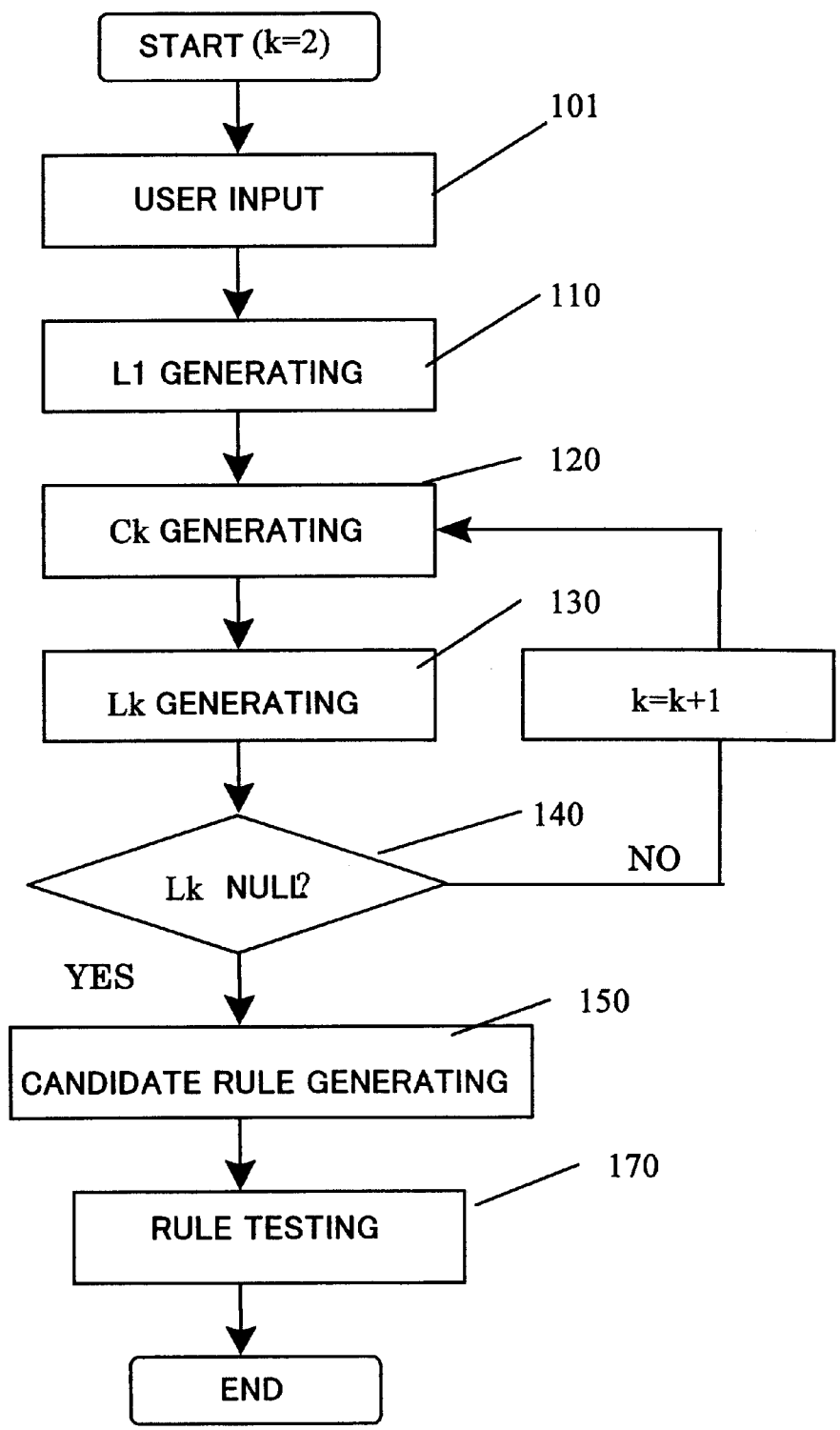
FIG. 2 shows a block diagram of Embodiments 1 through 3 and Embodiments 14 through 16 according to the present invention.
Figure 32:
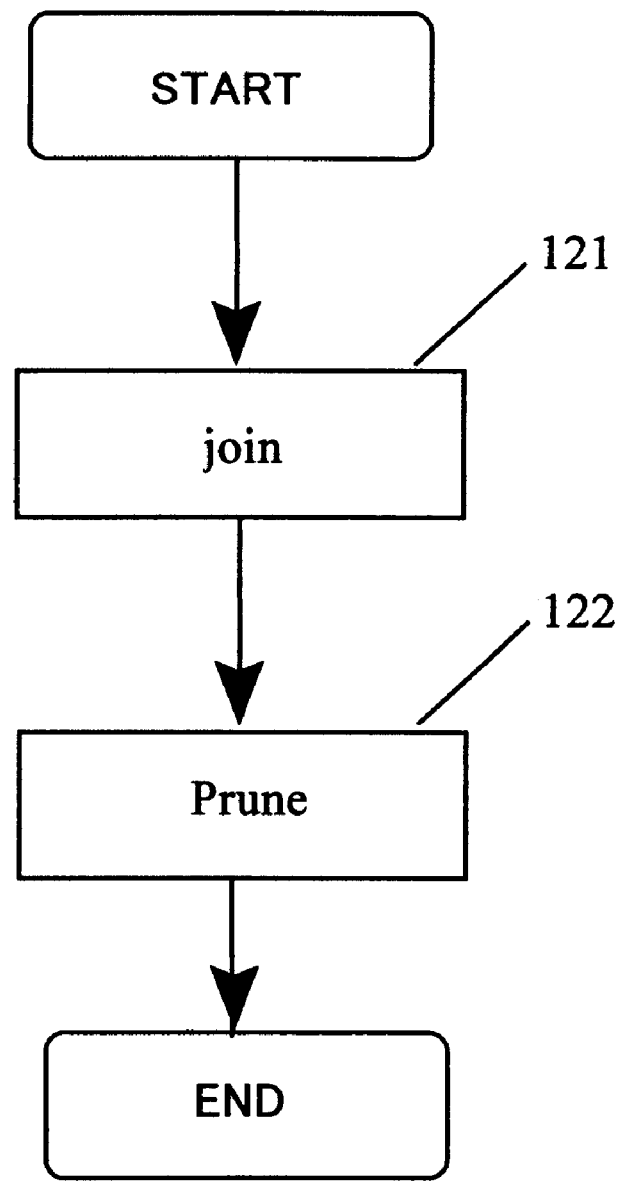
FIG. 32 is a block diagram showing a detailed Ck generating step of a conventional association rule discovering method and Embodiment 1 according to the present invention.
Figure 34:
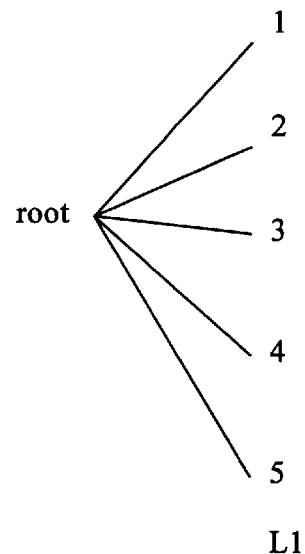
FIG. 34 shows an example of hash-tree used for a conventional association rule discovering method and Embodiment 1 according to the present invention.
Figure 35:
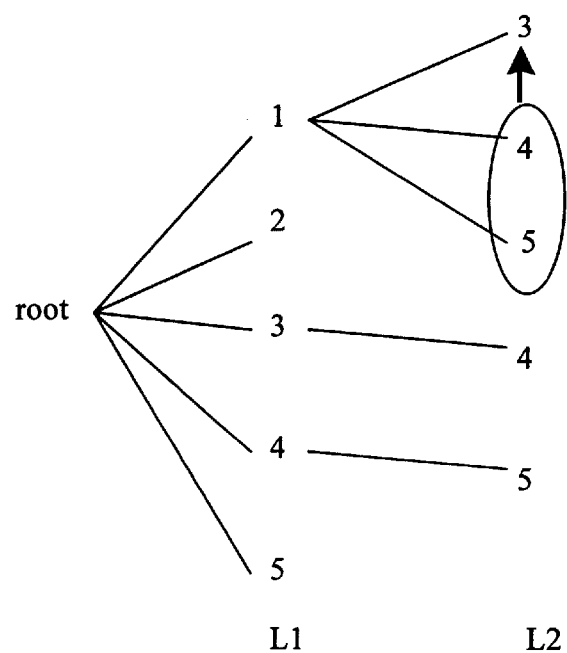
FIG. 35 shows an example of hash-tree used for a conventional association rule discovering method and Embodiment 1 according to the present invention.

FIG. 1 shows a system of the present embodiment, FIG. 2 is a block diagram showing the association rule discovering apparatus, and FIG. 32 is a block diagram showing detailed candidate-itemset Ck generation. FIG. 33 showing a database and FIGS. 34 through 36 showing the procedure of the candidate-itemset Ck generation are examples according to the present embodiment.

The system configuration of this embodiment will be described. The followings are provided in the association rule discovering apparatus shown in FIG. 1; an accumulated database 1 whose configurational example is shown in FIG. 33, a large-itemset 2 generated from the database 1, an association rule set 3 which is a set of verified association rules obtained from the large-itemset 2, a user input unit 10 into which the user inputs a specific parameter, and a large-itemset generating unit 20 for generating a large-itemset from the database 1. The large-itemset generating unit 20 is composed of a candidate-itemset verifying unit 21 for verifying a candidate-itemset and selecting a large-itemset, and a candidate-itemset generating unit 22 for generating a candidate-itemset. A hypothesis generating/testing unit 40 also shown in FIG. 1 generates a hypothesis for obtaining an association rule and tests the generated hypothesis. The hypothesis generating/testing unit 40 is composed of a candidate rule generating unit 41 for generating a candidate for association rule, and a chi-square testing unit 43 for judging the candidate rule to be stored in the association rule set 3 or not by performing a chi-square test.

(The chi-square test will be explained later.)

Now, the procedure of discovering an association rule according to the present embodiment is explained with reference to FIG. 2. At a user input step 101, a minimum frequency and a significant level are obtained from the user through the user input unit 10.

At an L1 generating step 110, the candidate-itemset verifying unit 21 selects a record from the database 1 one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are registered in a hash-tree as a large-itemset L1. FIG. 34 shows the case that each frequency of five items, 1, 2, 3, 4, and 5 is more than the minimum frequency and the five items are registered in the hash-tree.

Both ends of each branch of the hash-tree are called nodes and generally item numbers are correspondingly assigned to the nodes. At the beginning end of the hash-tree, no item number is assigned to the node, which is called a root. The number of branches, from the root to the last node, is called a branch length. Therefore, each branch length in FIG. 34 is 1. A node closer to the root than the other one at each branch is called a parent node, and farther one is called a child node.

At a Ck generating step 120, a candidate-itemset Ck is generated from a large-itemset Lk−1 having length k−1, by the candidate-itemset generating unit 22.

Now, the case of C3 being generated from L2 will be explained. FIG. 35 illustrates a hash-tree made up to the state of L2. The detail of the Ck generating step is shown in a block diagram of FIG. 32 having two-step procedures: a join step 121 and a prune step 122.

Figure 36A:
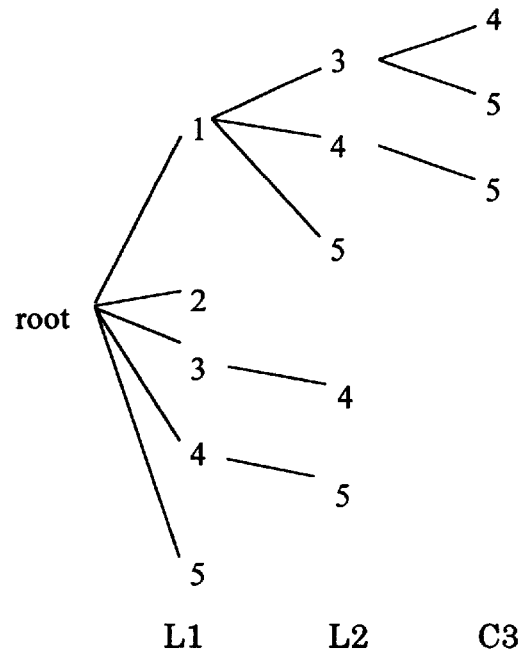
FIG. 36A shows an example of hash-tree before pruning in Ck generating step used for a conventional association rule generating method and Embodiment 1 according to the present invention.

Referring to FIGS. 35 and 36A, the join step 121 is described with reference to a node (called an original node here) at a branch end of k−1 long. New branches are extended in order to make child nodes for the original node. The child nodes should have item numbers larger than the item number assigned to the original node out of item numbers assigned to other nodes having the same parent node as the original node. For instance, the node shown as root→1→3 in FIG. 35 is expressed by [1, 3]. (This expression is used hereinafter for representing a node in the hash-tree). With respect to the node [1,3], nodes [1,4] and [1,5] which have the same parent node as the node [1,3] and whose item numbers 4 and 5 are larger than 3, are joined to the node [1,3] to be [1,3,4] and [1,3,5]. With respect to [1,4], [1,5] is joined to be [1,4,5]. No new branch is extended for the node [1,5] because there is no larger item number than 5 for [1].

As stated above, preliminary candidate-itemsets made of three items are generated for the Ck generation. The above procedure is illustrated in FIG. 36A as a state before pruning.

Now, the prune step 122 is explained. In the above join step 121, a branch indicating an itemset whose length is extended to k has been made. Then, every (k−1)-itemset, made by deleting one item from the k-itemset, is checked whether the (k−1)-itemset is included in Lk−1 or not. Only when all the (k−1)-itemsets are included in Lk−1, the k-itemset is left to be utilized. If there is at least one (k−1)-itemset which is not included in Lk−1, the k-itemset is deleted.

For instance, in the case of checking [1,3,4], three 2-itemsets [1,3], [1,4], and [3,4] are checked to be in L2 or not. Referring to FIG. 36A, as all of these three itemsets are included in L2, [1,3,4] is left. In the case of checking [1,3,5], three 2-itemsets [1,3], [1,5], and [3,5] are checked to be in L2 or not. Since [3,5] does not exist in L2, [1,3,5] is deleted.

Figure 36B:
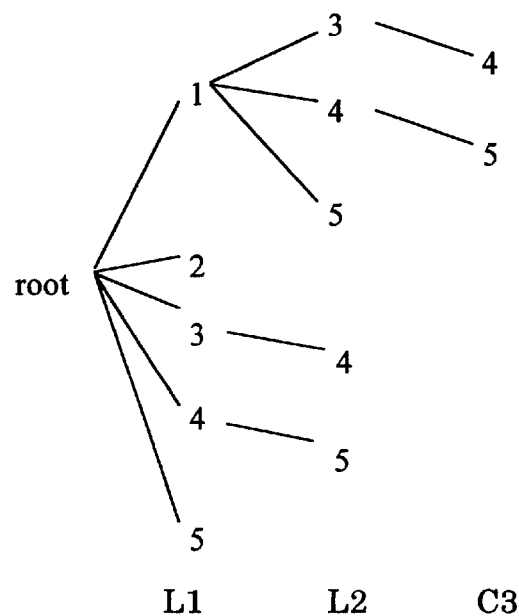
FIG. 36B shows an example of hash-tree after pruning in Ck generating step of used for conventional association rule generating method and Embodiment 1 according to the present invention.

All the k-itemsets made in the join step 121 are checked at the prune step 122. A hash-tree after the pruning is shown in FIG. 36B.

In the initial state shown in FIG. 34, k equals 2 (k=2). A candidate-itemset C2 is generated from the large-itemset L1 through the preliminary candidate-itemset.

After the Ck generating step 120, an Lk generating step 130 is performed by the candidate-itemset verifying unit 21. In the Lk generating step 130, a record is selected from the database one by one to count the number of k-itemsets in Ck. Then, only k-itemsets whose frequencies are more than the minimum frequency are left to be elements of Lk. Matching is performed between the record and the hash-tree in counting the number of k-itemsets.

Now, the matching will be explained. First, a record is selected from the database one by one, and checking is performed for the selected record along the hash-tree from the root. Then, it is checked whether an item corresponding to a child node of the root exists in the record or not. If such an item does not exist in the record, the matching for the record is finished to check the next record. When such an item exists in the record, it is checked whether an item corresponding to a next child node (grandchild node of the root) exists in the record or not.

This operation is repeatedly performed. If a child node does not have any branch at its lower level in the hash-tree, such a child node is called a leaf. In checking a record, when a node's child node is a leaf and an item corresponding to the leaf exists in the record, the frequency counting for the leaf node is increased, which means that the matching for the record is completed. At the time of all the matching procedures having been completed for every record, the frequency count value for each leaf node represents the frequency of each k-itemset (an itemset from the root to the leaf node).

As stated above, the frequency of each k-itemset is counted and a large-itemset Lk is generated by selecting k-itemsets having frequencies more than the minimum frequency as elements of the large-itemset Lk.

If, at the Lk generating step, no k-itemset is selected to be an element of Lk, it goes to a candidate rule generating step 150. When there is a k-itemset to be included Lk, one is added to k and it goes back to the Ck generating step 120.

At the candidate rule generating step 150, the candidate rule generating unit 41 generates a candidate for the association rule from the large-itemsets generated through the previous steps. Accordingly, k candidate rules are generated from a k-itemset in Lk. In the RHS of the k candidate rules, an item out of items in k-itemset is described. In the LHS of the k candidate rules, k−1 items made by deleting the item in RHS from the items in k-itemset are described. This candidate rule generating process is performed for all the k-itemsets in Lk in the case of k>=2.

At a rule testing step 170, the chi-square testing unit 43 decides whether each of the candidate rules generated by the candidate rule generating unit 41 is to be stored in the association rule set 3 or not. A $\chi^2$ statistics (chi-squared statistics) is calculated based on an LHS frequency, RHS frequency and BS frequency of each candidate rule.

In the case of testing the candidate rule A1, A2→B, the $\chi^2$ statistics is calculated by the Expression 1. [Expression 1]

$$x^2 = \frac{n(nc - ab)^2}{ab(n-1)(n-b)} \qquad (1)$$

where the frequency of [A1, A2], meaning the number of records including A1 and A2 is represented by "a", the frequency of B, meaning the number of records including B is represented by "b", the frequency of [A1, A2, B], meaning the number of records including A1, A2 and B is represented by "c", and the whole number of records in the database is represented by "n".

The $\chi^2$ statistics is a random variable in a $\chi^2$ distribution (chi-squared distribution) with one degree of freedom on the supposition that RHS and LHS are independent each other. According to statistics, when a $\chi^2$ statistics exceeds a specified value based on a significant level, the supposition that RHS and LHS are independent each other can be denied. Namely, it can be concluded there is some relation between RHS and LHS. If the $\chi^2$ statistics calculated by the Expression 1 is over the lower limit of $\chi^2$, the candidate rule is stored in the association rule set 3.

When the value of nc−ab is positive, A1, A2 and B have a positive association, which indicates a tendency that A1, A2 and B appear in the same record. When the value of nc−ab is negative, A1, A2 and B have a negative association, which indicates a tendency that A1, A2 and B seldom appear in the same record.

According to the present embodiment, it is possible to obtain all the rules in which all the frequencies of RHS, LHS and BS are over the minimum frequency and the $\chi^2$ statistics exceeds the lower limit of $\chi^2$, because a>=c, b>=c and Lk satisfying c>=minimum frequency is selected at the Lk generating step.

According to the present embodiment, as stated above, the association rule discovering method includes the following steps and the association rule discovering apparatus performs all the steps of the method. The association rule discovering method includes the steps of inputting at least a significant level for the chi-square test by the user, calculating a $\chi^2$ statistics by using frequencies of RHS, LHS and BS, and the whole record numbers, performing the chi-square test by using the $\chi^2$ statistics and the significant level, and judging whether a candidate association rule is to be selected as an association rule or not.

Accordingly, as the association rule is evaluated and selected by using a $\chi^2$ statistics, only statistically significant association rules are obtained.

Embodiment 2.

Referring to FIGS. 1 through 5, an association rule discovering apparatus and method according to Embodiment 2 will now be explained.

In Embodiment 1, the candidate-itemset Ck generating step includes the two steps: the join step and the prune step. In this Embodiment 2, the candidate-itemset Ck generating step includes only the join step.

Figure 3:
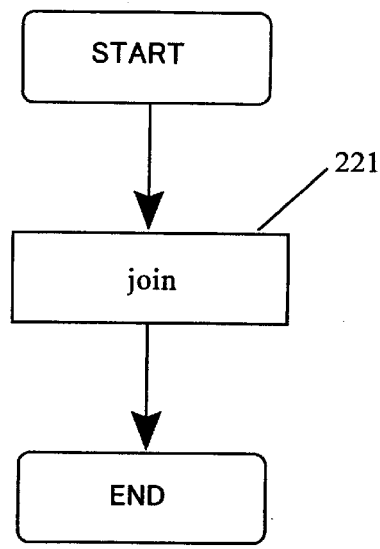
FIG. 3 is a block diagram showing a detailed Ck generating step of Embodiment 2 according to the present invention.
Figure 4:
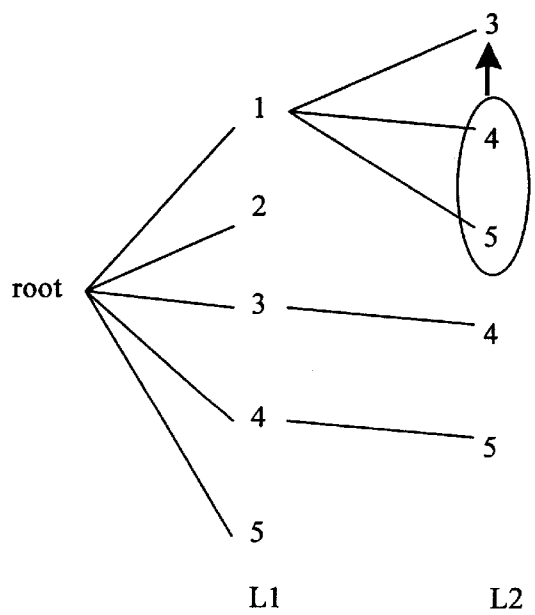
FIG. 4 shows an example of hash-tree used for Embodiment 2 according to the present invention.

FIG. 1 shows a system of association rule discovering apparatus according to the present embodiment, FIG. 2 is a block diagram showing the association rule discovering apparatus, FIG. 3 is a block diagram showing a candidate-itemset Ck generation in detail, and FIGS. 4 and 5 show hash-trees for comparing the procedures of the candidate-itemset Ck generation of Embodiments 1 and 2.

The system configuration of FIG. 1 and the block diagram configuration of FIG. 2 are the same as Embodiment 1. Operations performed in Embodiments 1 and 2 are the same except that the operation of the Ck generating step 120 in FIG. 2 differs from that of Embodiment 1. Now, the operation of the Ck generating step 120 in FIG. 2 performed by the candidate-itemset generating unit 22 in FIG. 1 will be explained.

In the Ck generating step 120 of FIG. 2, the candidate-itemset generating unit 22 generates a candidate-itemset by performing only the join step as shown in FIG. 3. According to the present embodiment, the prune step for choosing candidates is not performed.

Comparing with the related art including the prune step, the process time of generating a candidate-itemset in the present embodiment is shorter.

Figure 5A:
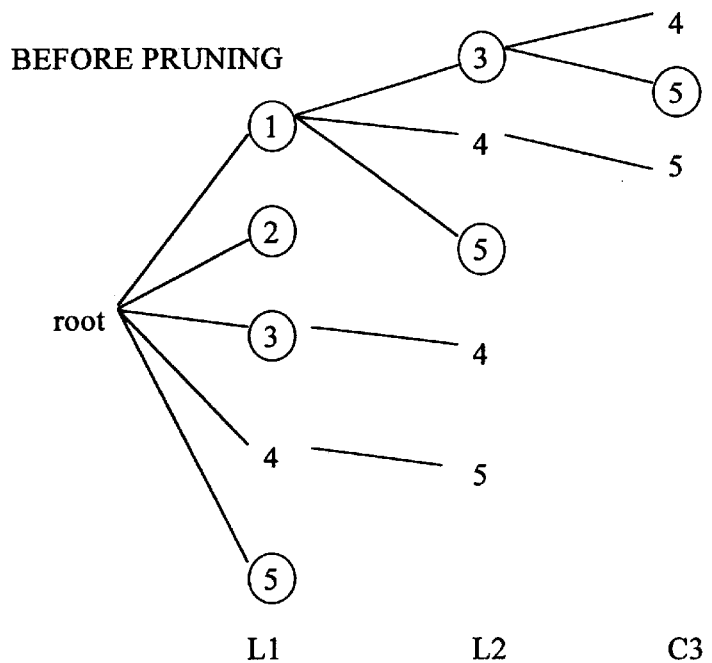
FIG. 5A shows an example of hash-tree before pruning used for Embodiment 2 according to the present invention.

The hash-tree made up to the state of L2 in FIG. 4 is extended by the join step as shown in FIG. 5A. FIG. 5A shows the state that a preliminary candidate-itemset has been generated, and FIG. 5B shows the state that the pruning operation has been performed.

Now, a matching between the hash-tree and the record {1, 2, 3, 5} is explained as an example. In comparing the extended nodes between FIGS. 5A and 5b, the states of nodes are all same except that the node [1,3,5] is deleted at the prune step in FIG. 5B. Besides, the procedures of generating up to [1,3] and trying to find the next node for [1,3] (that is [1,3,5]) are the same in FIGS. 5A and 5B. The difference is that the procedure of increasing a count for the node [1,3,5] is performed only in FIG. 5A.

Figure 5B:
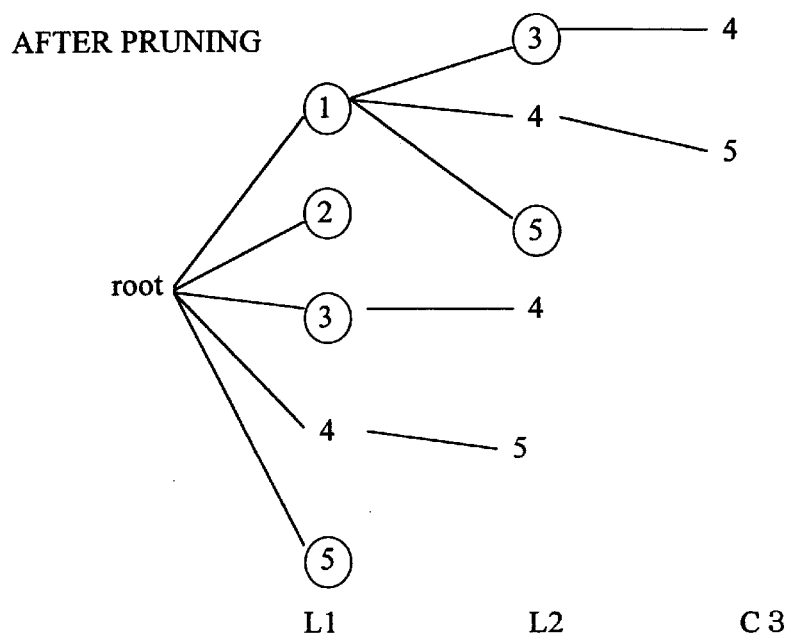
FIG. 5B shows an example of hash-tree after pruning used for Embodiment 2 according to the present invention.

When the prune step is performed as shown in FIG. 5B, three nodes [1,3], [1,5], and [3,5], made by deleting one item from the 3-itemset [1,3,5], must be checked. Comparing this checking procedure with the procedure of increasing the count for the node [1,3,5], it is concluded that the checking procedure has much more to be performed.

As stated above, according to the association rule discovering method and apparatus of the present embodiment, all the preliminary candidate-itemsets are selected as candidate-itemsets Ck, in the Ck generating step.

Since the prune step is not performed in generating candidate-itemsets, the process time can be shortened.

Embodiment 3.

Figure 6:
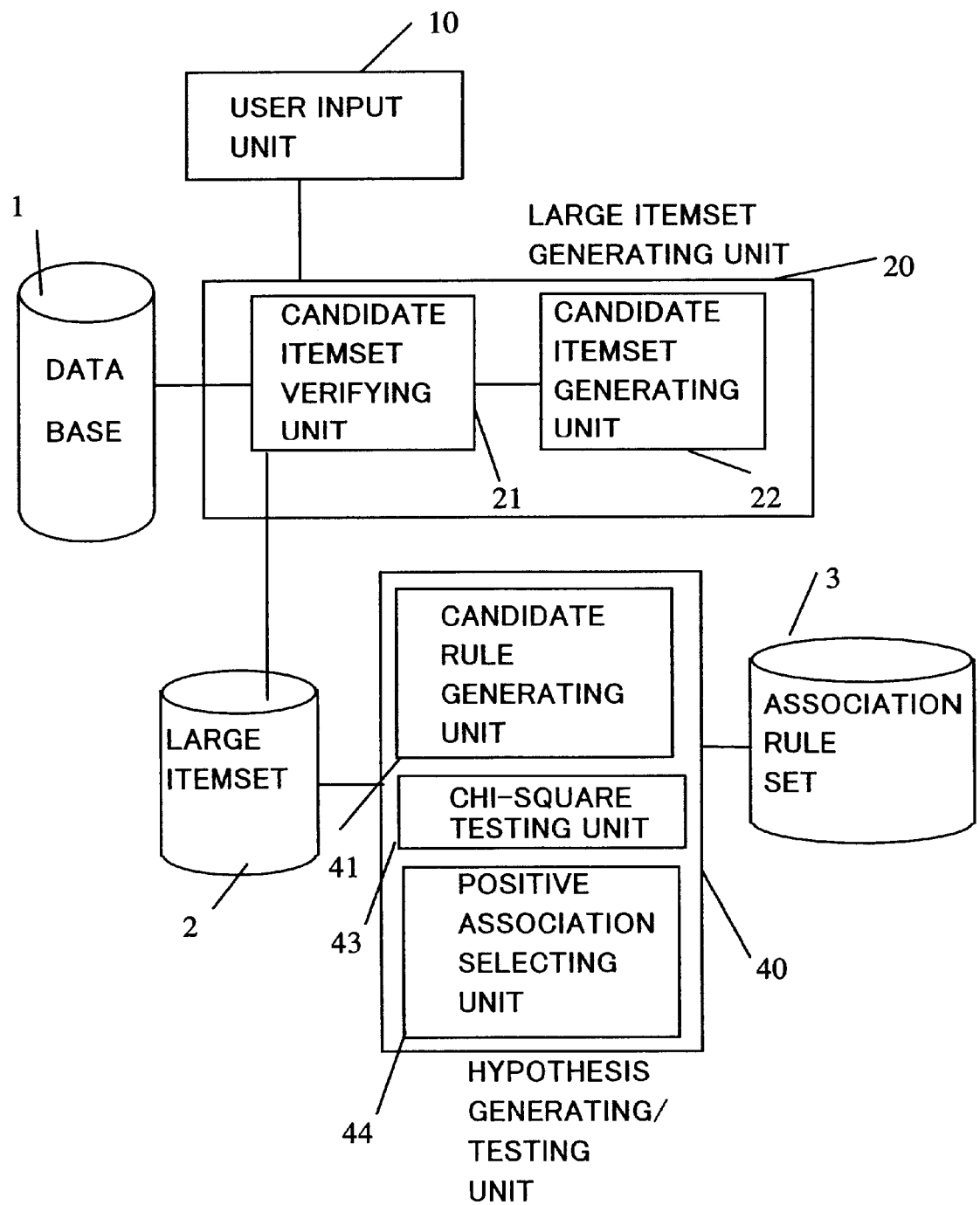
FIG. 6 shows a system of Embodiment 3 according to the present invention.

Referring to FIGS. 2 and 6, an association rule discovering apparatus and method according to Embodiment 3 will now be explained.

In the above Embodiment 1, an association rule is stored in the association rule set without being checked to be a positive association rule or a negative association rule. In this Embodiment 3, only a positive association rule is selected to be stored in the association rule set.

FIG. 2 is a block diagram showing the association rule discovering apparatus according to the present embodiment, and FIG. 6 shows a system of the association rule discovering apparatus.

The system configuration of FIG. 6 is the same as FIG. 1 of Embodiment 1 except a positive association selecting unit 44 in FIG. 6. The positive association selecting unit 44 checks whether a rule whose $\chi^2$ statistics is over the lower limit calculated based on the significant level is a positive association or not. Operations in FIG. 2 of Embodiment 3 are the same as those of Embodiment 1 except the operation at the rule testing step 170 performed by the positive association selecting unit 44.

Referring to FIG. 2, the procedure of discovering an association rule will now be explained. Operations performed at the steps from the user input 101 to the candidate rule generating 150 are the same as Embodiment 1.

At the rule testing step 170, a $\chi^2$ statistics of a candidate rule is calculated. When the $\chi^2$ statistics is over the lower limit calculated based on the significant level, the positive association selecting unit 44 performs calculation for checking the candidate rule to be a positive association rule or a negative association rule. Only when the candidate rule is a positive association rule, the candidate rule is stored in the association rule set 3.

The positive-negative checking of candidate rule is performed as follows: In the case of testing a candidate rule A1, A2→B, nc−ab is calculated, where the frequency of [A1, A2] is represented by "a", the frequency of B is represented by "b", the frequency of [A1, A2, B] is represented by "c", and the whole number of records in the database is represented by "n".

When the value of (nc−ab) is positive, the candidate rule is judged to be a positive association rule. By performing the above, only positive association rules are selectively obtained out of association rules.

As stated above, only positive association rules a re stored in the association rule set 3 by using the positive association selecting unit 44. It is also possible to select and store only negative association rules satisfying nc−ab<0 in the association rule set, by using a negative association selecting unit instead of the positive association s electing unit 44. Therefore, only negative association rules are selectively obtained out of association rules.

According to the association rule discovering apparatus and method of the present embodiment, as stated above, the hypothesis generating/testing step includes the positive association selecting step for selecting only positive association rules.

Accordingly, only positive association rules having statistical significance can be obtained.

Embodiment 4.

Referring to FIGS. 7, 8, 9A and 9B, an association rule discovering apparatus and method according to Embodiment 4 will now be explained.

In the above embodiments, a candidate-itemset having length k is generated from a large-itemset having length k−1, and then a candidate rule is generated. In the present embodiment, a candidate rule is generated from a large-itemset L1 having length 1 and a large-itemset Lk−1 having length Ji-1.

Figure 7:
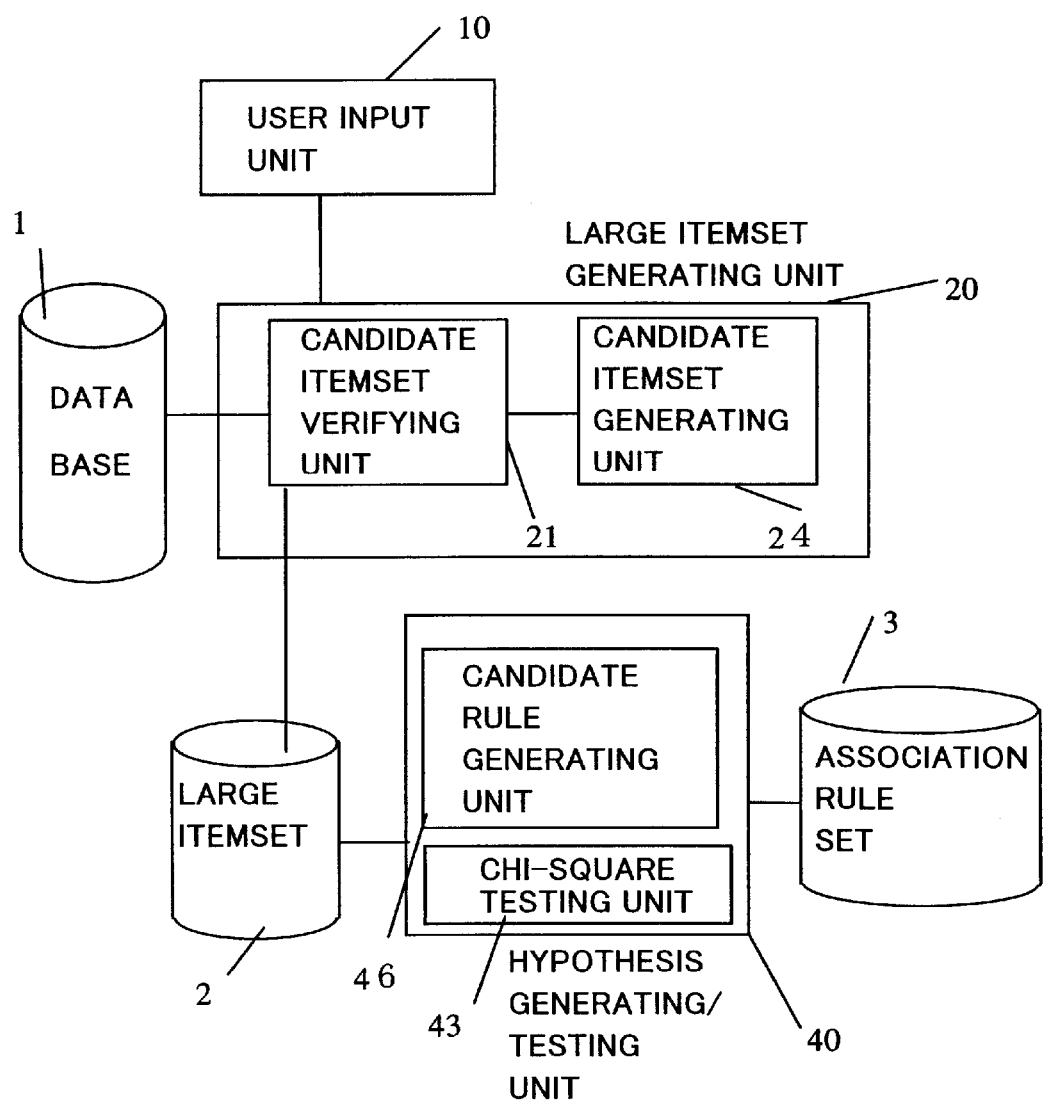
FIG. 7 shows a system of Embodiments 4, 11, 12 and 17 according to the present invention.
Figure 8:
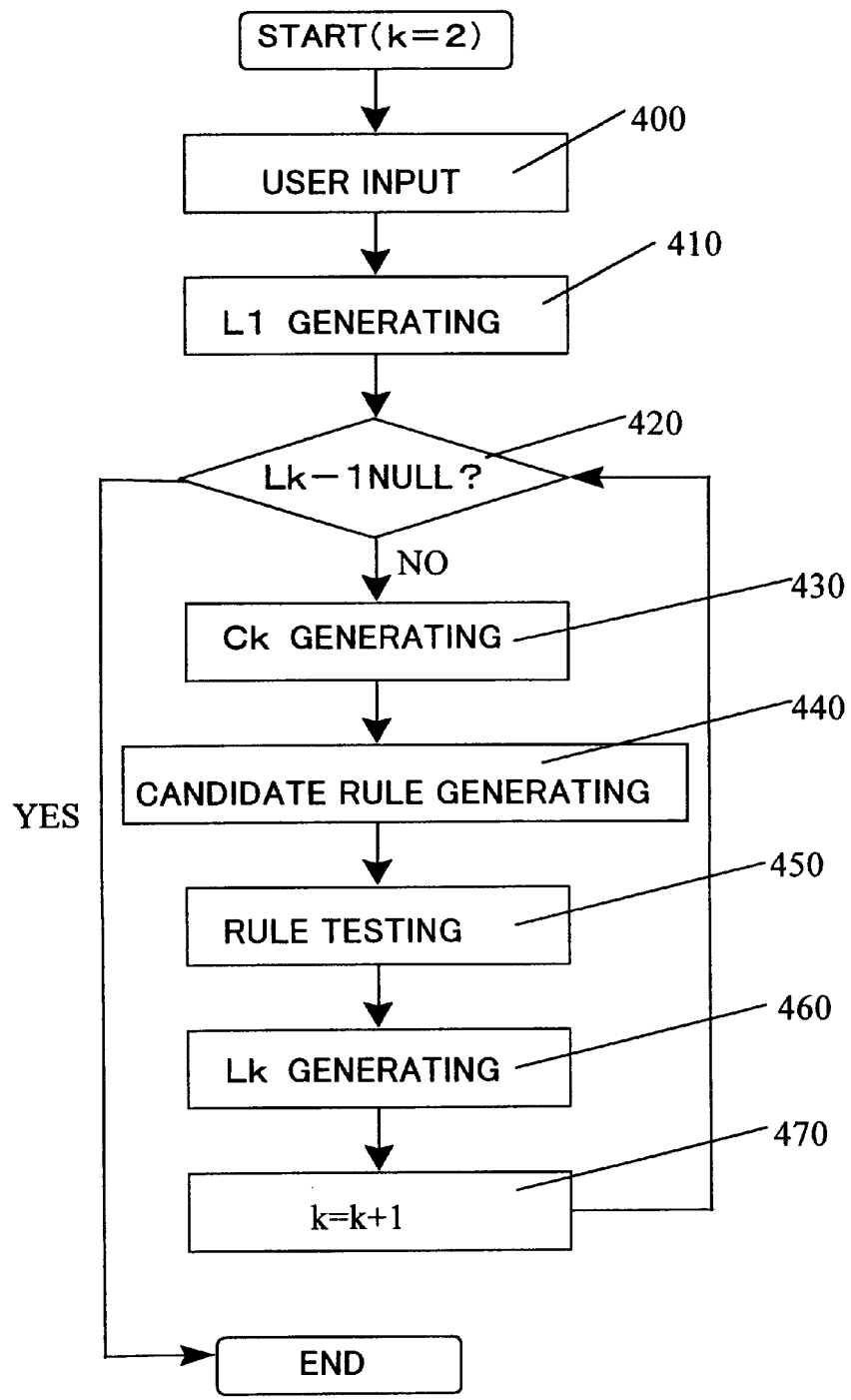
FIG. 8 shows a block diagram of Embodiments 4, 5, 11, 12 and 17 according to the present invention.
Figure 9A:
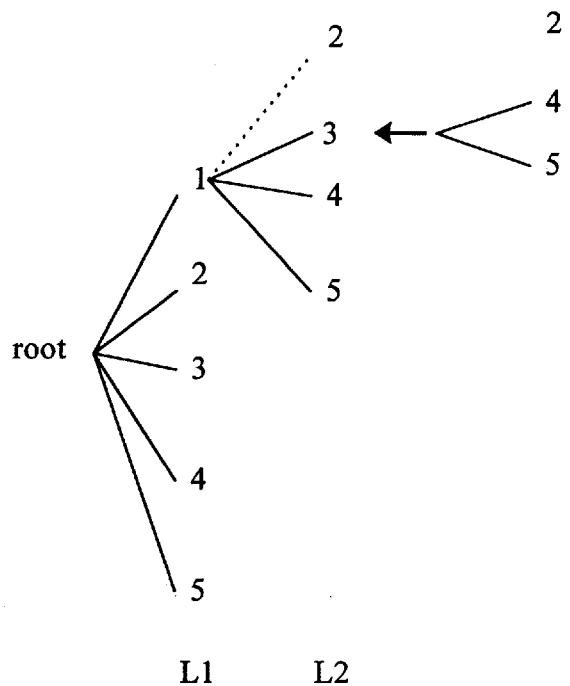
FIG. 9A shows an example of hash-tree before C3 generation used for Ck generating step in Embodiment 4 according to the present invention.
Figure 9B:
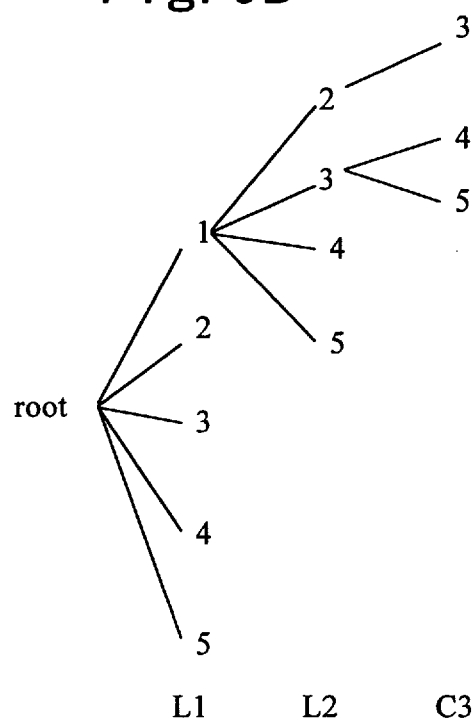
FIG. 9B shows an example of hash-tree after C3 generation used for Ck generating step in Embodiment 4 according to the present invention.

FIG. 7 shows a system of association rule discovering apparatus according to the present embodiment, FIG. 8 is a block diagram showing the association rule discovering apparatus, and FIGS. 9A and 9B show the procedure of generating a candidate-itemset Ck.

The system configuration and operations in FIG. 7 are the same as FIG. 1 of Embodiment 1 except that operations of a candidate-itemset generating unit 24 and a candidate rule generating unit 46 in FIG. 7 differ from the candidate-itemset generating unit 22 and the candidate rule generating unit 41 in FIG. 1.

In FIG. 7, the candidate-itemset generating unit 24 generates a candidate-itemset Ck having length k from a large-itemset having length 1 and a large-itemset having length k−1, and the candidate rule generating unit 46 generates a candidate rule from the large-itemset having length 1, the large-itemset having length k−1, and the candidate-itemset having length k.

Now, the procedure of discovering an association rule according to the present embodiment is explained with reference to FIG. 8. At a user input step 400, a minimum frequency and a significant level are obtained from the user through the user input unit 10.

At an L1 generating step 410, a large-itemset L1 having length 1 is generated. Similar to Embodiment 1, the candidate-itemset verifying unit 21 selects a record from the database 1 one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are registered in the hash-tree.

At a step 420, it is judged whether the large-itemset Lk−1 is null or not. In the initial state, k=2 and L1 is an object to be judged. If Lk−1 is null, the association rule discovering apparatus according to the present embodiment becomes finished, and if not, it goes to the next step, a Ck generating step 430.

At the Ck generating step 430, a candidate-itemset Ck is generated from the large-itemsets L1 and Lk−1, by the candidate-itemset generating unit 24. In this step, every item in L1 is added to a leaf of hash-tree having been made up to the state of Lk−1, and duplicated items are pruned in order to recompose the hash-tree to have an item number at a lower level node is larger than another item number at an upper level node.

This will be explained with reference to the case of k=3 in FIGS. 9A and 9B. Item numbers 1, 2, 3, 4, and 5 in L1 are added to a leaf 3 of [1, 3] in L2. 1 and 3 are deleted because they are included in the itemset [1, 3]. 2, smaller than 3, is relocated to be [1, 2, 3] where 2 is lower than [1] and 3 is lower than [2]. This kind of procedure is performed for every leaf in L2.

Then, a frequency of each candidate-itemset of the generated Ck (in this case C3) is counted in retrieving the database. The matching between the record and the hash-tree is performed similar to Embodiment 1.

At a candidate rule generating step 440, a candidate rule is generated by the candidate rule generating unit 46. In this step 440, one of itemsets in Lk−1 and one of items in L1 are selected one by one. In the case of k=3, when [A1,A2] is selected from L2 and B is selected from L1, the rule A1, A2→B is added to a candidate rule set if B is not included in [A1, A2] (that is, B is neither A1 nor A2) and the rule A1, A2→B has not been included in the candidate rule set being generated. This candidate rule generating process is performed for all the combinations of itemsets in L2 and L1.

At a rule testing step 450, the chi-square testing unit 43 decides whether each of the candidate rules generated by the candidate rule generating unit 41 is to be stored in the association rule set or not. In order to decide to store in the rule set, an LHS frequency and a RHS frequency of each candidate rule are examined to be more than the minimum frequency or not. If both the RHS and LHS frequencies are equal to or more than the minimum frequency, a $\chi^2$ statistics is calculated based on the LHS frequency, the RHS frequency and the BS frequency of the candidate rule. When the $\chi^2$ statistics exceeds the lower limit calculated based on the significant level, the candidate rule is stored in the association rule set.

At an Lk generating step 460, only k-itemset whose frequency is more than the minimum frequency is kept as an Lk element, based on a frequency of the k-itemset in Ck, calculated at the Ck generating step 430. Then, one is added to the value k at a step 470, and it goes back to the step 420.

Namely, the frequency of an itemset including all the items in RHS and LHS is not used in the present embodiment. Rules whose RHS frequency and LHS frequency are more than the minimum frequency and whose $\chi^2$ statistics is over the lower limit of $\chi^2$ calculated based on the significant level, are all obtained in the present embodiment. Therefore, many negative association rules, which can not be obtained in the prior art because their frequencies of itemsets including all the items in the RHS and LHS are low, can be obtained.

As stated above, in the candidate rule generating step according to the method and apparatus of the present embodiment, a candidate association rule where the large-itemset Lk−1 is corresponding to conditions of the association rule and the large-itemset L1 is corresponding to the conclusion of the association rule is generated based on the large-itemset Lk−1 and the large-itemset L1.

Accordingly, association rules including negative association rules can be obtained regardless of the BS frequency.
Embodiment 5.

Figure 10:
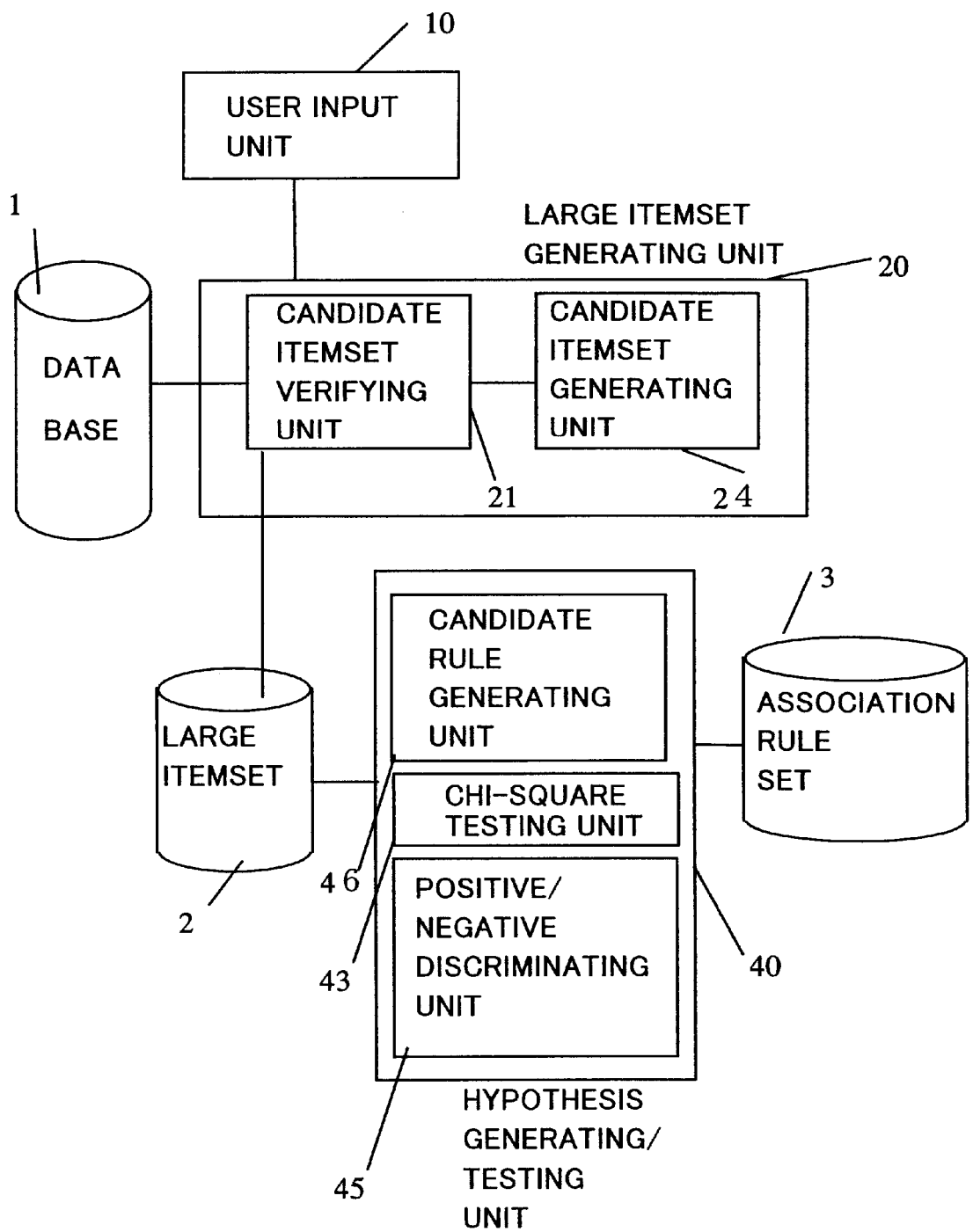
FIG. 10 shows a system of Embodiment 5 according to the present invention.

Referring to FIGS. 8 and 10, an association rule discovering apparatus and method according to Embodiment 5 will now be explained.

In Embodiment 4, an association rule is stored in the association rule set without being checked to be a positive association rule or a negative association rule. In the present embodiment, only positive association rules or negative rules are selected to be stored in the association rule set.

FIG. 8 is a block diagram showing the association rule discovering apparatus according to the present embodiment, and FIG. 10 shows a system of the association rule discovering apparatus.

The system configuration of FIG. 10 is the same as FIG. 7 of Embodiment 4 except a positive/negative discriminating unit 45 in FIG. 10. The positive/negative discriminating unit 45 checks whether a rule whose $\chi^2$ statistics is over the lower limit calculated based on the significant level is a positive association rule or a negative association rule. Operations in FIG. 8 are the same as those of Embodiment 4 except the operation of the rule testing step 450 performed by the positive/negative discriminating unit 45.

Now, referring to FIG. 8, the procedure of discovering an association rule will be explained.

At the rule testing step 450, a $\chi^2$ statistics of a candidate rule is calculated. When the $\chi^2$ statistics is over the lower limit calculated based on the significant level, the positive/negative discriminating unit 45 calculates for checking the candidate rule to be a positive association rule or a negative association rule. Only candidate rules for positive association rules or only candidate rules for negative association rules are stored in the association rule set.

The positive-negative checking of candidate rule is performed as follows: In the case of testing a candidate rule A1, A2→B, $$nc-ab \quad (2)$$

is calculated, where the frequency of [A1, A2] is represented by "a", the frequency of B is represented by "b", the frequency of [A1, A2, B] is represented by "c", and the whole number of records in the database is represented by "n".

If the value of (nc−ab) is positive, the candidate rule is judged to be a positive association rule. If the value of (nc−ab) is negative, the candidate rule is judged to be a negative association rule. After the judging, the candidate rule is stored in the association rule set 3.

The ratio of LHS itemset to the whole record number is represented by a/n, the ratio of RHS item to the whole record number is represented by b/n, and an expected value of the ratio of itemset including all the items in RHS and LHS to the whole record number is ab/n². The difference between the actual ratio c/n and the expected value ab/n² is $$(nc-ab)/n^2 \quad (3)$$

The expression (2) is a numerator of the expression (3). Namely, discriminating an association rule to be positive or negative depends on whether the difference between an actual value and an expected value based on frequencies of RHS, LHS, and BS is positive or negative.

Storing only positive association rules in the association rule set or only negative rules in it can be appointed by the user through the user input unit 10, or has been already specified in the system in advance.

Namely, the association rule discovering method according to the present embodiment has the hypothesis generating/testing step including the positive/negative discriminating step for checking association rules to be positive or negative and for storing only positive association rules or only negative association rules. All the steps in the present method are performed by the association rule discovering apparatus according to the present embodiment.

Accordingly, only positive association rules or only negative association rules are effectively selected.

Embodiment 6.

Figure 11:
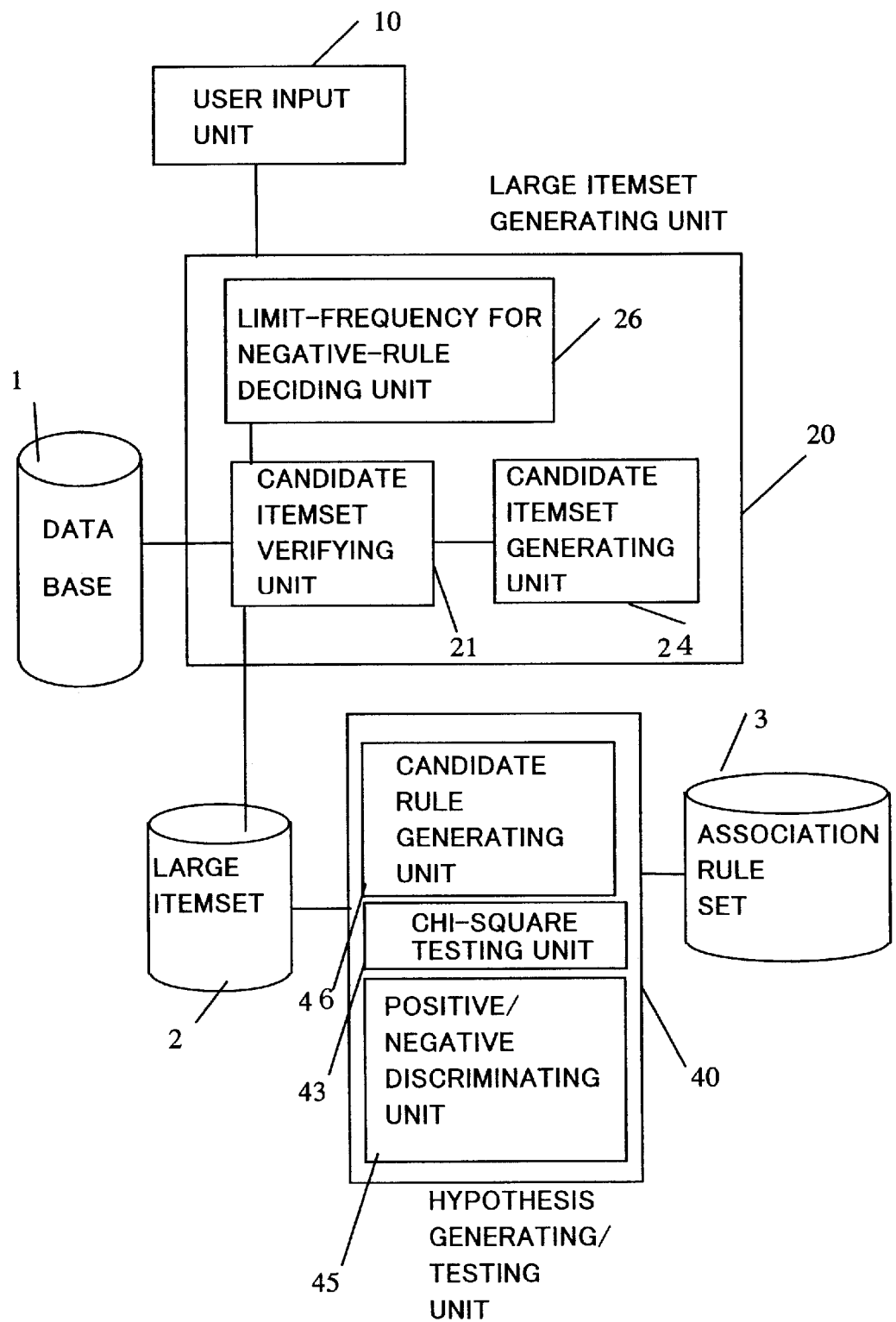
FIG. 11 shows a system of Embodiment 6 according to the present invention.
Figure 12:
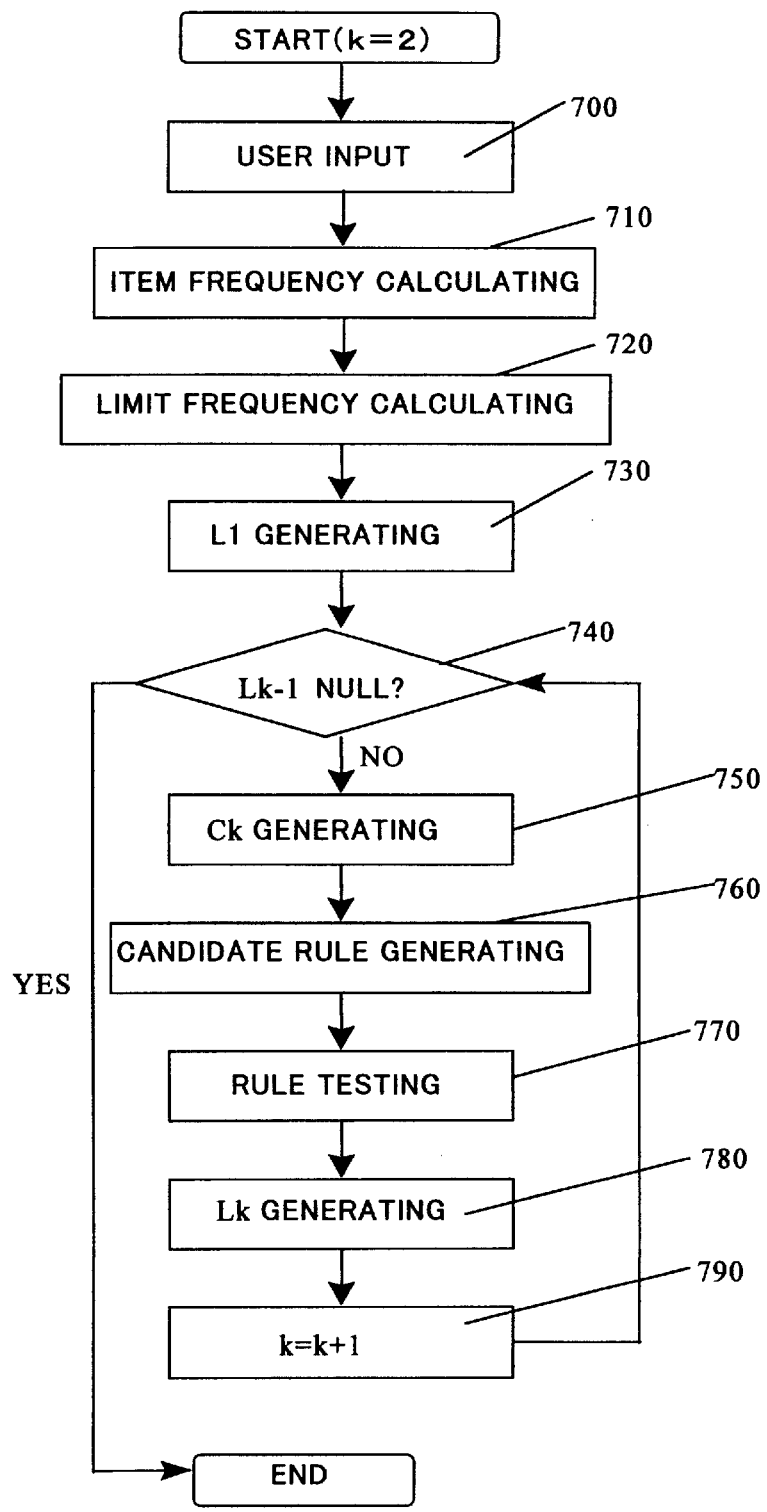
FIG. 12 shows a block diagram of Embodiments 6 and 8 according to the present invention.
Figure 13:
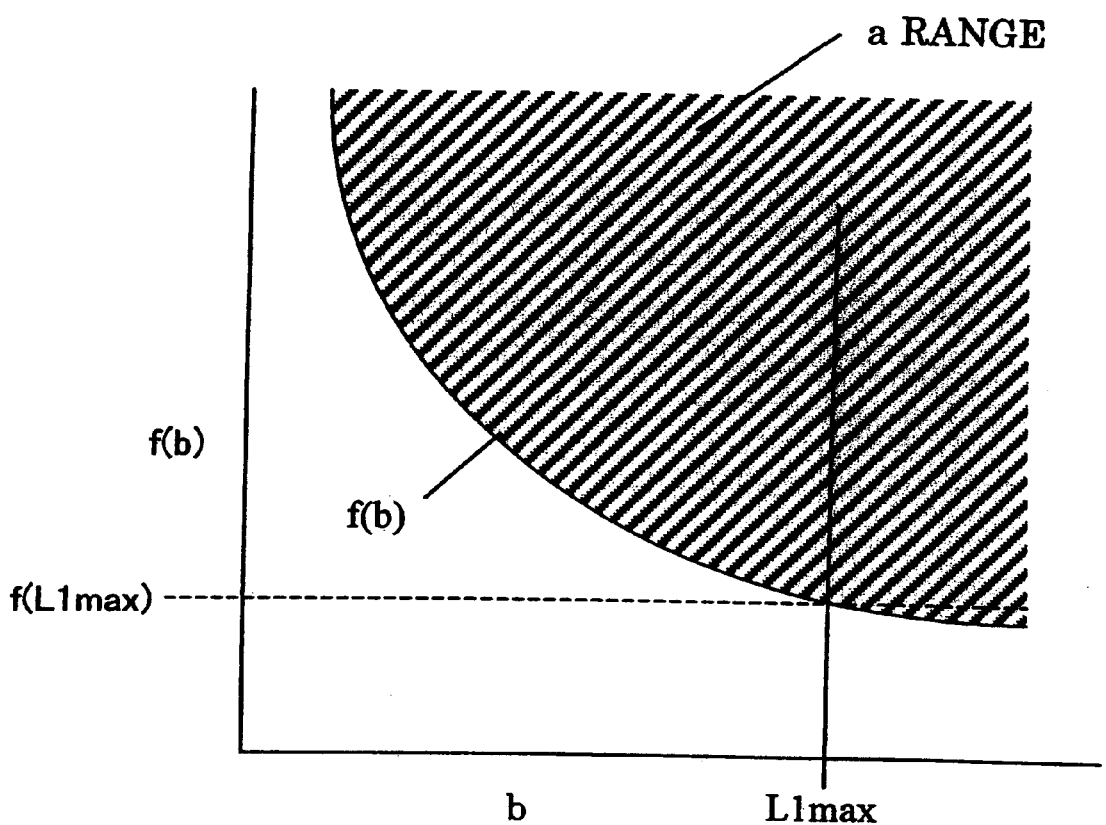
FIG. 13 shows a relation between the right hand side frequency and the left hand side frequency in Embodiment 6 according to the present invention.

Referring to FIGS. 11 through 13, an association rule discovering apparat us and method according to Embodiment 6 will now be explained.

In the above embodiments, the minimum frequency and the significant level are input by the user. In the present embodiment, it is not necessary to obtain the minimum frequency through the user. The system automatically sets a parameter "limit frequency" corresponding to the minimum frequency, in the negative association rule selecting system.

FIG. 11 shows a system of the association rule discovering apparatus of the present embodiment, FIG. 12 is a block diagram showing the association rule discovering apparatus, and FIG. 13 explains how to decide the limit frequency for the association rule discovering apparatus.

The system configuration and operations in FIG. 11 are the same as FIG. 10 of Embodiment 5 except the user input unit 10 and a new element, limit-frequency for negative-rule deciding unit 26.

The user input unit 10 obtains only a significant level from the user, and the limit-frequency for negative-rule deciding unit 26 decides a limit frequency corresponding to the minimum frequency in Embodiment 5, by using the largest frequency in the frequencies of all the items.

Now, the procedure of discovering an association rule according to the present embodiment is explained with reference to FIG. 12. At a user input step 700, a significant level is obtained from the user through the user input unit 10.

At an item frequency calculating step 710, the candidate-itemset verifying unit 21 retrieves the database and calculates frequencies of all the items in the records of the database.

At a limit frequency calculating step 720, the limit-frequency for negative-rule deciding unit 26 decides a limit frequency corresponding to the minimum frequency in Embodiment 5. In the calculation performed at this step, the largest frequency in the frequencies calculated at the item frequency calculating step is represented by "L1max", the lower limit of $\chi^2$ calculated based on the significant level is represented by "α", and the number of records in the database is represented by "n". The calculation performed at the limit frequency calculating step is as follows:

$$\frac{\alpha n(n - L_{1\max})}{nL_{1\max} + \alpha(n - L_{1\max})}$$

The reason for defining the above value as the limit frequency will be explained. For instance, the candidate rule $$A, \ldots, A_{k-1} \to B$$

meaning there is a negative association between A1, . . . , $A_{k-1}$ and B is tested when the frequency of A1, . . . , $A_{k-1}$ is represented by a, the frequency of B is b, the frequency of A1, . . . , $A_{k-1}$, B is c, and the total number of records in the database is n. $\chi^2$ statistics is $$x^2 = \frac{n(nc - ab)^2}{ab(n - a)(n - b)}$$

To make this value be equal to or more than the lower limit value α based on the significant level, $$\frac{n(nc - ab)^2}{ab(n - a)(n - b)} \geq \alpha$$

the above is needed as the condition. Now the above is calculated with respect to c, under the condition of ncab<0.

$$c \leq \frac{ab}{n} - \frac{1}{n}\sqrt{\frac{\alpha ab(n - a)(n - b)}{n}}.$$

As c≧0, the right side of this inequality should be more than 0. Therefore, the below should be obtained.

$$a \geq \frac{\alpha n(n - b)}{nb + \alpha(n - b)}$$

Defining the above right side as the function regarding b, that is f(b), the function is monotone decreasing function as follows:

$$a \geq \frac{\alpha n(n - L_{1\max})}{nL_{1\max} + \alpha(n - L_{1\max})}$$

Now, the above is explained with reference to FIG. 13. FIG. 13 shows the relation between "a" and "b", meaning that "a"

should be a value in the slant line part indicating equal to or more than f(b). It is necessary for "a" to be equal to or more than f(L1max).

As the above expressions show that "a" and "b" have a relation like a symmetric function, "a" and "b" in FIG. 13 can be replaced each other. Namely, "b" must be equal to or more than f(a) in the relation between "b" and "a", meaning that "b" must be a value in the slant line part. Further, since the value of "a" is equal to or less than L1max, it is necessary for "b" to be equal to or more than f(L1max) in order to become the value in the slant line part.

Accordingly, the itemset frequencies of RHS and LHS of the association rule in which a $\chi^2$ statistics is equal to or more than the lower limit calculated based on the significant level, absolutely need to be more than the limit frequency.

At an L1 generating step 730, items whose frequencies calculated by the candidate-itemset verifying unit 21 at the item frequency calculating step 710 are more than the limit frequency, are added to the itemset L1 as 1 itemsets.

Operations performed at the steps after the L1 generating step 730 in FIG. 12 are the same as those performed at the identical name steps in FIG. 8 of Embodiment 5. However, at a rule testing step 770, a $\chi^2$ statistics is calculated for a candidate rule whose both the RHS and LHS frequencies are equal to or more than the limit frequency. Then, nc−ab is calculated so as to be judged to be positive or negative, by the positive/negative discriminating unit 45. A negative association rule whose nc−ab value is negative is selected.

As stated above, according to the association rule discovering method and apparatus of the present embodiment, it is not necessary for the user to appoint the minimum frequency. A large-itemset is generated by using a limit frequency calculated based on the lower limit depending upon the significant level. Then, an association rule is evaluated and selected by using a $\chi^2$ statistics regardless of the BS frequency. Accordingly, negative association rules statistically evaluated are effectively obtained.

As stated above, the association rule discovering method described in the present embodiment includes the step for deciding limit-frequency for negative-rule in the large-itemset generating step. At the limit-frequency for negative-rule deciding step, the frequency lower limit value Smin is calculated by using the largest frequency in the frequencies of all the items. The association rule discovering apparatus according to the present embodiment performs, all the steps described in the discovering method including the above step.

Since it is not necessary to test candidate rules which have useless frequencies, negative association rules are effectively obtained.

Embodiment 7.

Figure 14:
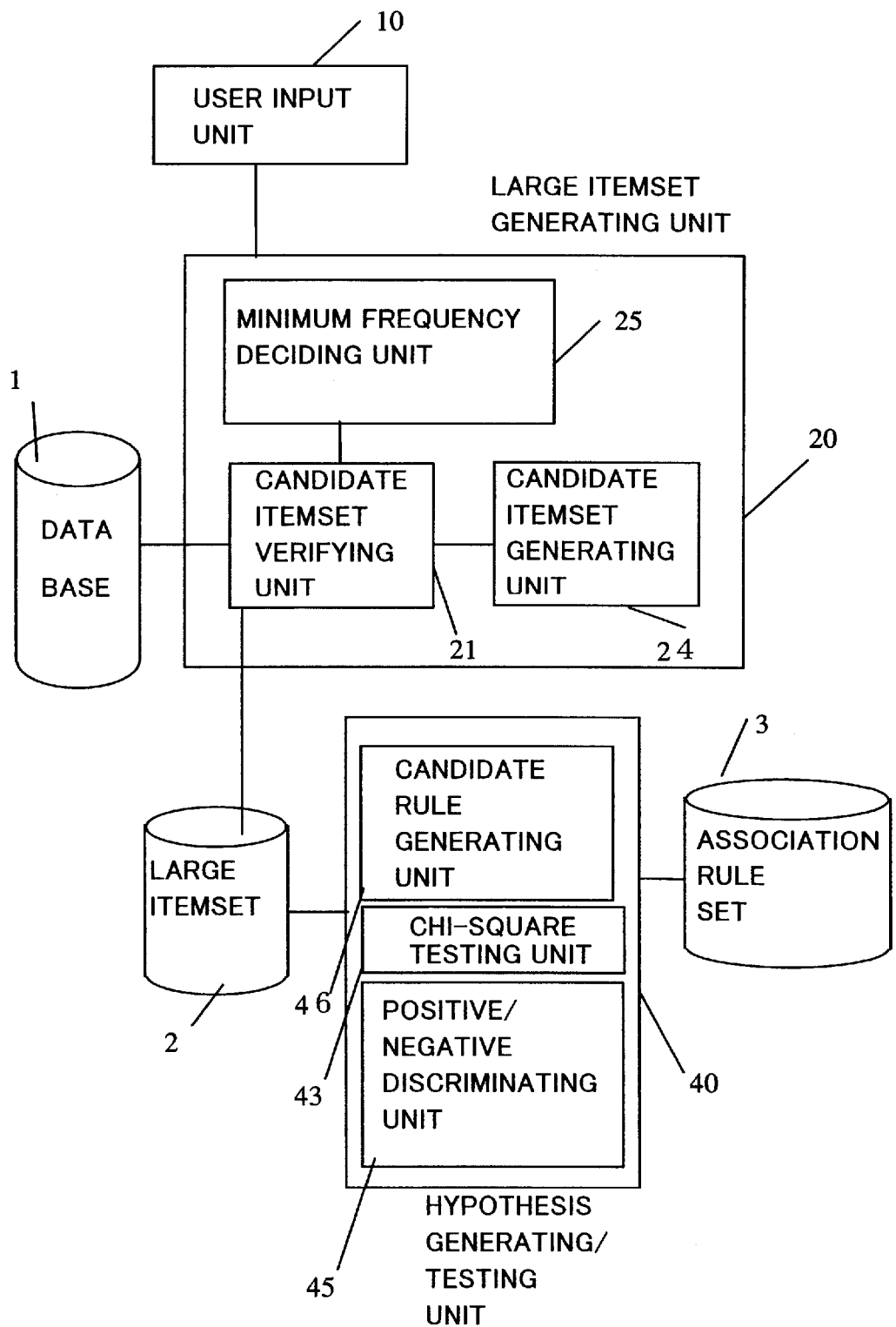
FIG. 14 shows a system of Embodiment 7 according to the present invention.
Figure 15:
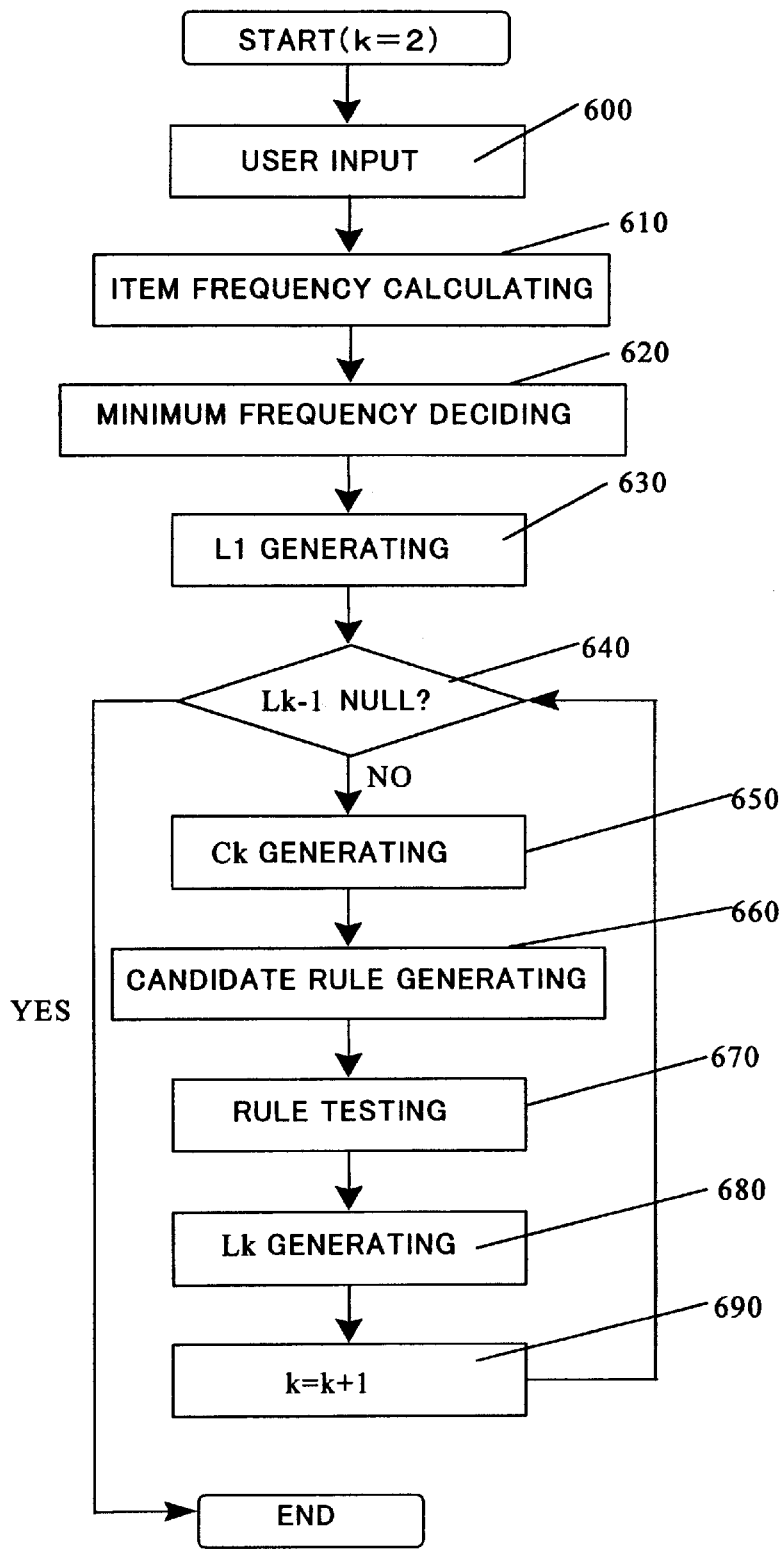
FIG. 15 shows a block diagram of Embodiment 7 according to the present invention.

Referring to FIGS. 13 through 15, an association rule discovering apparatus and method according to Embodiment 7 will now be explained. In Embodiment 6, the parameter "limit frequency" corresponding to the minimum frequency is automatically set in the negative association rule selecting system. In this Embodiment 7, the smallest frequency in the frequencies of 1 itemsets is defined as a minimum frequency.

FIG. 13 explains the limit frequency described in Embodiment 6, FIG. 14 shows a system of association rule discovering apparatus of the present embodiment, and FIG. 15 is a block diagram showing the association rule discovering apparatus.

The system configuration and operations in FIG. 14 are the same as FIG. 10 of Embodiment 5 except the user input unit 10 and a new element, minimum frequency deciding unit 25.

The user input unit 10 obtains only a significant level from the user, and the minimum frequency deciding unit 25 decides the smallest frequency in the frequencies of all the items as a minimum frequency.

Now, the procedure of discovering an association rule according to the present embodiment is explained with reference to FIG. 15. At a user input step 600, a significant level is obtained from the user through the user input unit 10. At an item frequency calculating step 610, the candidate-itemset verifying unit 21 retrieves the database and calculates frequencies of all the items in the records of the database.

At a minimum frequency deciding step 620, the minimum frequency deciding unit 25 decides the smallest frequency in the frequencies calculated at the item frequency calculating step 610 as a minimum frequency. At an L1 generating step 630, 1 itemsets of all the items are registered in L1.

Operations performed at the steps after the L1 generating step 630 in FIG. 15 are the same as those performed at the identical name steps in FIG. 8 of Embodiment 4. At a rule testing step 670, negative association rules are selected by the positive/negative discriminating unit 45 and stored in the association rule set 3.

In the present embodiment, it is utilized that the smallest frequency of an item in the general database is smaller than the f(L1max) explained in Embodiment 6. This is because, as shown in FIG. 13, the RHS frequency and the LHS frequency of an association rule whose $\chi^2$ statistics is equal to or more than the lower limit calculated based on the significant level, are necessarily more than the minimum frequency of the present embodiment.

As stated above, according to the association rule discovering method and apparatus of the present embodiment, it is not necessary for the user to appoint the minimum frequency. A large-itemset is generated by using the smallest frequency, in the frequencies of all the items, automatically decided by the minimum frequency deciding unit 25. Namely, an association rule is evaluated and selected by using a×2 statistics regardless of a BS frequency. Accordingly, negative association rules statistically evaluated are effectively obtained.

The association rule discovering method described in the present embodiment includes the step for deciding the smallest frequency of an item as the frequency lower limit value Smin, in the large-itemset generating step.

Embodiment 8.

Figure 16:
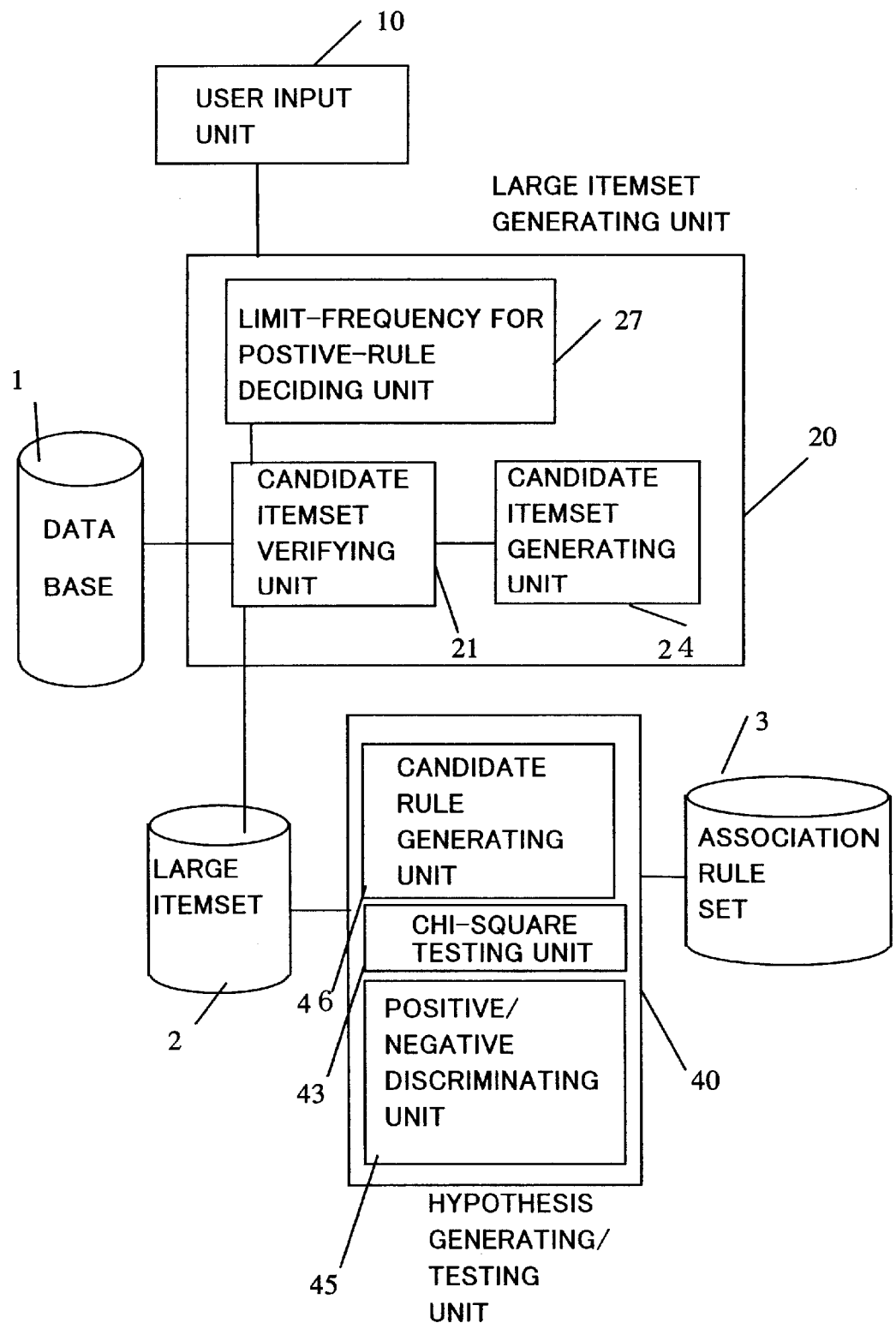
FIG. 16 shows a system of Embodiment 8 according to the present invention.

Referring to FIGS. 12 and 16, an association rule discovering apparatus and method according to Embodiment 8 will now be explained.

In Embodiment 6, the "limit frequency" corresponding to the minimum frequency is calculated in selecting negative association rules. In this Embodiment 8, the "limit frequency" is calculated in selecting positive association rules.

FIG. 12 is a block diagram showing an association rule discovering apparatus according to the present embodiment, and FIG. 16 shows a system of the association rule discovering apparatus of the present embodiment.

The system configuration and operations in FIG. 16 are the same as FIG. 10 of Embodiment 5 except the user input unit 10 and a new element, limit-frequency for positive-rule deciding unit 27.

The user input unit 10 obtains only a significant level from the user, and the limit-frequency for positive-rule deciding unit 27 decides a limit frequency corresponding to the minimum frequency in Embodiment 5, by using the smallest frequency in the frequencies of all the items.

Now, the procedure of discovering an association rule according to the present embodiment is explained with reference to FIG. 12. At the user input step 700, a significant level is obtained from the user through the user input unit 10.

At the item frequency calculating step 710, the candidate-itemset verifying unit 21 retrieves the database and calculates frequencies of all the items in the records of the database.

At the limit frequency calculating step 720, the limit-frequency for positive-rule deciding unit 27 decides a limit frequency corresponding to the minimum frequency in Embodiment 5. In the calculation performed at this step, the smallest frequency in the frequencies calculated at the item frequency calculating step 710 is represented by "L1min", the lower limit of $\chi^2$ calculated based on the significant level is represented by "$\alpha$", and the number of records in the database is represented by "n".

The calculation performed in the limit frequency calculating step 720 is as follows:

$$\frac{\alpha n L_{1min}}{n(n - L_{1min}) + \alpha L_{1min}}$$

The reason for defining the above value as the limit frequency will be explained. For instance, the candidate rule $$A1, \ldots, A_{k-1} \to B$$

is tested when the frequency of $A1, \ldots, A_{k-1}$ is represented by a, the frequency of B is b, the frequency of $A1, \ldots, A_{k-1}$, B is c, and the total number of records in the database is n. $\chi^2$ statistics is $$x^2 = \frac{n(nc - ab)^2}{ab(n-a)(n-b)}$$

To make this value be more than the lower limit value based on the significant level, $$\frac{n(nc - ab)^2}{ab(n-a)(n-b)} \geq \alpha$$

the above is needed as the condition. Now the above is calculated with respect to c, under the condition of nc−ab>0.

$$c \geq \frac{ab}{n} + \frac{1}{n}\sqrt{\frac{\alpha ab(n-a)(n-b)}{n}}$$

It is supposed that a>b. Since it is b≧c, $$b \geq \frac{ab}{n} + \frac{1}{n}\sqrt{\frac{\alpha ab(n-1)(n-b)}{n}}$$

Calculating the above as to b, the following is obtained.

$$b \geq \frac{\alpha an}{n(n-a) + \alpha a}$$

Defining the above right side as the function regarding a, the function is monotone increasing function as follows:

$$b \geq \frac{\alpha n L_{1min}}{n(n - L_{1min}) + \alpha L_{1min}}$$

This inequality also obtains when b is substituted for a. Accordingly, the itemset frequencies of RHS and LHS of the association rule whose $\chi^2$ statistics is equal to or more than the lower limit calculated based on the significant level, absolutely need to be more than the limit frequency.

At the L1 generating step 730, items whose frequencies calculated by the candidate-itemset verifying unit 21 at the item frequency calculating step 710 are more than the limit frequency, are added to the itemset L1 as 1 itemsets.

Operations performed at the steps after the L1 generating step 730 in FIG. 12 are the same as those performed at the identical name steps in FIG. 8 of Embodiment 5. However, at the rule testing step 770, a $\chi^2$ statistics is calculated for a candidate rule whose both the RHS and LHS frequencies are equal to or more than the limit frequency. Then, nc−ab is calculated so as to be judged to be positive or negative, by the positive/negative discriminating unit 45. A positive association rule whose nc−ab value is positive is selected.

As stated above, according to the association rule discovering method and apparatus of the present embodiment, it is not necessary for the user to appoint the minimum frequency. A large-itemset is generated by using a limit frequency calculated based on the lower limit depending upon the significant level. Then, an association rule is evaluated and selected by using a $\chi^2$ statistics regardless of a BS frequency. Accordingly, positive association rules statistically evaluated are effectively obtained.

As stated above, the association rule discovering method described in the present embodiment includes the step for deciding limit-frequency for positive-rule in the large-itemset generating step. At the limit-frequency for positive-rule deciding step, the frequency lower limit value Smin is calculated by using the smallest frequency in the frequencies of all the items. The association rule discovering apparatus according to the present embodiment performs all the steps described in the discovering method including the above step.

Since it is not necessary to test candidate rules which have useless frequencies, positive association rules are effectively obtained.

Embodiment 9.

Figure 17:
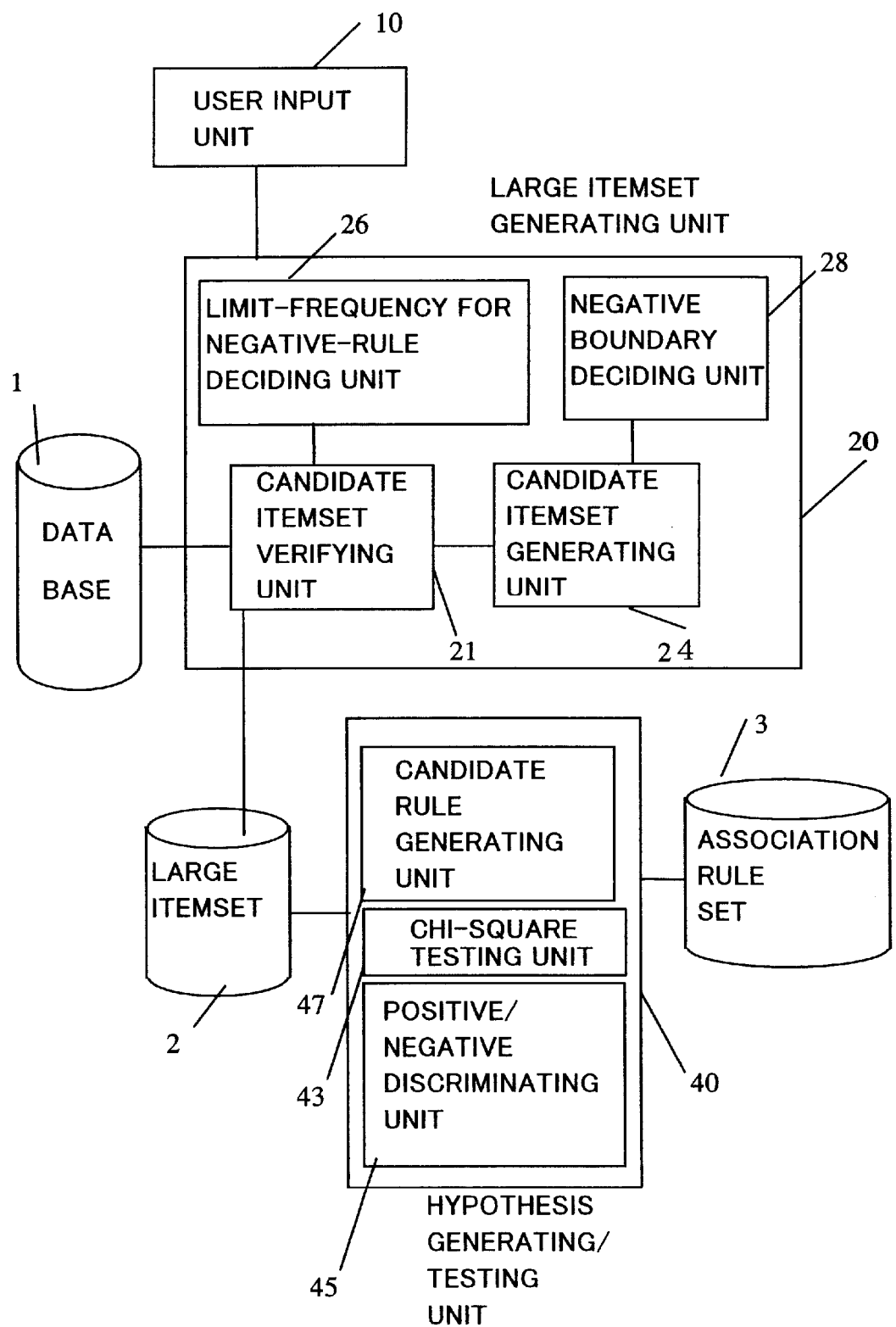
FIG. 17 shows a system of Embodiment 9 according to the present invention.
Figure 18:
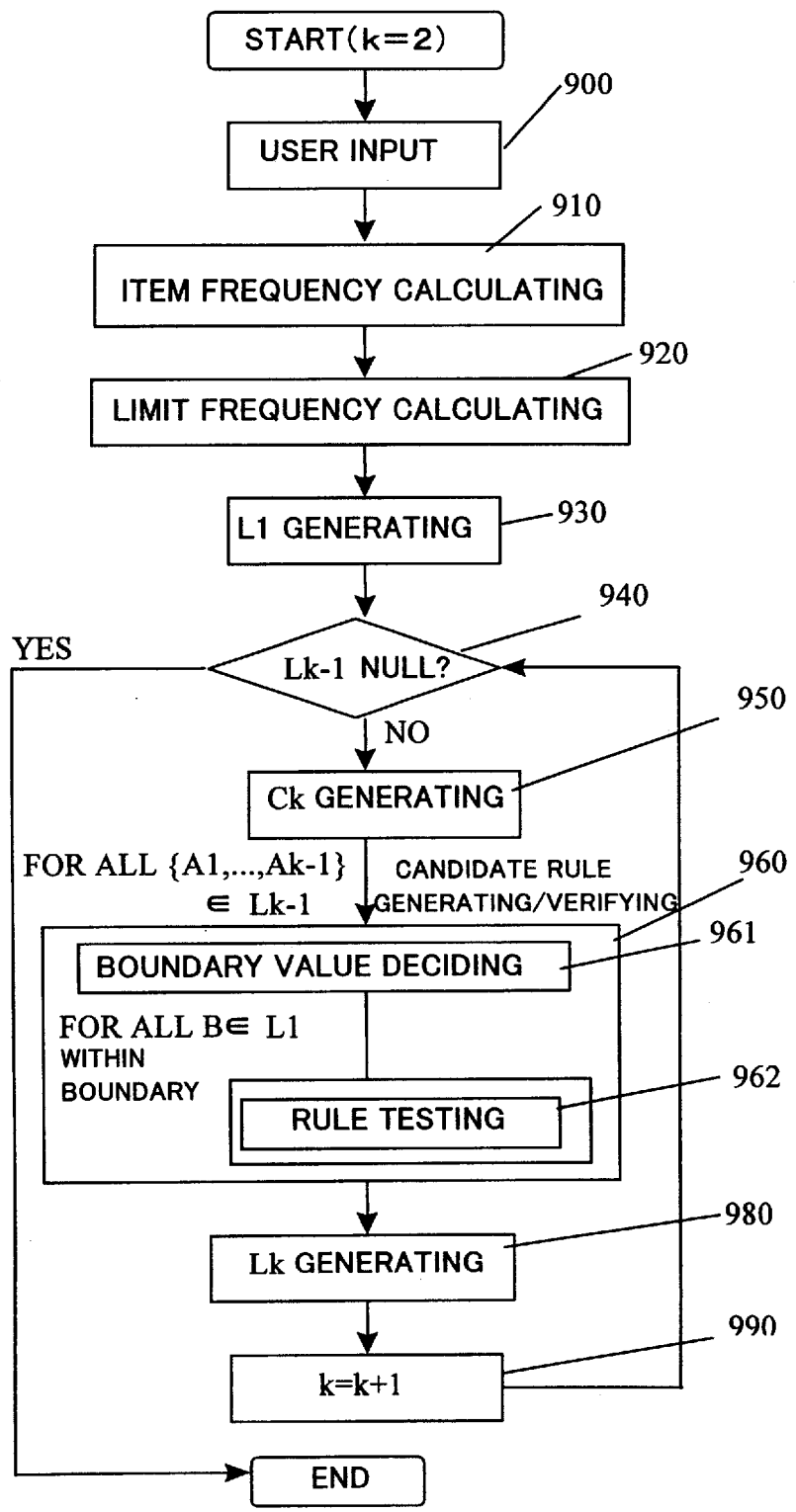
FIG. 18 shows a block diagram of Embodiments 9 and 10 according to the present invention.

Referring to FIGS. 17 and 18, an association rule discovering apparatus and method according to Embodiment 9 will now be explained.

In the system for selecting negative association rules of Embodiment 6, a limit frequency is calculated by using the largest frequency in the frequencies of all the items, and the chi-square test is performed for candidate rules whose both the frequencies of RHS and LHS are equal to or more than the limit frequency. In this Embodiment 9, a boundary value to be kept or exceeded by a RHS frequency is calculated by using a LHS frequency, and the chi-square test is performed only for candidate rules which satisfy the boundary value.

FIG. 17 shows a system of association rule discovering apparatus of the present embodiment, and FIG. 18 is a block diagram showing the association rule discovering apparatus.

The system configuration and operations in FIG. 17 are the same as FIG. 11 of Embodiment 6 except a new element, negative boundary deciding unit 28. The negative boundary deciding unit 28 calculates the smallest frequency to be kept or exceeded by a RHS frequency, by using an itemset frequency of LHS.

Now, the procedure of discovering an association rule according to the present embodiment is explained with reference to FIG. 18. Operations performed in the steps of FIG. 18 are the same as those performed at the identical name steps in FIG. 12 of Embodiment 6 except a candidate rule generating/verifying step 960.

At the candidate rule generating/verifying step 960, a candidate rule is generated by a candidate rule generating unit 47. Each itemset in Lk−1 is selected one by one. Then, per each selected itemset, the lowest frequency to be kept or exceeded by a frequency of RHS item is calculated by the negative boundary deciding unit 28. For instance, when an itemset A1, A2, . . . , Ak−1 is selected from Lk−1, the lowest frequency is calculated by the following expression, where the frequency of A1, A2, . . . , Ak−1, appearing in Lk−1, is represented by "a", the lower limit of $\chi^2$ calculated based on the significant level is represented by "α", and the whole number of records in the database is represented by "n".

$$\frac{\alpha n(n-a)}{na + \alpha(n-1)}$$

The reason for defining the above value as the lower limit value will be explained. For instance, the candidate rule $$A1, \ldots, A_{k-1} \rightarrow B$$

is tested on the condition that the frequency of B (written in L1) is represented by b, and the frequency of A1, . . . , $A_{k-1}$, B (written in Ck) is c. $\chi^2$ statistics is the below:

$$x^2 = \frac{n(nc-ab)^2}{ab(n-a)(n-b)} > \alpha$$

Since it is c≧0, $$b \geq \frac{\alpha n(n-a)}{na + \alpha(n-a)}$$

Therefore, when A1, A2, . . . , Ak−1 is LHS, the frequency of RHS item should be more than the above boundary value. After the boundary value is decided, each 1 itemset in L1 having a frequency more than the boundary value is checked to be RHS of a rule or not, at a rule testing step 962.

Now, the operation of the rule testing step 962, when B is selected from L1, will be explained.

The candidate rule generating unit 47 verifies whether B is included in the itemset A1, A2, . . . , Ak−1 or not. If B is not included, a $\chi^2$ statistics of the rule A1, A2, . . . , Ak−1, →-, B is calculated based on each candidate rule's RHS, LHS, and BS frequencies, by using the chi-square testing unit 43. The rule A1, A2, . . . , Ak−1, →-, B means that the case A1, A2, . . . , Ak−1 is not the case B. Then, if the $\chi^2$ statistics exceeds the lower limit of $\chi^2$ calculated based on the significant level, the candidate rule is stored in the association rule set 3.

According to the present embodiment, as stated above, candidate rules whose $\chi^2$ statistics will be calculated are selected by calculating each frequency lower limit of RHS item corresponding to each large-itemset of LHS. Therefore, negative association rules can be effectively obtained.

Namely, the association rule discovering method of the present embodiment has the hypothesis generating/testing step including the negative boundary deciding step. The negative boundary deciding step calculates the lower limit value Tmin of frequency of the large-itemset L1 having been used in generating the candidate association rule, by using the frequency of the large-itemset Lk−1 having been used in generating the candidate association rule and being a pair to the large-itemset L1. Then, at the rule testing step, the chi-square test is performed only for a candidate association rule generated based on a large-itemset L1 having the frequency equal to or more than the lower limit value Tmin and a large-itemset Lk−1 being a pair to the large-itemset L1.

As it is not necessary for the user to input a minimum frequency and no candidate rule having a useless frequency is tested, negative association rules can be effectively obtained.

Embodiment 10.

Figure 19:
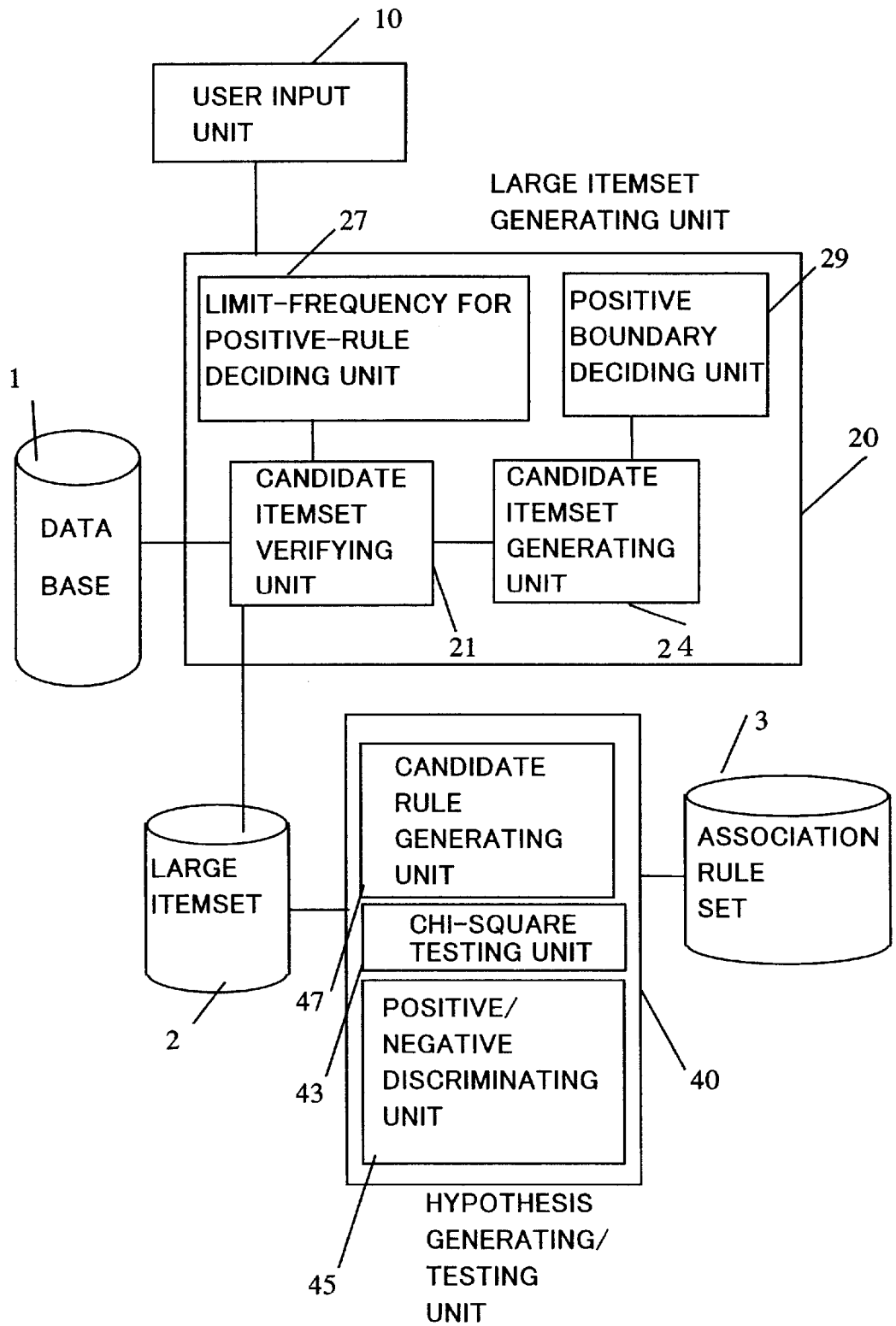
FIG. 19 shows a system of Embodiment 10 according to the present invention.

Referring to FIGS. 18 and 19, an association rule discovering apparatus and method according to Embodiment 10 will now be explained.

In the system for selecting positive association rules of Embodiment 8, a limit frequency is calculated by using the smallest frequency in the frequencies of all the items, and the chi-square test is performed for candidate rules whose both the frequencies of RHS and LHS are equal to or more than the limit frequency.

In this Embodiment 10, a boundary value range which RHS frequency should be in, is calculated by using a LHS frequency, and the chi-square test is performed only for candidate rules satisfying the boundary value range.

FIG. 18 is a block diagram showing the association rule discovering apparatus of the present embodiment and FIG. 19 shows a system of the association rule discovering apparatus.

The system configuration and operations in FIG. 19 are the same as FIG. 11 of Embodiment 6 except a new element, positive boundary deciding unit 29.

The positive boundary deciding unit 29 calculates frequency range (upper limit and lower limit) to be satisfied by the RHS item, by using a frequency of LHS itemset.

Now, the procedure of discovering an association rule according to the present embodiment is explained with reference to FIG. 18. Operations performed in the steps of FIG. 18 are the same as those performed at the identical name steps in FIG. 12 of Embodiment 6 except the candidate rule generating/verifying step 960.

At the candidate rule generating/verifying step 960, a candidate rule is generated by the candidate rule generating unit 47.

Each itemset in Lk−1 is selected one by one. Then, per each selected itemset, the lower limit value and the larger limit value of the frequency to be satisfied by RHS item are calculated by the positive boundary deciding unit 29. For instance, when an itemset A1,A1,k−1 is selected from Lk−1, the lower limit value and the larger limit value of the frequency are calculated by the following expression, where the frequency of A1, A2, . . . , $A_{k-1}$, appearing in Lk−1, is represented by "a", the lower limit of $\chi^2$ calculated based on the significant level is represented by "α", and the whole number of records in the database is represented by "n". The lower limit value is calculated as follows:

$$\frac{\alpha n a}{n[n-a] + \alpha a}$$

The upper limit value is calculated as follow:

$$\frac{n^2 a}{n(\alpha + a) - \alpha a}$$

The reason for defining the above two as the lower and upper limit values is explained. For instance, the candidate rule $$A1, \ldots, A_{k-1} \rightarrow B$$

is tested on the condition that the frequency of B (written in L1) is represented by b, and the frequency of A1, . . . , $A_{k-1}$, B (written in Ck) is c. $\chi^2$ statistics is the below:

$$x^2 = \frac{n(nc - ab)^2}{ab(n - a)(n - b)} > \alpha$$

Now the above is calculated with respect to c.
In the case of a>b, as it is b≧c, the following is obtained:

$$b \geq \frac{\alpha n a}{n(n-1) + \alpha a}$$

In the case of b≧a, as it is a≧c, the following is obtained:

$$b \leq \frac{n^2 a}{n(\alpha + a) - \alpha a}$$

Therefore, when A1, A2, . . . , Ak−1 is LHS, the frequency of RHS item should be within the boundary value (that is, between the larger limit and the lower limit). After the boundary value is decided, each 1 itemset in L1 having a frequency within the boundary value is checked to be RHS of a rule or not, at the rule testing step 962.

Now, the operation at the rule testing step 962 when B is selected from L1, will be explained.

The candidate rule generating unit 47 verifies whether B is included in the itemset A1, A2, . . . , Ak−1 or not. If B is not included, a $\chi^2$ statistics of the rule A1, A2, . . . , Ak−1, →B is calculated based on each candidate rule's RHS, LHS, and BS frequencies, by using the chi-square testing unit 43. Then, if the $\chi^2$ statistics exceeds the lower limit of $\chi^2$ calculated based on the significant level, the candidate rule is stored in the association rule set 3.

According to the present embodiment, as stated above, candidate rules whose $\chi^2$ statistics will be calculated are selected by calculating each frequency range of RHS item corresponding to each large-itemset of LHS. Therefore, positive association rules can be effectively obtained.

Namely, the association rule discovering method of the present embodiment has the hypothesis generating/testing step including the positive boundary deciding step. The positive boundary deciding step calculates the frequency lower limit value Umin and the frequency larger limit value Umax of the large-itemset L1 having been used in generating the candidate association rule, by using the frequency of the large-itemset Lk−1 having been used in generating the candidate association rule and being a pair to the large-itemset L1.

Then, at the rule testing step, the chi-square test is performed only for a candidate association rule, generated based on a large-itemset L1 having the frequency within the lower limit value Umin and the larger limit value Umax, and a large-itemset Lk−1 being a pair to the large-itemset L1, at the rule testing step.

As it is not necessary for the user to input a minimum frequency and no candidate rule having a useless frequency is tested, positive association rules can be effectively obtained.

Embodiment 11.

Figure 20:
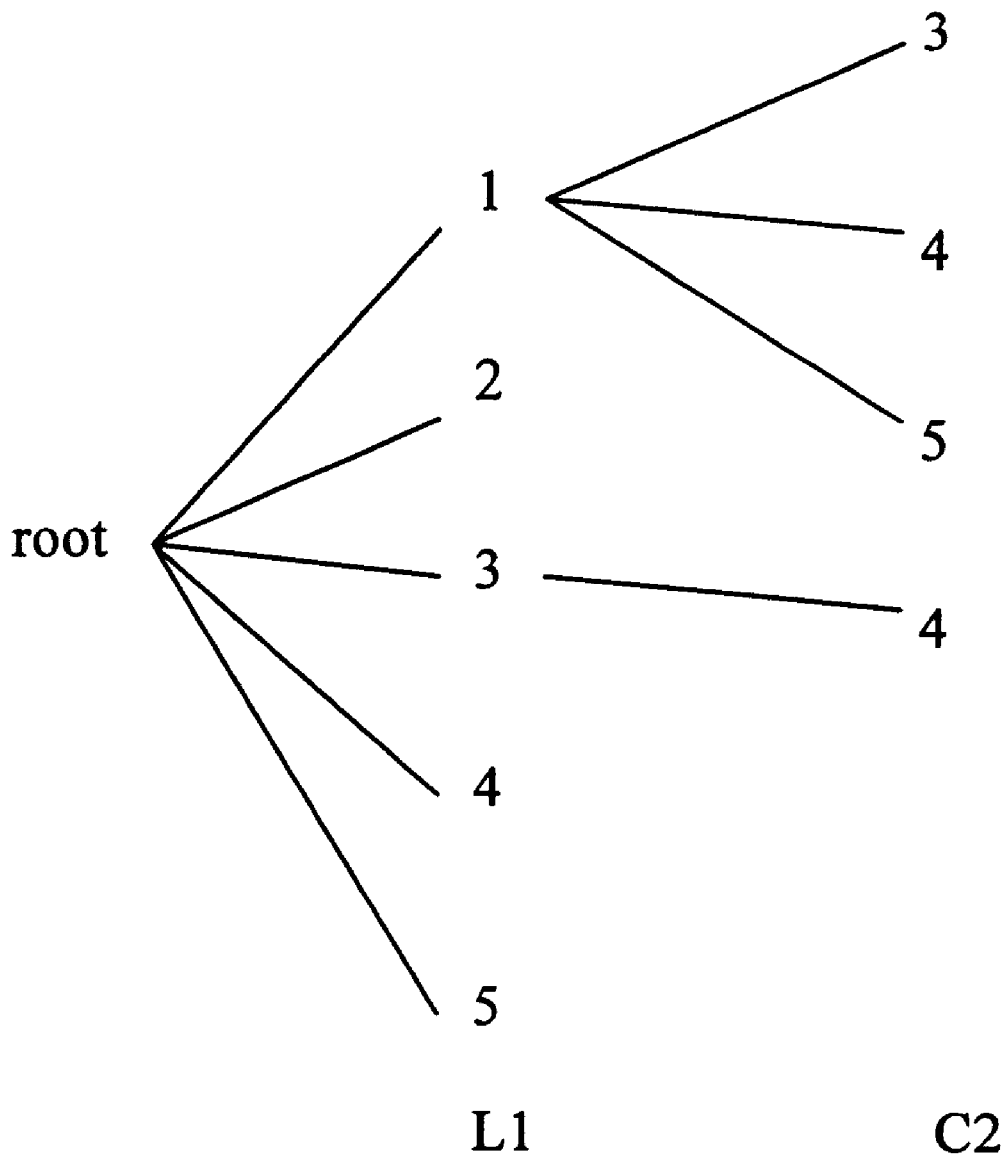
FIG. 20 shows an example of hash-tree used for Embodiment 11 according to the present invention.

Referring to FIGS. 7, 8 and 20, an association rule discovering apparatus and method according to Embodiment 11 will now be explained.

In the above embodiments, it is impossible to specify an item included in RHS or LHS of an association rule when the association rule is selected. In this Embodiment 11, however, a selected association rule according to the present embodiment certainly includes at least one item appointed for LHS in the LHS and at least one item appointed for RHS in the RHS.

FIG. 7 shows a system of association rule discovering apparatus according to the present embodiment, FIG. 8 is a block diagram showing the association rule discovering apparatus, and FIG. 20 shows the procedure of generating a candidate-itemset according to the present embodiment.

The system configuration and operations in FIG. 7 of this embodiment are the same as those in FIG. 7 explained for Embodiment 4 except that detailed operations of the user input unit 10, the candidate-itemset generating unit 24 and the candidate rule generating unit 46 are different in Embodiments 4 and 11.

In FIG. 7, the candidate-itemset generating unit 24 generates a candidate-itemset of k long from a large-itemset of 1 long and a large-itemset of k−1 long, and the candidate rule generating unit 46 generates a candidate rule from the large-itemset of 1 long, the large-itemset of k−1 long, and the candidate-itemset of k long.

In FIG. 7, the user input unit 10 obtains, from the user, a minimum frequency, a significant level, and item names to be appearing in RHS and LHS of association rule (called an RHS appointed-item and an LHS appointed-item).

In the procedure of generating a candidate-itemset of k long from a large-itemset of 1 long and a large-itemset of k−1 long by the candidate-itemset generating unit 24, item nodes which are not specified in the hash-tree do not extend their branches.

The candidate rule generating unit 46 generates a candidate rule from a large-itemset of 1 long, and a large-itemset of k−1 long. In this case, an itemset composed of items having frequencies more than the minimum frequency in RHS appointed-items is used as the large-itemset of 1 long.

Now, the procedure of discovering an association rule according to the present embodiment is explained with reference to FIG. 8. At the user input step 400, a minimum frequency, a significant level and item names to be appearing in RHS and LHS of association rule are obtained from the user through the user input unit 10.

At the L1 generating step 410, a large-itemset L1 having length 1 is generated. Similar to Embodiment 4, the candidate-itemset verifying unit 21 selects a record from the database 1 one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are registered in a hash-tree.

Item numbers are reassigned to every item in order to make the item number of LHS appointed-item be a smaller integer than the numbers of other items (excluding the LHS appointed-item), and make the item number of RHS appointed-item be a smaller integer than the numbers of other items (excluding the RHS and LHS appointed-items). Data on the corresponding relation between the original numbers and the reassigned numbers is stored in a table in the memory.

At the step of 420, it is judged whether the Lk−1 set is null or not. In the initial state, k equals 2 (k=2) and L1 is an object of the judging. If Lk−1 is null, the association rule discovering apparatus according to the present embodiment becomes finished, if not, it goes to the next step 430 of Ck generation.

At the Ck generating step 430, a candidate-itemset Ck is generated from the large-itemsets L1 and Lk−1 by the candidate-itemset generating unit 24 in the same way as Embodiment 4. At this step of the present embodiment, however, nodes of items in the hash-tree which are not appointed as RHS items nor LHS items do not extend their branches, which is a characteristic of the present embodiment.

This will be explained with reference to the hash-tree in FIG. 20. Supposing that items 1, 2, and 3 are appointed as items in RHS, or LHS, only [1], [2], and [3] extend their branches in the procedure of extending branches from L1 to C2. This is because a large-itemset which does not include any of RHS appointed-item and LHS appointed-item is not needed.

At the candidate rule generating step 440, a candidate for the association rule is generated by the candidate rule generating unit 46. In this step, one of itemsets in Lk−1 and one of items in S1 (S1 is an itemset of items having frequencies more than the minimum frequency in RHS appointed-items) are selected one by one.

In the case of k=3, when [A1, A2] is selected from L2 and B is selected from S1, the rule A1, A2→B is added to a candidate rule set as long as B is not included in A1 nor A2 (that is, B is neither A1 nor A2) and the rule A1, A2→B is not included in the candidate rule set being generated. This candidate rule generating process is performed for all the combinations of itemsets in L2 and S1. Operations performed after the candidate rule generating step are the same as Embodiment 4.

According to the present embodiment, since branches of the hash-tree are pruned based on conditions regarding RHS appointed-items and LHS appointed-items, an association rule having appointed items in RHS and LHS is effectively obtained.

As stated above, the user inputs conditions at least regarding an LHS or RHS appointed-item at the user inputting step. Concretely, conditions of at least one item to be included in LHS and at least one item to be included in RHS are input by the user, in the association rule discovering method and apparatus of the present embodiment. Accordingly, association rules regarding specific items can be effectively obtained.

Embodiment 12.

Figure 21:
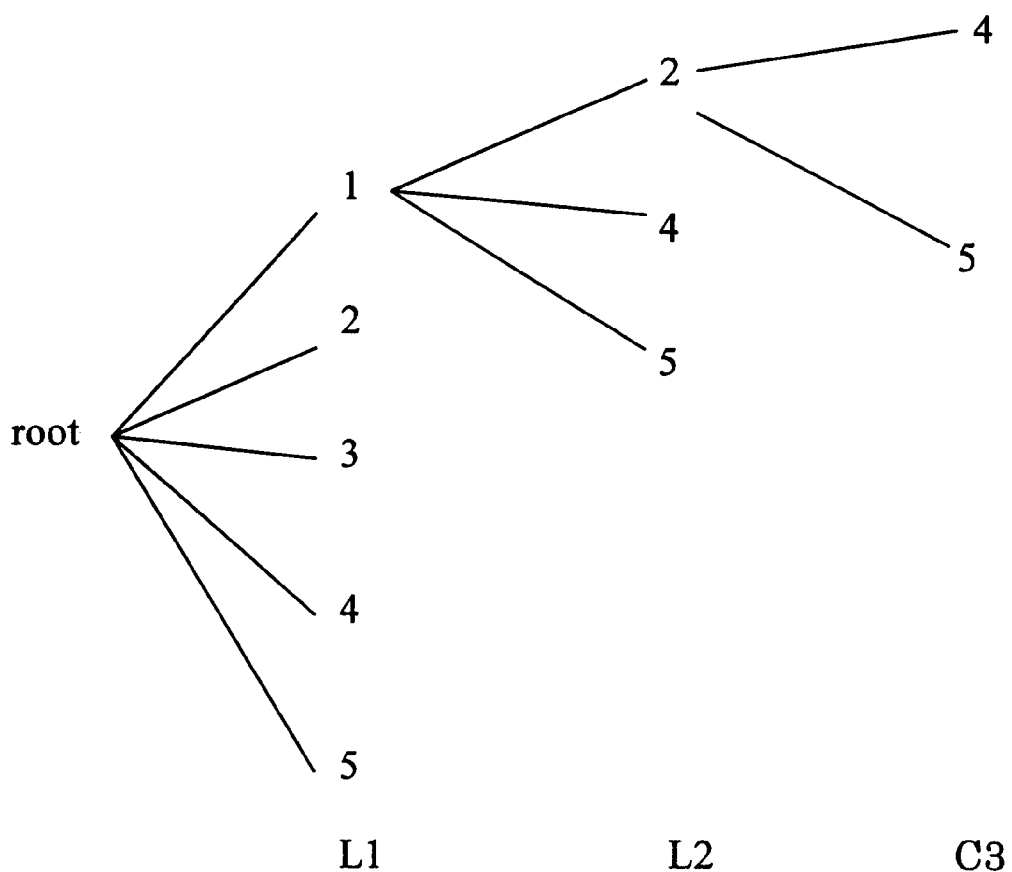
FIG. 21 shows an example of hash-tree used for Embodiment 12 according to the present invention.

Referring to FIGS. 7, 8 and 21, an association rule discovering apparatus and method according to Embodiment 12 will now be explained.

In Embodiment 11, a selected association rule certainly includes at least one of LHS appointed-items in the left hand side and one RHS appointed-item in the right hand side. However, in this Embodiment 12, a selected association rule certainly includes all of LHS appointed-items in the left hand side and all of RHS appointed-items in the right hand side.

FIG. 7 shows a system of association rule discovering apparatus according to the present embodiment, FIG. 8 is a block diagram showing the association rule discovering apparatus, and FIG. 21 shows a hash-tree for the explanation of the procedure of generating a candidate-itemset.

The system configuration and operations in FIG. 7 of this embodiment are the same as those in FIG. 7 explained for Embodiment 4 except that detailed operations of the user input unit 10, the candidate-itemset generating unit 24 and the candidate rule generating unit 46 are different in Embodiments 4 and 12.

The candidate-itemset generating unit 24 generates a candidate-itemset of k long from a large-itemset of 1 long and a large-itemset of k−1 long, and the candidate rule generating unit 46 generates a candidate rule from the large-itemset of 1 long, the large-itemset of k−1 long, and the candidate-itemset of k long.

Now, the procedure of discovering an association rule according to the present embodiment is explained with reference to FIG. 8. At the user input step 400, a minimum frequency, a significant level and item names to be appearing in RHS and LHS of association rule are obtained from the user through the user input unit 10.

At the L1 generating step 410, a large-itemset L1 having length 1 is generated. Similar to Embodiment 4, the candidate-itemset verifying unit 21 selects a record from the database 1 one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are registered in a hash-tree.

Item numbers are reassigned to every item in order to make the item number of LHS appointed-item be a smaller integer than the number of other items (excluding the LHS appointed-item), and make the item number of RHS appointed-item be a smaller integer than the number of other items (excluding the RHS and LHS appointed-items). Data on the corresponding relation between the original numbers and the reassigned numbers is stored in the memory as a corresponding list.

At the step of 420, it is judged whether the Lk−1 set is null or not. In the initial state, k equals 2 (k=2) and L1 is an object of the judging. If Lk−1 is null, the association rule discovering apparatus according to the present embodiment becomes finished, if not, it goes to the next step 430 of Ck generation.

At the Ck generating step 430, a candidate-itemset Ck is generated from the large-itemsets L1 and Lk−1 by the candidate-itemset generating unit 24 in the same way as Embodiment 4. At this step of the present embodiment, supposing that items A1, A2, . . . , An are LHS appointed-items, other branches except n branches of [A1], [A1, A2], . . . , [A1, A2, . . . , An] do not extend their branches.

This will be explained with reference to the hash-tree in FIG. 21. Supposing that items 1, and 2 are LHS appointed-items, only [1], and [1, 2] extend their branches, because a large-itemset which does not include any of RHS and LHS appointed-items is not needed.

At the candidate rule generating step 440, a candidate for the association rule is generated by the candidate rule generating unit 46. In this step, one of itemsets in Lk−1 and one of items in S1 (S1 is an itemset of items having frequencies more than the minimum frequency in RHS appointed items) are selected one by one.

Supposing that the number of LHS appointed-items is n, no candidate rule is generated in the case of k<n+1. In the case of k=3, when [A1, A2] is selected from L2 and B is selected from S1, the rule A1, A2→B is added to a candidate rule set as long as B is not included in A1 nor A2 (that is, B is neither A1 n or A2) and the rule A1, A2→B is not included in the candidate rule set being generated. This candidate rule generating process is performed for all the combinations of itemsets in L2 and S1. Operations performed after the candidate rule generating step are the same as Embodiment 4.

According to the present embodiment, since branches of the hash-tree are pruned based on conditions regarding RHS appointed-items and LHS appointed-items, an association rule having appointed items in RHS and LHS is effectively obtained.

As stated above, the user inputs conditions at least regarding an LHS or RHS appointed-item at the user inputting step. Concretely, conditions regarding one or more than one LHS appointed-items all of which are certainly included in the left hand side, and regarding one or more than one RHS appointed-items all of which are certainly included in the right hand side are input by the user, in the association rule discovering method and apparatus of the present embodiment. Accordingly, association rules regarding specific items can be effectively obtained.

Embodiment 13.

Figure 22:
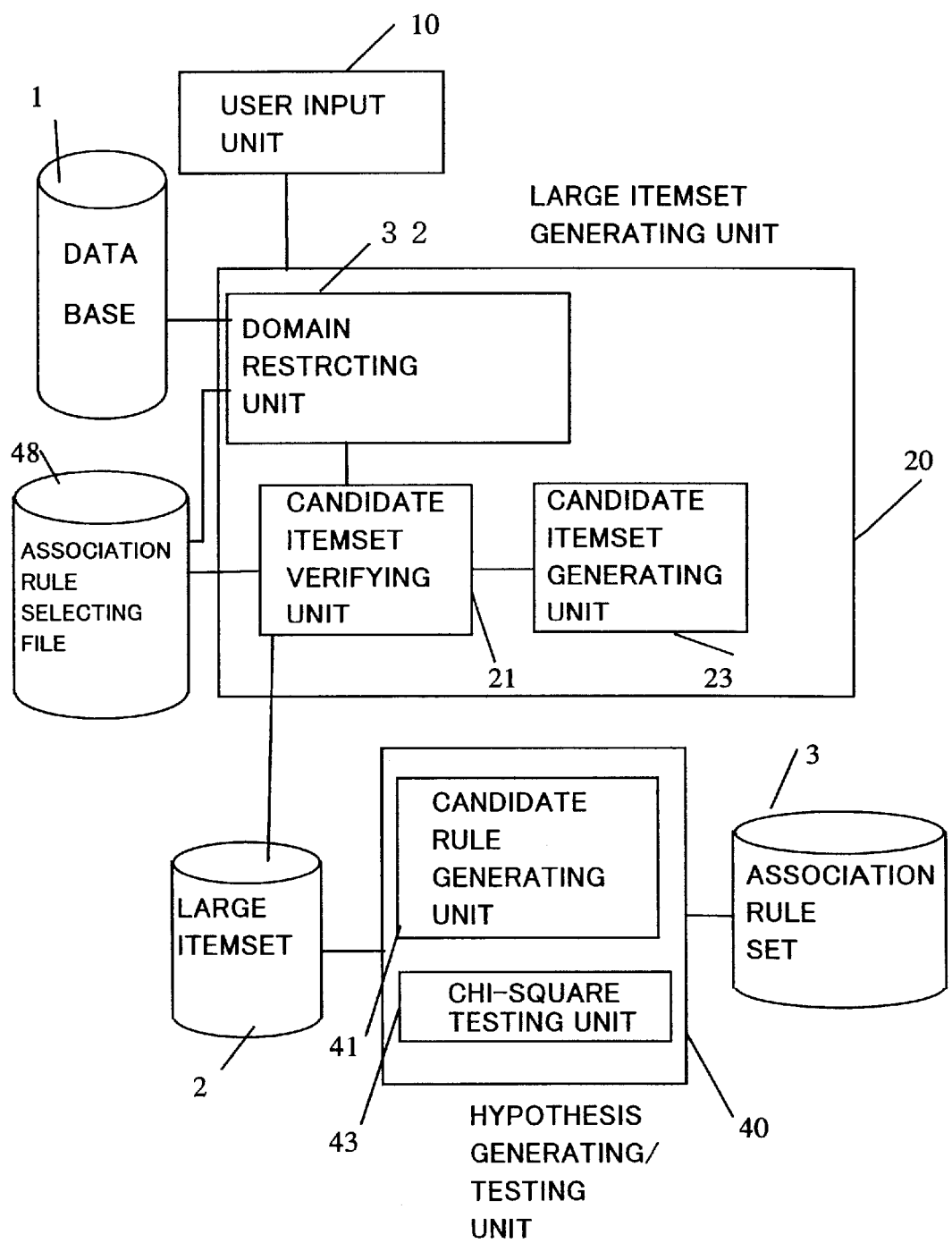
FIG. 22 shows a system of Embodiment 13 according to the present invention.
Figure 23:
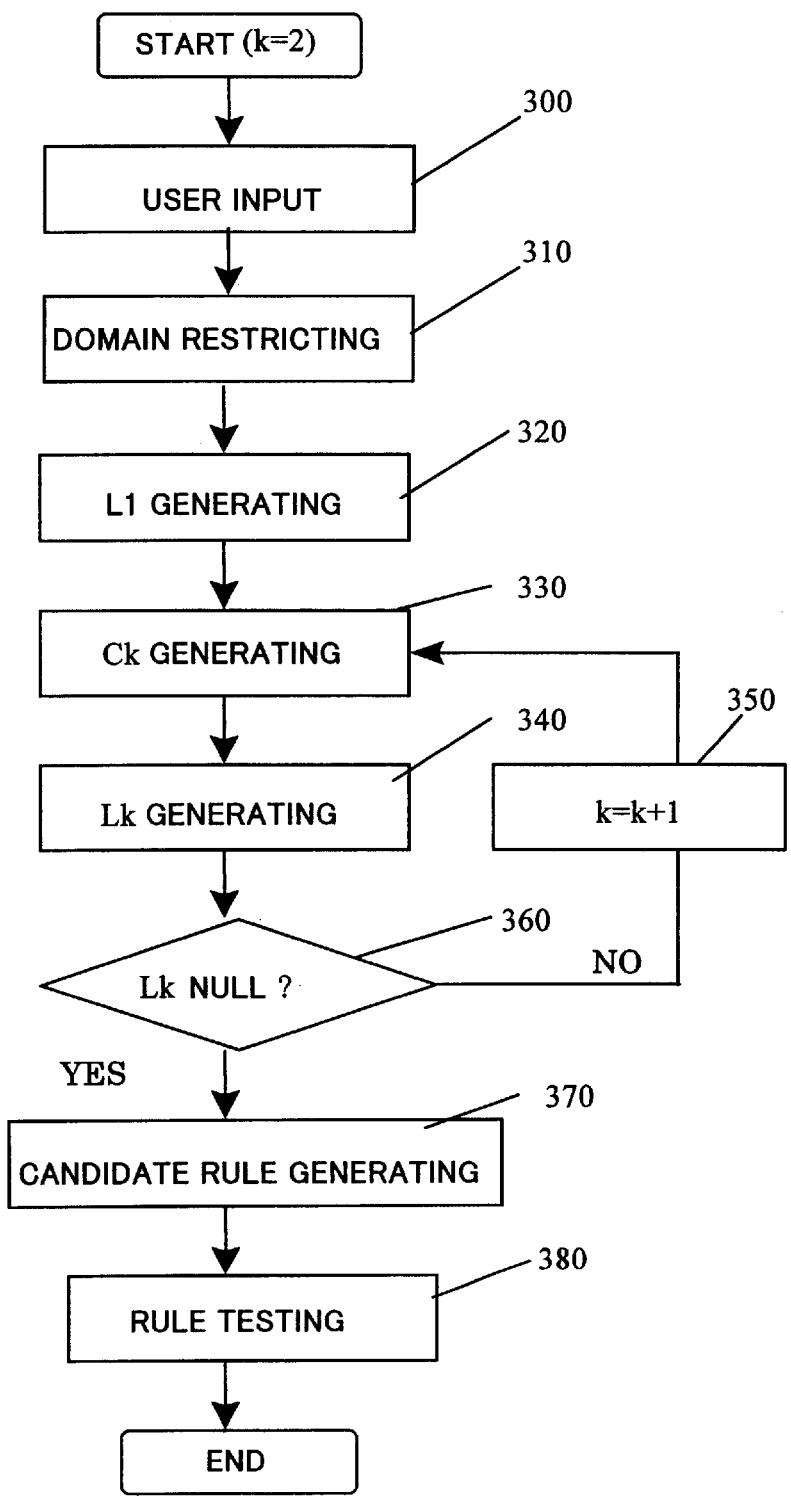
FIG. 23 shows a block diagram of Embodiment 13 according to the present invention.

Referring to FIGS. 22 and 23, an association rule discovering apparatus and method according to Embodiment 13 will now be explained.

In the above embodiments, it is impossible to specify a domain of a record for selecting an association rule. However, it is possible to specify the domain in this embodiment.

FIG. 22 shows a system of association rule discovering apparatus according to the present embodiment, and FIG. 23 is a block diagram showing the association rule discovering apparatus.

The system configuration and operations in FIG. 22 are the same as FIG. 1 of Embodiment 1 except the user input unit 10 and a new element, domain restricting unit 32.

In this Embodiment 13, the parameter obtained from the user at the user input unit 10 is different from that of Embodiment 1. The domain restricting unit 32 selects only records belonging to the domain specified by the user, and newly creates a data-file for selecting an association rule.

Now, the procedure of discovering an association rule according to the present embodiment is explained with reference to the block diagram of FIG. 23.

At a user input step 300, a minimum frequency, a significant level and an item name to be included in a record for specifying the domain are obtained from the user through the user input unit 10.

At a domain restricting step 310, the domain restricting unit 32 retrieves database based on domain restricting conditions specified by the user, selects a record meeting the retrieving conditions, and stores the selected record in a file for selecting association rules.

Operations performed after the domain restricting step 310 are the same as those performed at the identical name steps in FIG. 2. In the above, the domain restricting process is collectively performed at the domain restricting step 310. A similar effect to the domain restricting can be obtained by avoiding matching between the hash-tree and the record not belonging to the domain, in retrieving the database at the L1 generating step 320 and the Lk generating step 340.

At the Ck generating step 330, it is also acceptable to perform only the join step like the case of FIG. 3 explained in Embodiment 2.

Selecting an association rule, in the case of the domain being restricted, can be effectively performed according to the present embodiment, because the file for selecting an association rule is created by using only the records meeting the domain conditions.

According to the present embodiment, at the user input step, a specific one or more than one item in the database records is input by the user in order to specify a domain which is a set of records including the specific item. At the large-itemset generating step, only the records included in the specified domain are selected. Then, at the domain restricting step, it is set to use the number of records included in the domain hereinafter, instead of the number of records in the database.

Accordingly, an association rule in the case of restricting the domain can be effectively selected.

Embodiment 14.

Figure 24:
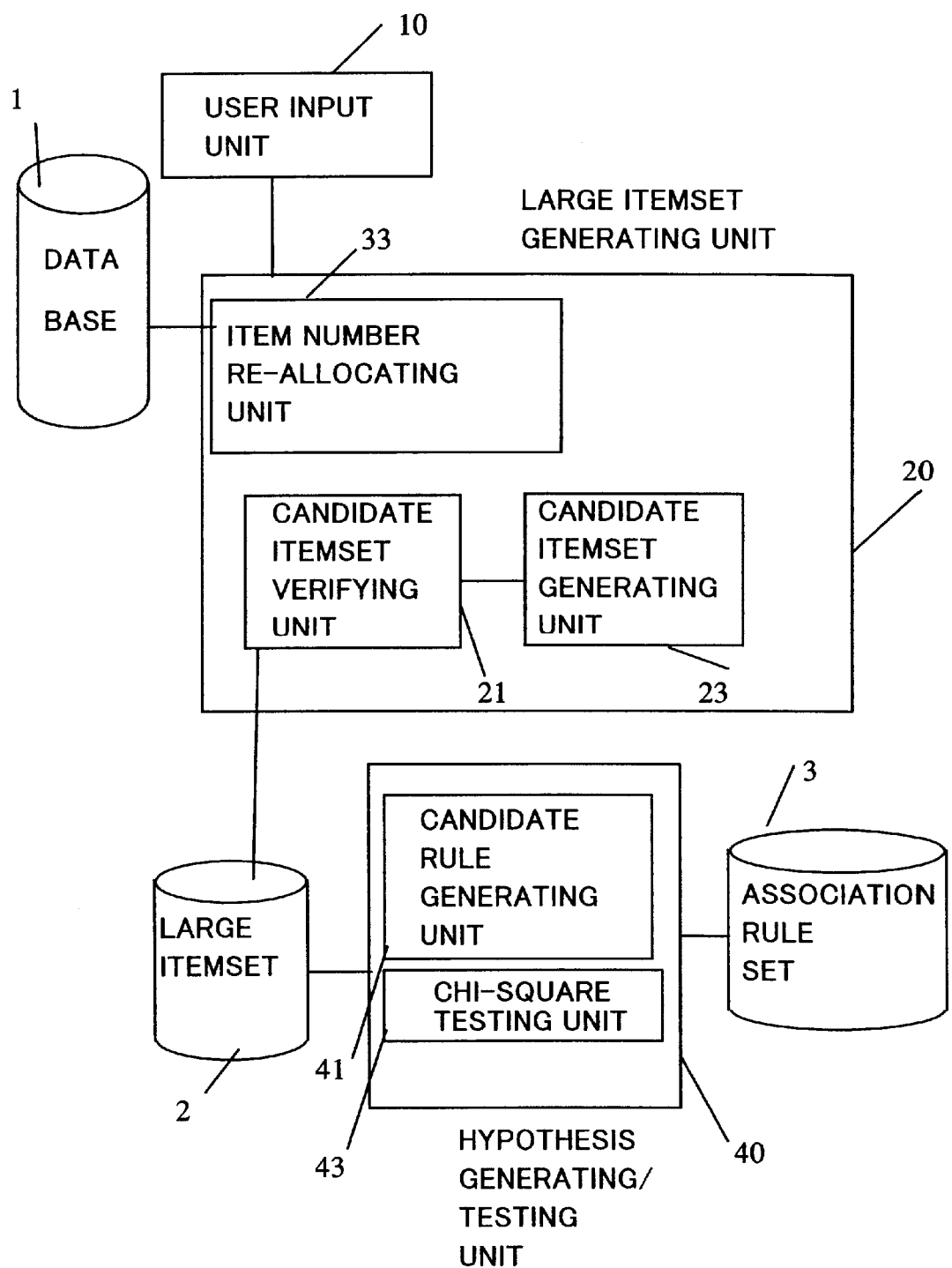
FIG. 24 shows a system of Embodiment 14 according to the present invention.

Referring to FIGS. 2 and 24, an association rule discovering apparatus and method according to Embodiment 14 will now be explained.

In the above embodiments, an item number for each item has no relation with a frequency. In this Embodiment 14, however, item numbers are re-allocated in order of the frequency from large to small.

FIG. 24 shows a system of association rule discovering apparatus according to the present embodiment, and FIG. 2 is a block diagram showing the association rule discovering apparatus.

The system configuration and operations in FIG. 24 are the same as FIG. 1 of Embodiment 1 except the user input unit 10 and a new element, item number re-allocating unit 33. The item number re-allocating unit 33 re-allocates item numbers in order of the frequency from large to small, at the step of generating a large-itemset of 1 long.

Now, the procedure of discovering an association rule according to the present embodiment is explained with reference to the block diagram of FIG. 2.

At the user input step 101, a minimum frequency and a significant level are obtained from the user through the user input unit 10.

At the L1 generating step 110, a large-itemset of 1 long is generated. 1-itemsets in L1 are sorted by frequency and stored in the computer memory. Then, the item number re-allocating unit 33 allocates item numbers to each item in order of the frequency from large to small. The reason for being called a re-allocating unit is that this is the second allocation if the first item number assignment to items is counted.

A new data-file based on the newly allocated numbers (integers) is created, and a corresponding table regarding the item numbers before and after the re-allocation is also created. At the steps after the L1 generating step, this new data-file is an object of database retrieving.

In the rule testing step 170, each item number in a rule to be stored in the association rule set is restored to the number before the re-allocation based on the corresponding table in the item number re-allocating unit 33. At other steps, the same operations as those at the identical name steps in FIG. 2 of Embodiment 1 are performed.

At the Ck generating step 120, it is also acceptable to perform only the join step like the case of FIG. 3 explained in Embodiment 2.

According to the present embodiment, a memory area in each hash-table of the hash-tree is effectively controlled because numbers of items having frequencies more than the minimum frequency are regularly arranged. In the case that item numbers from 1 to m (m: natural number) regularly exist as keys to the hash without any skipped number, the remainder obtained by dividing a key value by m can be defined as the hash function, and the data can be stored in all the buckets in the table.

As stated above, the large-itemset generating step of the present embodiment includes the item number reallocating step for allocating item numbers to each item in order of frequency. Therefore, association rules are effectively obtained.

Embodiment 15.

Referring to FIGS. 2, 25, 26 and 27, an association rule discovering apparatus and method according to Embodiment 15 will now be explained, In the above embodiments, a hash-tree which has been formed is never divided. In this Embodiment 15, the hash-tree is divided when it is large.

Figure 25:
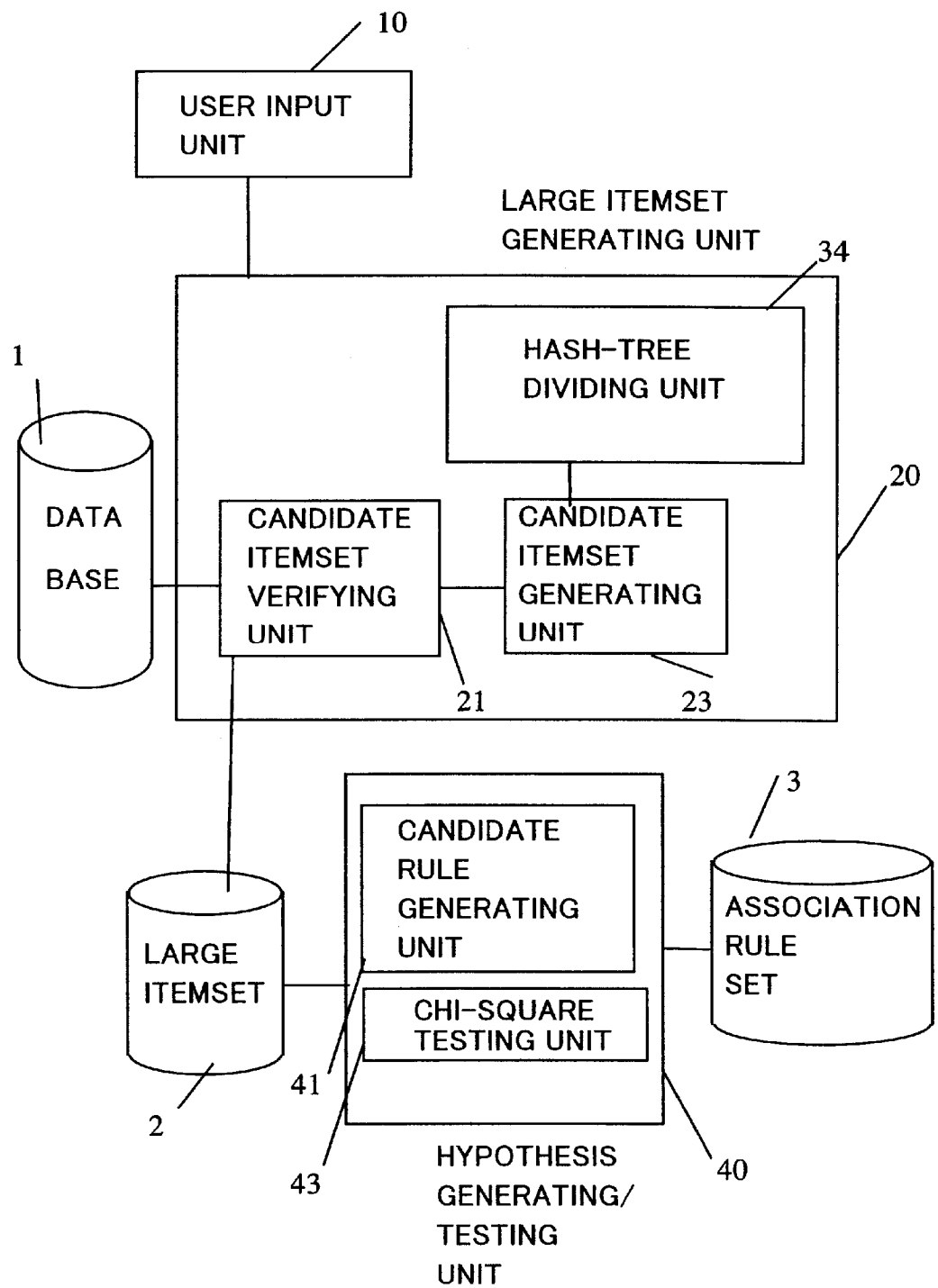
FIG. 25 shows a system of Embodiment 15 according to the present invention.
Figure 26:
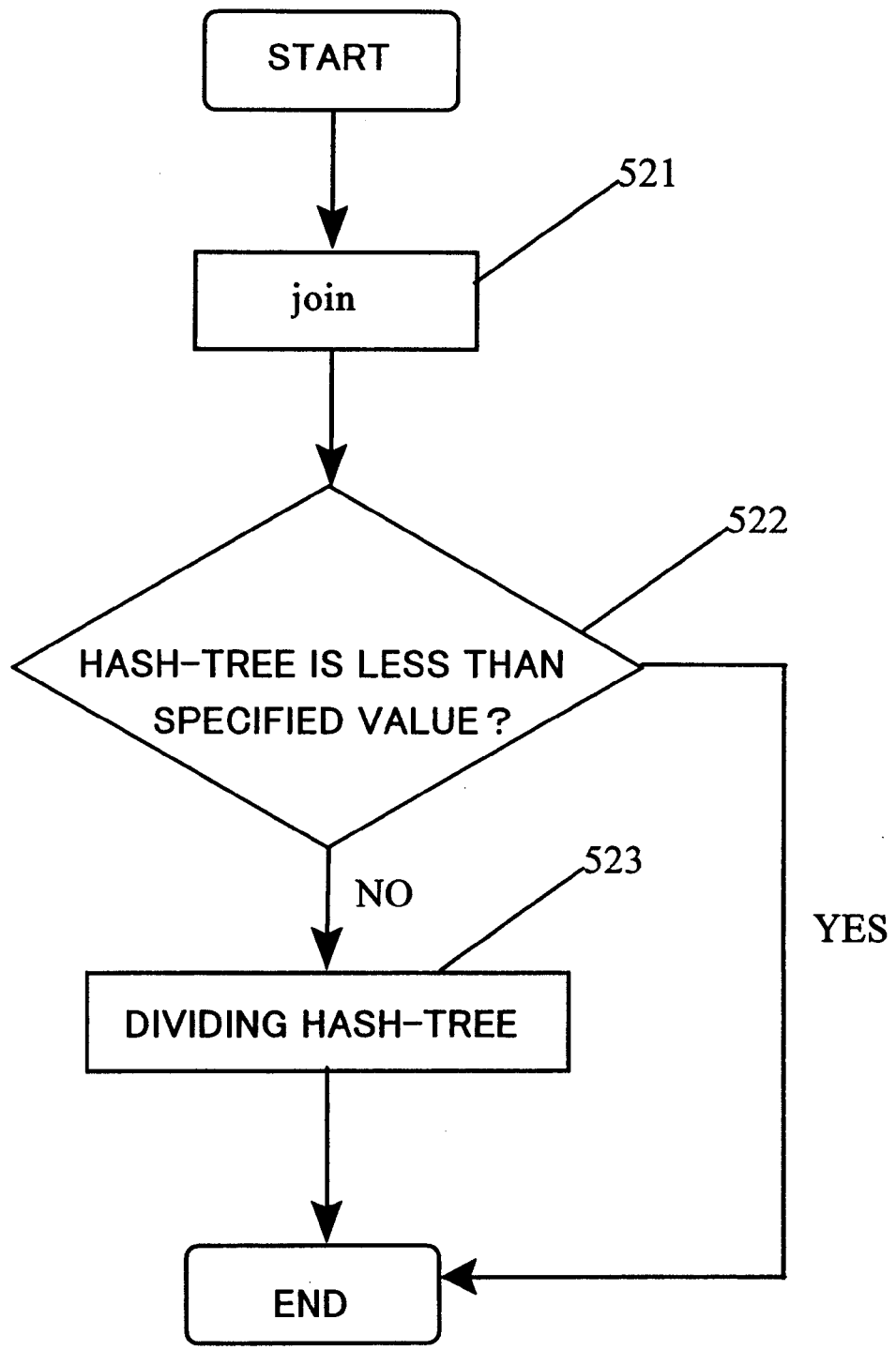
FIG. 26 is a block diagram showing a detailed Ck generating step of Embodiment 15 according to the present invention.
Figure 27A:
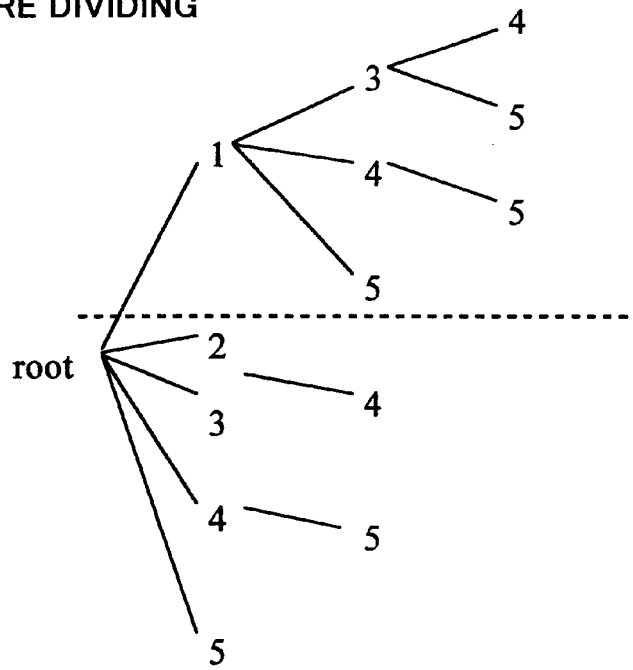
FIG. 27A shows an example of the operation before hash-tree dividing used for Embodiment 15 according to the present invention.
Figure 27B:
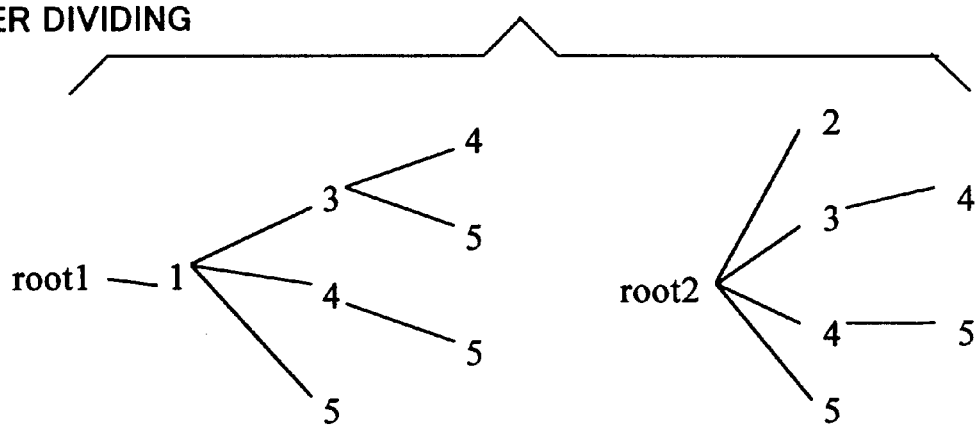
FIG. 27B shows an example of the operation after hash-tree dividing used for Embodiment 15 according to the present invention.

FIG. 2 is a block diagram of an association rule discovering apparatus according to the present embodiment, FIG. 25 shows a system of the association rule discovering apparatus, FIG. 26 shows details of generating candidate-itemset step, and FIGS. 27A and 27B explain a hash-tree dividing according to the present embodiment.

The system configuration and operations in FIG. 25 are the same as FIG. 1 of Embodiment 2 except a new element, hash-tree dividing unit 34. The hash-tree dividing unit 34 divides a hash-tree depending upon necessity.

The procedure of discovering an association rule according to the present embodiment is the same as the block diagram of FIG. 2 except that operations of the Ck generating step 120 and the Lk generating step 130 are different between this embodiment and the case of FIG. 2.

FIG. 26 shows details of the Ck generating step 210. When a join step 521 in the Ck generating step is finished, meaning the state of all the candidate k-itemsets having been formed, the hash-tree is divided by the hash-tree dividing unit 34. First, it is checked whether the number of nodes of each hash-tree exceeds a specific value or not. This specific value is defined based on the upper limit of node numbers to be stored in the memory. If the number of nodes of a tree exceeds the specific value, a hash table at the tree root is recomposed in order to try to divide the tree into two trees having the same number nodes, at a dividing hash-tree step 523. For instance, when the hash-tree of FIG. 27A is divided by the dotted line, the number of nodes is divided into six and seven, which is around the same number. The hash-tree after the dividing is shown in FIG. 27B.

Then, at the Lk generating step 130, the Lk generating process like Embodiment 1 is performed for each tree. If there are three hash-trees A, B, and C, the Lk generating process like Embodiment 1 is firstly performed for A, secondly for B, and lastly for C. As each hash-tree always keeps the size to be within the memory, the data replacing between the disk and the memory, caused by paging in matching between the record and the hash-tree, can be reduced to a minimum.

In the case of a hash-tree being very large, it is acceptable to repeat the tree dividing process so as to make each partial tree small. It is also acceptable to divide a hash-tree after the prune step process of Embodiment 1.

According to the present embodiment, as stated above, when the number of nodes becomes large, the hash-tree is divided into trees to be within the memory, which suppresses the paging. Therefore, high-speed matching can be performed.

The large-itemset generating step of the present embodiment includes the hash-tree dividing step for dividing a hash-tree of more than a specific size into plural hash-trees. When matching is performed, the matching between every hash-tree and all the records is executed.
Embodiment 16.

Figure 28:
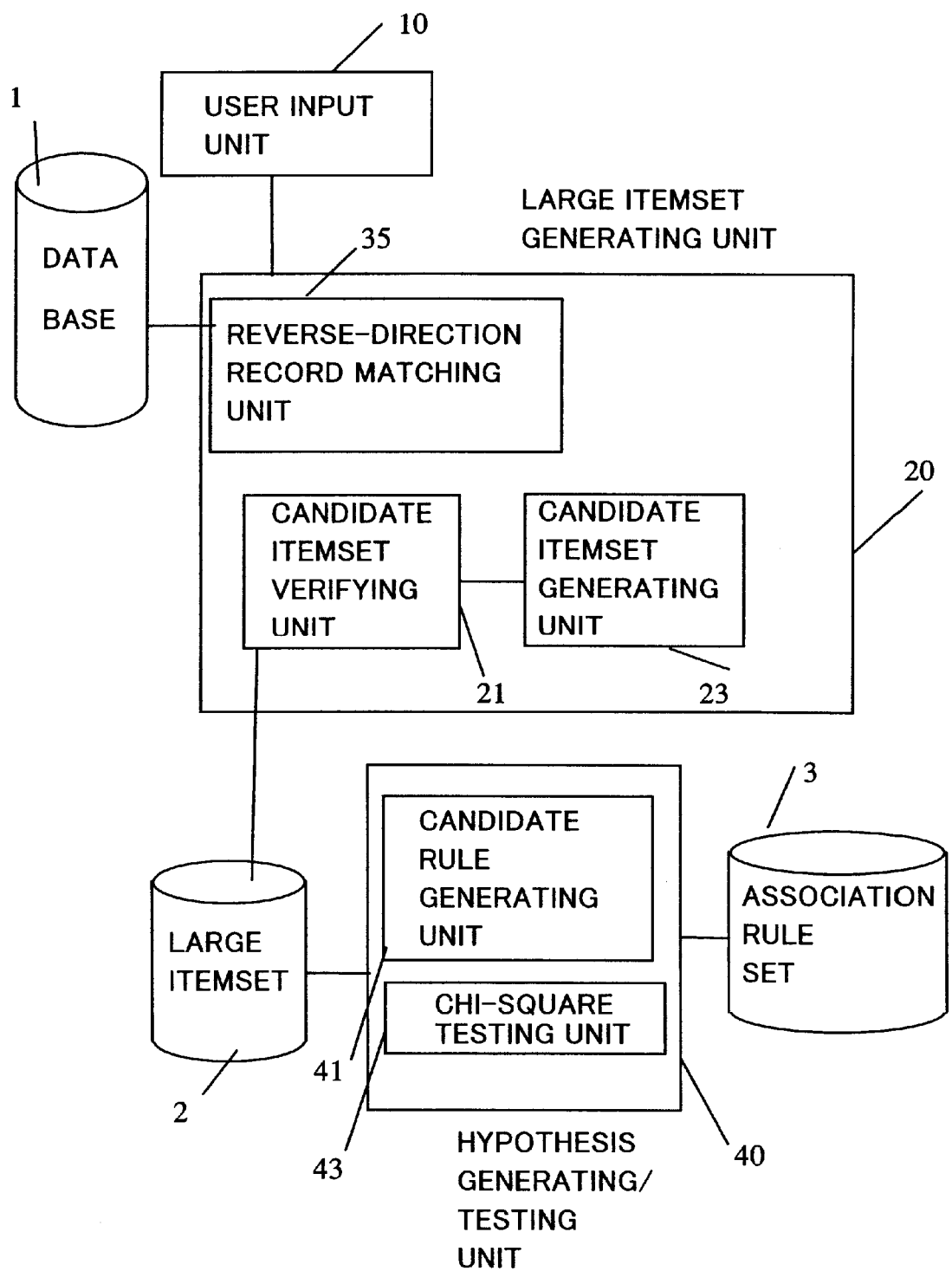
FIG. 28 shows a system of Embodiment 16 according to the present invention.

Referring to FIGS. 2 and 28, an association rule discovering apparatus and method according to Embodiment 16 will now be explained.

In the above embodiments, all the combinations in the record are selected to be checked with the hash-tree. In this Embodiment 16, however, one k-itemset is selected one by one to be checked.

FIG. 2 is a block diagram of an association rule discovering apparatus according to the present embodiment, and FIG. 28 shows a system of the association rule discovering apparatus.

The system configuration and operations in FIG. 28 are the same as FIG. 1 of Embodiment 2 except a new element, reverse-direction record matching unit 35.

The procedure of discovering an association rule according to the present embodiment is the same as the block diagram of FIG. 2 except that the operation of the Lk generating step 130 is different between this embodiment and the case of FIG. 2.

The matching between a record and a hash-tree, at the Lk generating step 130, will now be explained. First, a record to be counted is selected. Then, one of k-itemsets is selected from the hash-tree one by one so as to be compared with the record and counted. In this procedure, it is supposed that items in the k-itemset and the record are sorted in order of item number. The first item in the k-itemset is selected to be checked whether the same item exists in the record or not. This checking is performed from the top item to the end in the record. If no corresponding item is found by the checking, the process for this k-itemset becomes finished. When a corresponding item is found, the next item in the k-itemset is selected to be checked. This checking is started from the position where the above corresponding item is found. The selecting and checking is performed for all the k items as long as the process does not become finished. The matching process with the selected record is performed for all the k-itemsets in the hash-tree. Then, the matching process is performed for all the records.

According to the present embodiment, the Snatching is performed by checking a large-itemset in the hash-tree with a record, not by checking all the combinations in the record with the hash-tree. Therefore, when a hash-tree is small and a record is long, the matching between the record and a large-itemset can be effectively performed.

Namely, the large-itemset generating step of the present embodiment includes the reverse-direction record matching step for selecting one of k-itemsets, in the hash-tree which stores the candidate itemset Ck, one by one, and performing the matching with the record. Accordingly, high-speed matching can be performed.
Embodiment 17

Figure 29:
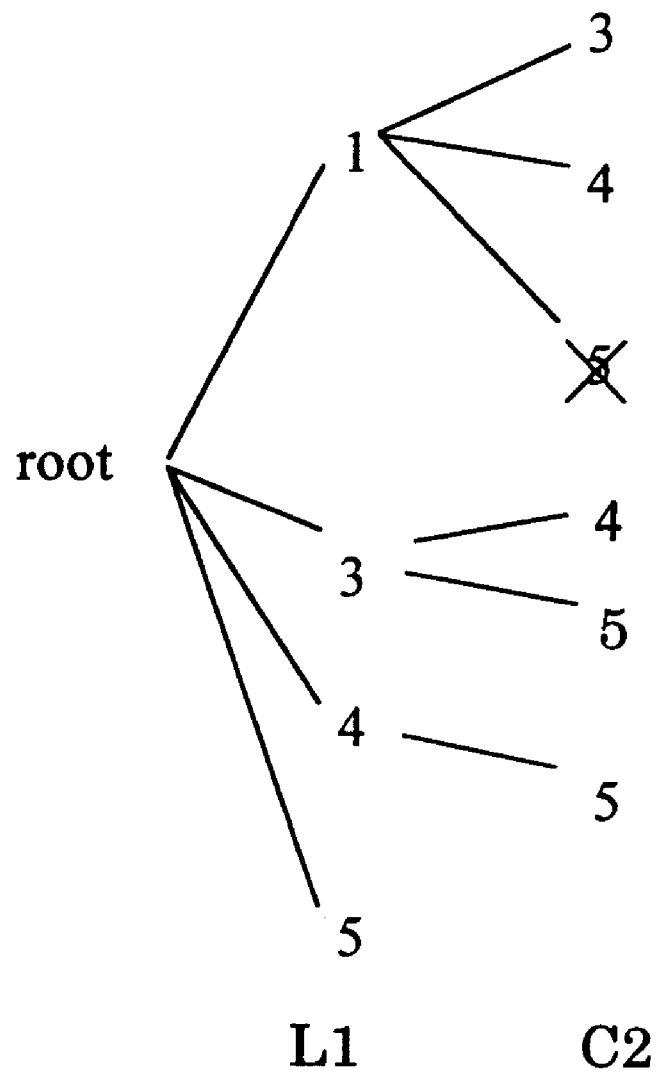
FIG. 29 shows an example of hash-tree used for Embodiment 17 according to the present invention.
Figure 30:
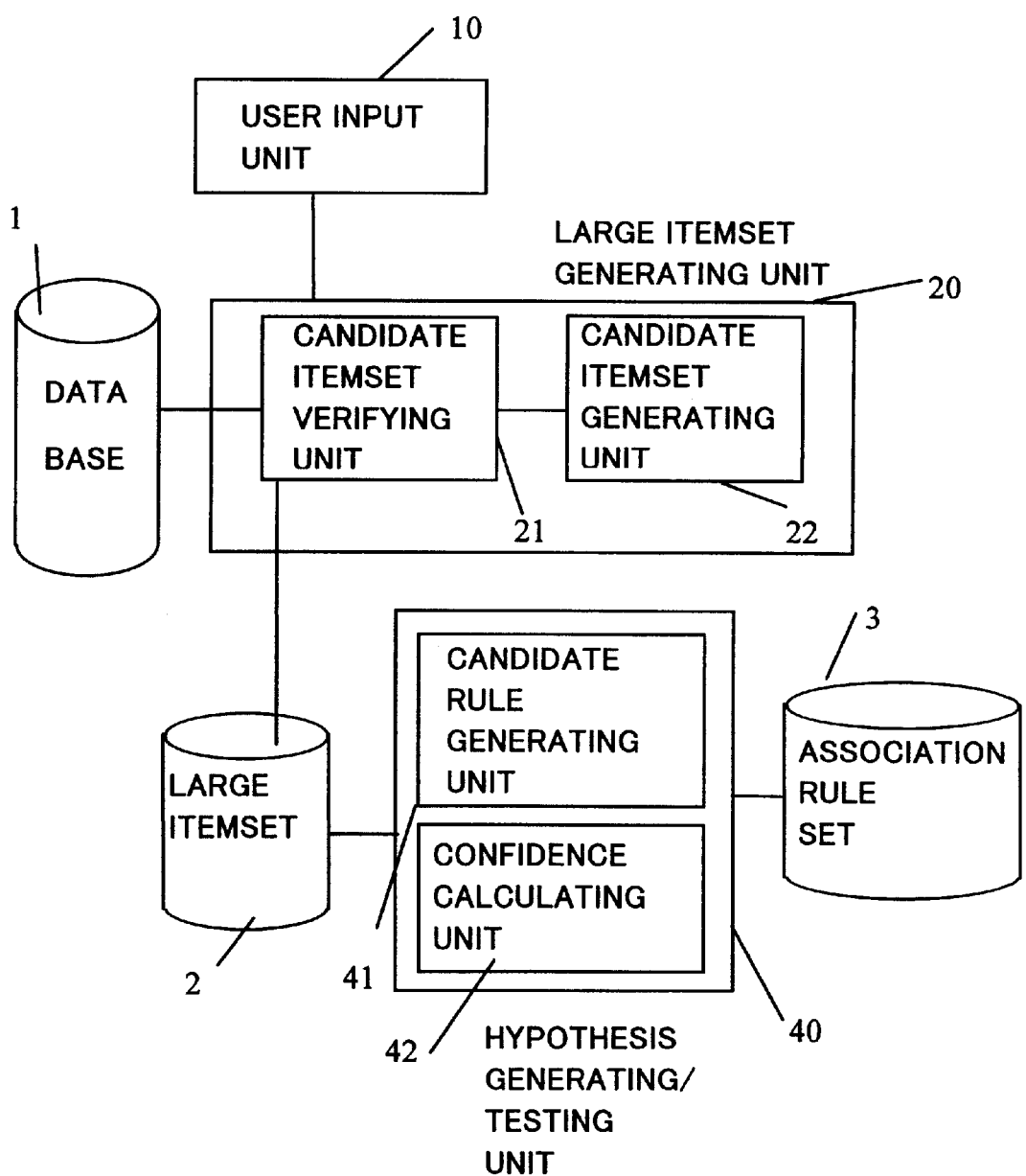
FIG. 30 shows a system of a conventional association rule discovering method.
Figure 31:
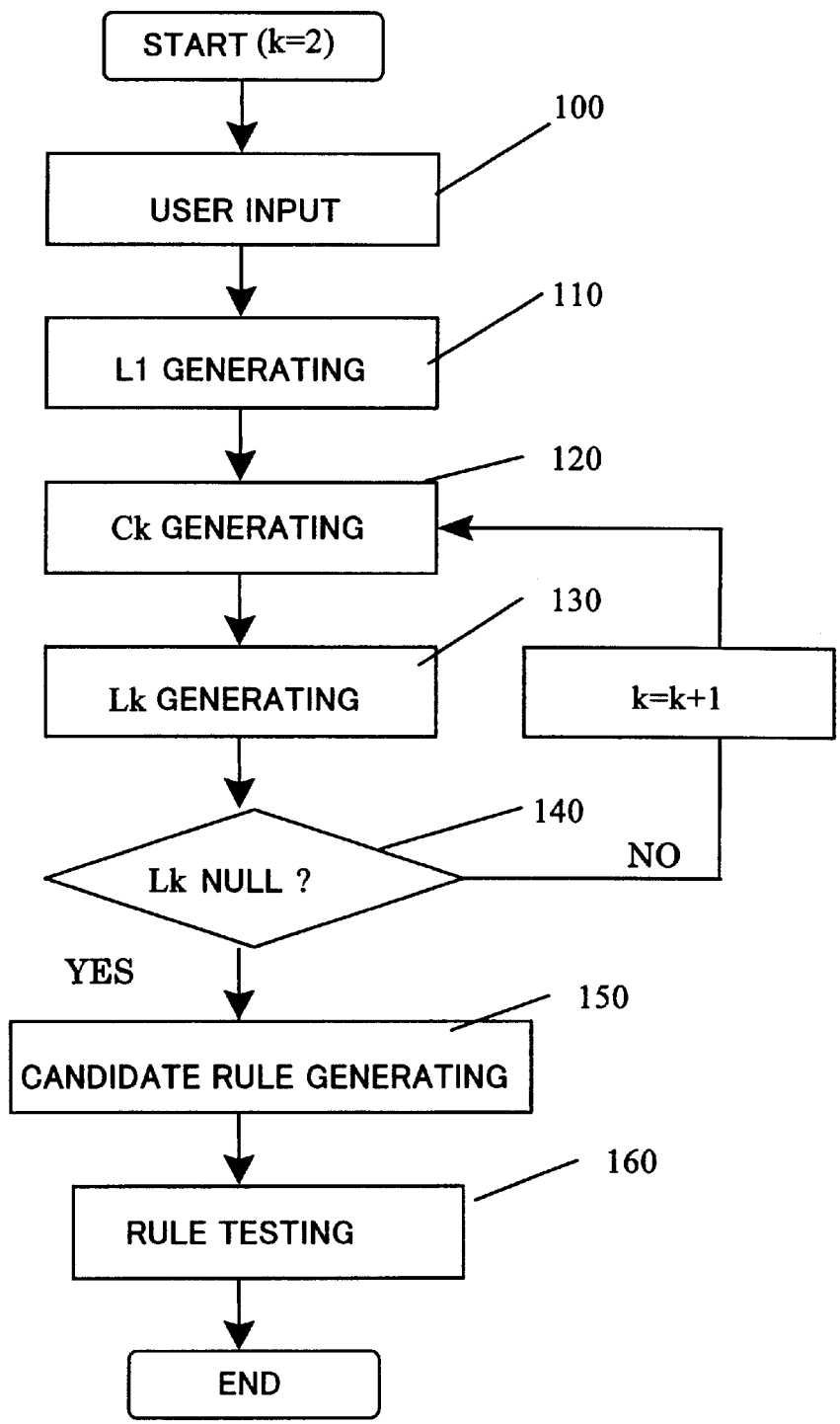
FIG. 31 shows a block diagram of a conventional association rule discovering method.

Referring to FIGS. 7, 8 and 29, an association rule discovering apparatus and method according to Embodiment 17 will now be explained.

In the above embodiments, it is impossible to specify items which should not appear at the same time in an association rule. In this Embodiment 17, however, it is possible to specify items which should not appear at the same time in an association rule.

FIG. 7 shows a system of association rule discovering apparatus according to the present embodiment, FIG. 8 is a block diagram showing the association rule discovering apparatus, and FIG. 29 shows the procedure of generating a candidate-item set according to the present embodiment.

The system configuration and operations in FIG. 7 of this embodiment are the same as those in FIG. 7 explained for Embodiment 4 except that operations of the user input unit 10, the candidate-itemset generating unit 24 and the candidate rule generating unit 46 are different in Embodiments 4 and 17.

A minimum frequency, a significant level and a set of items not to appear in the association rule at the same time are obtained from the user through the user input unit 10.

The candidate-itemset generating unit 24 generates a candidate-itemset of k long from a large-itemset of 1 long and a large-itemset of k–1 long. The candidate rule generating unit 46 generates a candidate rule from the large-itemset of 1 long, the large-itemset of k–1 long, and the candidate-itemset of k long.

Now, the procedure of discovering an association rule according to the present embodiment is explained with reference to FIG. 8.

At the user input step 400, a minimum frequency, a significant level and a set of items not to appear in the association rule at the same time are obtained from the user through the user input unit 10.

At the L1 generating step 410, a large-itemset L1 of 1 long is generated. Similar to Embodiment 4, the candidate-itemset verifying unit 21 selects a record from the database one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are registered in a hash-tree.

At the step of 420, it is judged whether the Lk−1 set is null or not. In the initial state, k equals 2 (k=2) and L1 is an object of the judging. If Lk−1 is null, the association rule discovering apparatus according to the present embodiment becomes finished, and if Lk−1 is not null, it goes to the next step 430 of Ck generation.

At the Ck generating step 430, a candidate-itemset Ck is generated from the large-itemsets L1 and Lk−1 by the candidate-itemset generating unit 24 in the same way as Embodiment 4. However, at this step of the present embodiment, a k-itemset, which includes plural items in the set of items not to appear in the association rule at the same time, is deleted from the hash-tree. In the case of hash-tree of FIG. 29, for instance, [1,5] is deleted when the itemset {1,2,5} has been specified as a set of items not to appear at the same time.

At the candidate rule generating step 440, a candidate for the association rule is generated by the candidate rule generating unit 46. The operation of this candidate rule generating step 440 is the same as that of Embodiment 4 except that a rule including plural (two, in this case) items in the set of items not to appear in the association rule at the same time is not added to the candidate rule.

In the case of k=3, if [A1, A2] is selected from L2 and B is selected from L1, the rule A1, A2→B is added to the candidate rule set only when both the set of B and A1, and the set of B and A2 are not included in the set of items not to appear in the association rule at the same time.

Operations performed after the candidate rule generating step are the same as Embodiment 4.

According to the present embodiment, an association rule which does not include items not to appear at the same time, can be effectively selected, because a candidate including the items not to appear at the same time is deleted at the candidate-itemset generating step.

As stated above, at the user input step of the present embodiment, a set of items (equals two items or more than two items) not to appear in the association rule at the same time is appointed. At the Lk generating step, only a large-itemset Lk which does not include plural items not to appear at the same time is generated.

Embodiment 18.

In Embodiment 15, since the hash-tree is divided at just below the root, all the itemsets including the same item in L1 are included in the same tree even after the dividing. In the case of 27A, for instance, nodes at the lower level than [1] are all included in the same tree even after the dividing. If the divided tree exceeds the memory amount limit, nothing can be done for it. Thus, there is disadvantage that paging may happen in matching the divided tree including [1] even after the dividing. The object of this embodiment is to solve the problem. According to the association rule discovering apparatus and method of the present embodiment, the paging can be suppressed even when there is unbalance in the hash-tree, and discovering an association rule can be performed at high speed.

Referring to FIGS. 37 through 39 and 51 through 55, the association rule discovering apparatus and method according to Embodiment 18 will now be explained.

Figure 37:
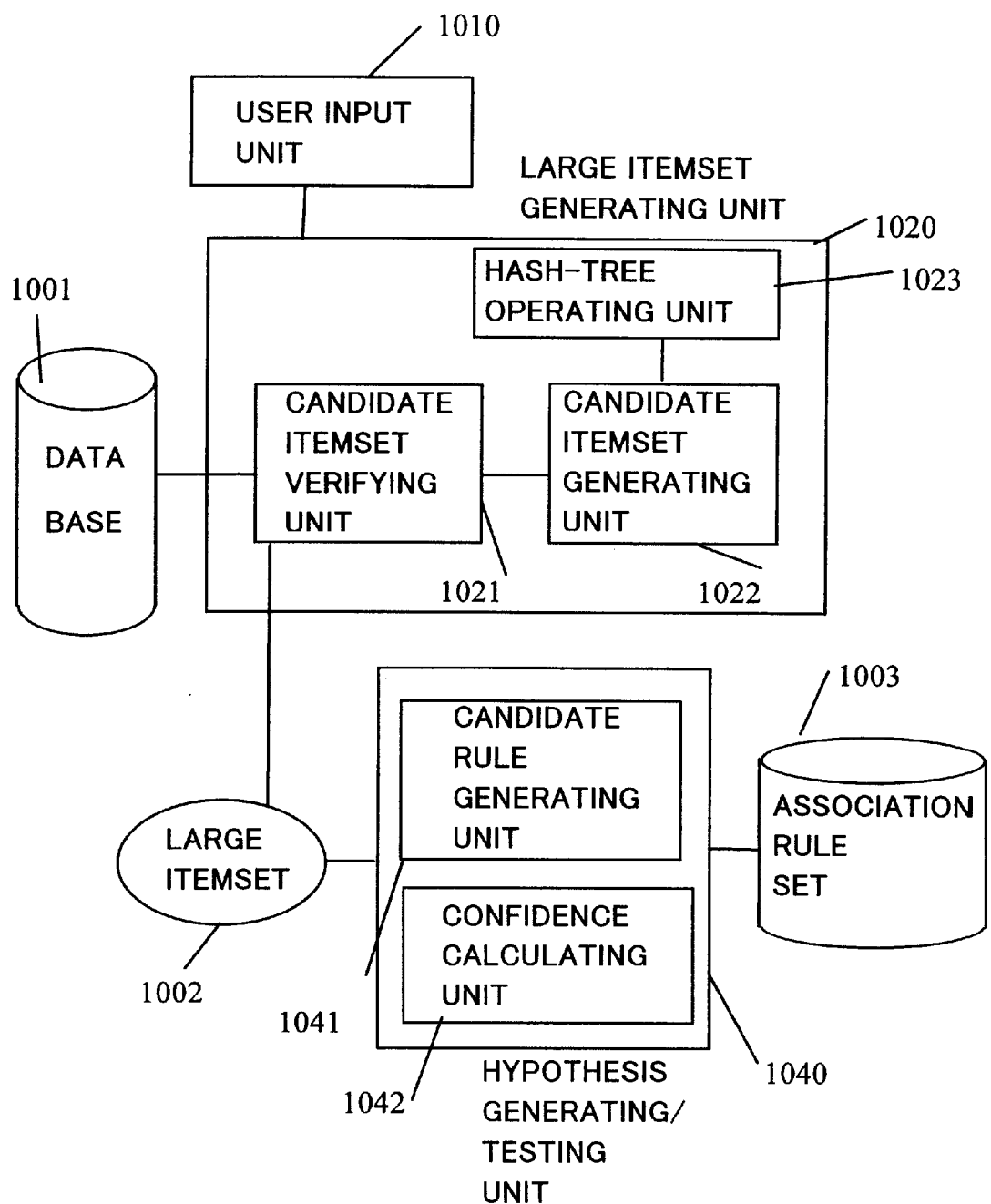
FIG. 37 shows a system of Embodiments 18 and 19 according to the present invention.
Figure 38:
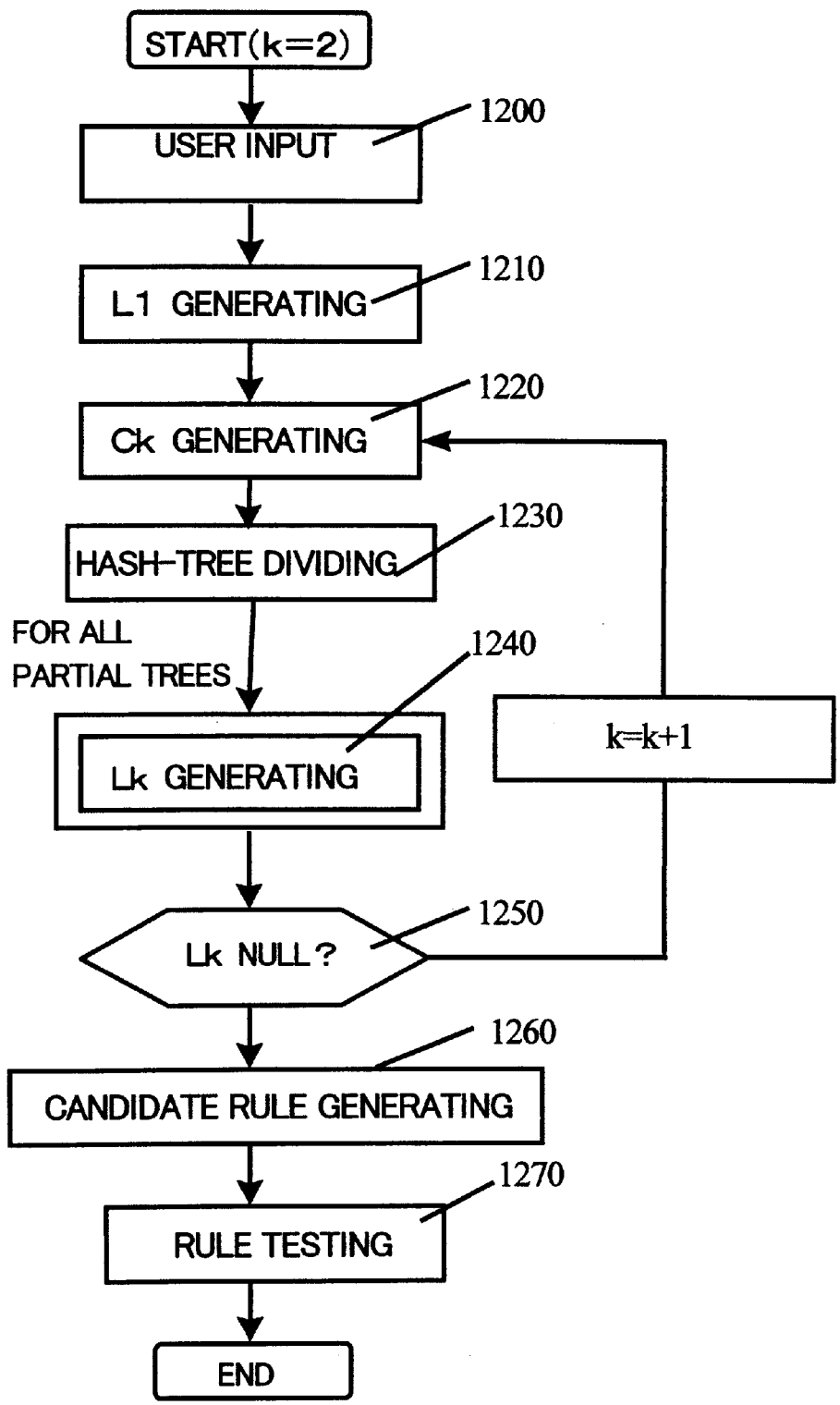
FIG. 38 shows a block diagram of Embodiment 18 according to the present invention.
Figure 39A:
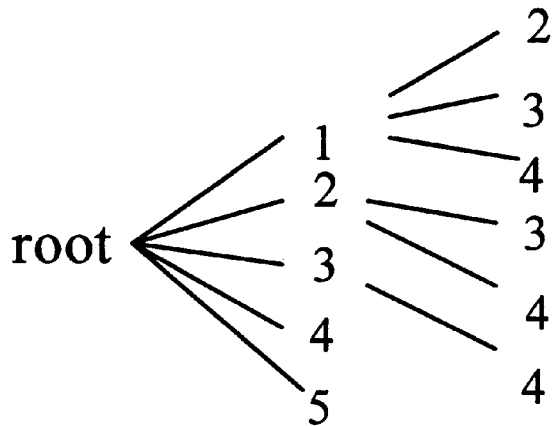
FIG. 39A shows a state of hash-tree used in Embodiment 18 according to the present invention.
Figure 39B:
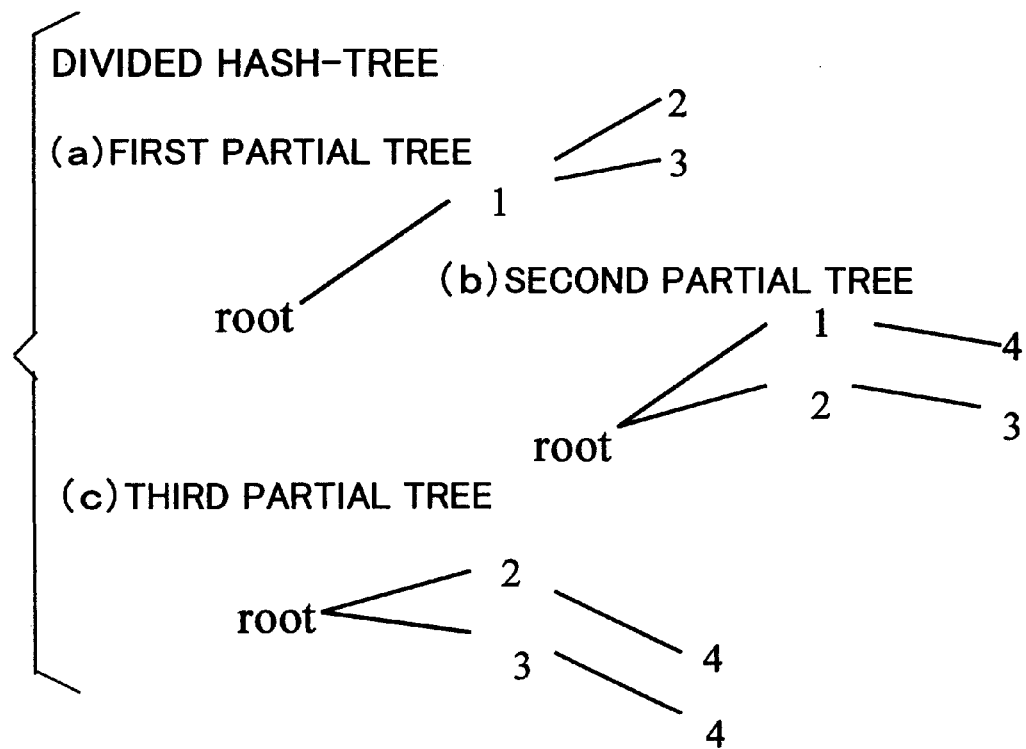
FIG. 39B shows another state of hash-tree used in Embodiment 18 according to the present invention.
Figure 53:
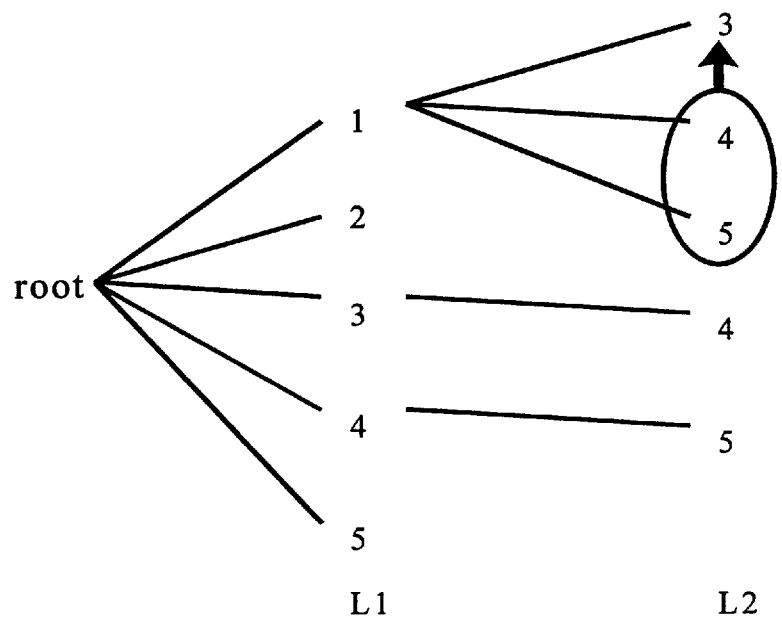
FIG. 53 shows a hash-tree used for Embodiment 18 according to the present invention.
Figure 54A:
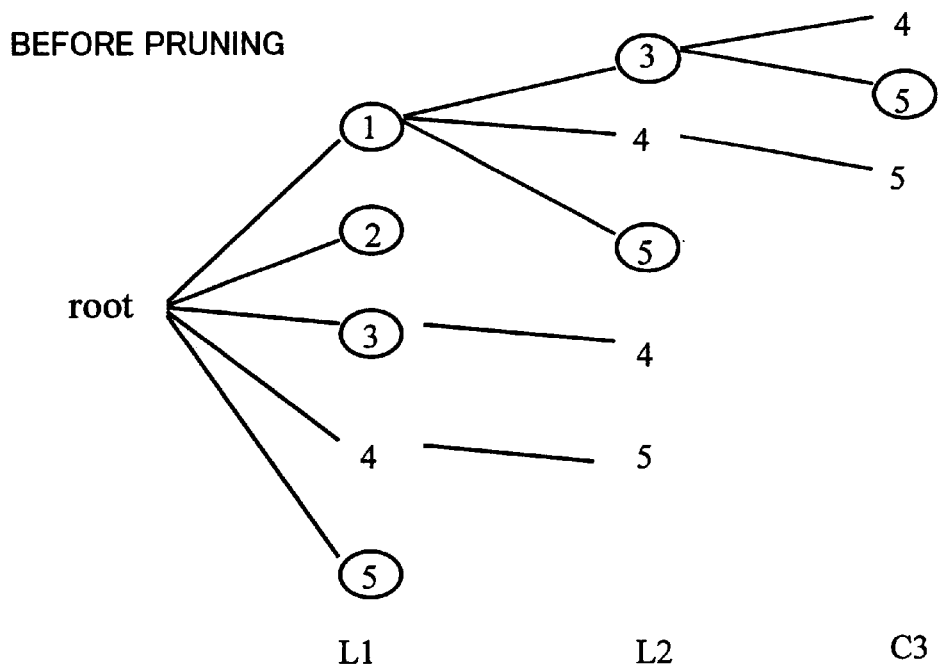
FIG. 54A shows a hash-tree before pruning used for Embodiment 18 according to the present invention.
Figure 54B:
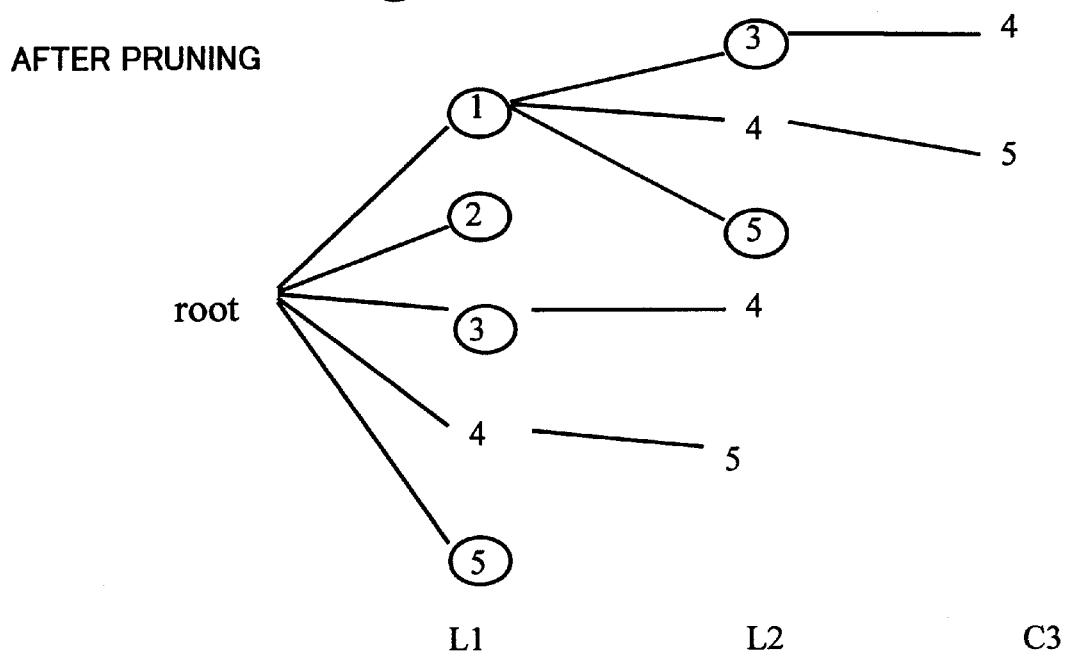
FIG. 54B shows a hash-tree after pruning used for Embodiment 18 according to the present invention.
Figure 55:
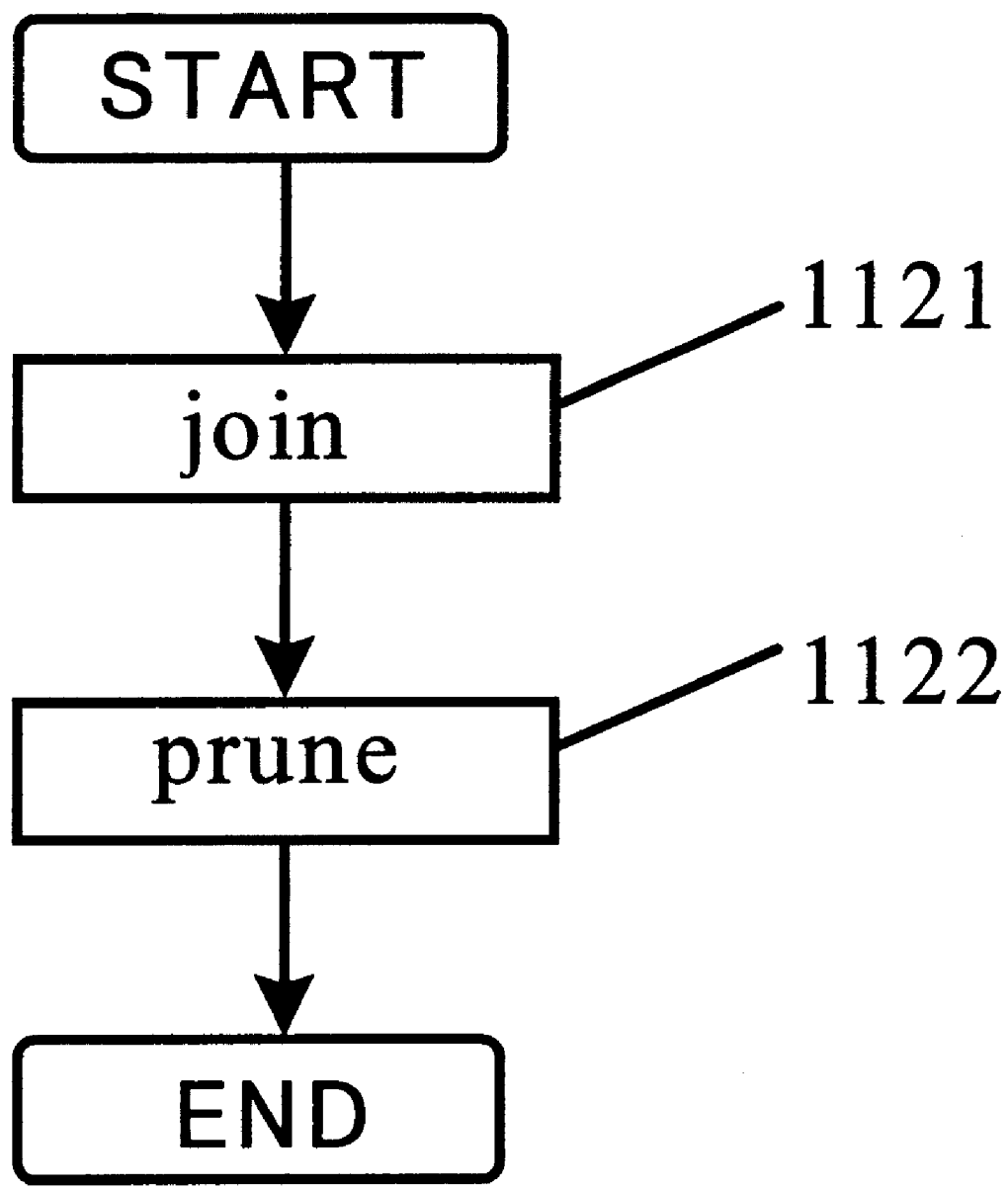
FIG. 55 is a block diagram showing a detailed Ck generation of Embodiment 18 according to the present invention.
Figure 56:
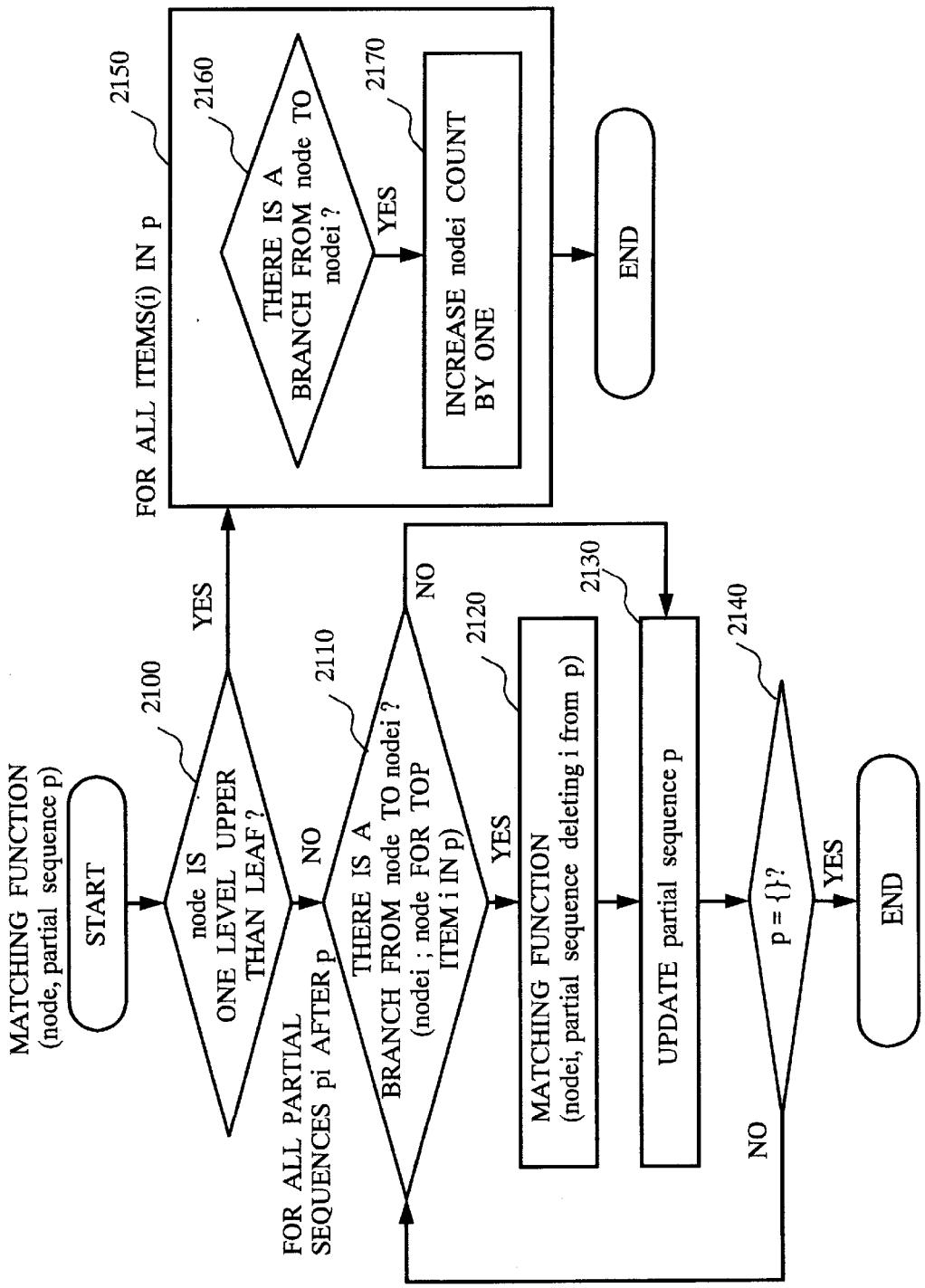
FIG. 56 is a block diagram applying a matching function used in a conventional art.
Figure 57:
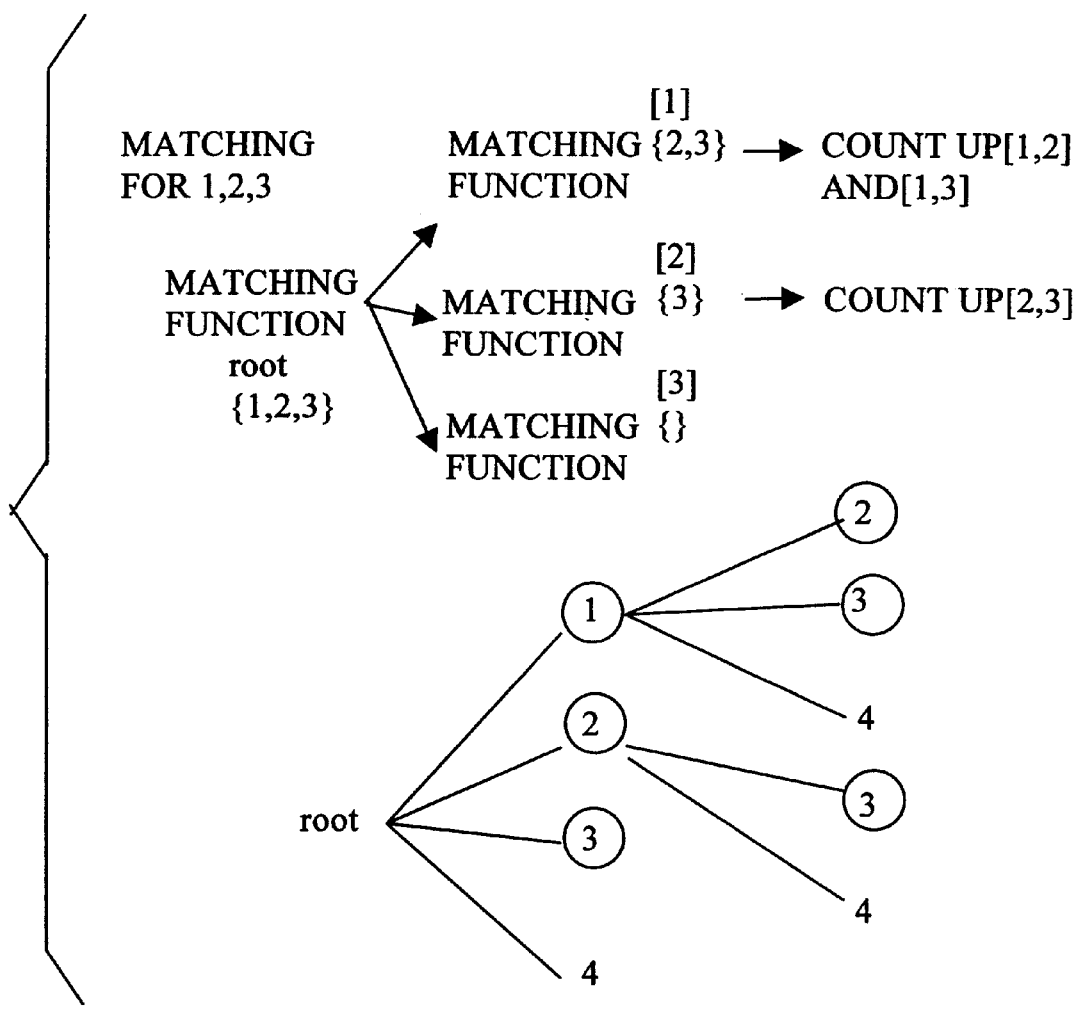
FIG. 57 shows a state applying a matching function in a conventional art.

FIG. 37 shows a system of association rule discovering apparatus of the present embodiment, FIG. 38 is a block diagram showing the association rule discovering apparatus, FIGS. 39A and 39B show hash-tree dividing, FIG. 51 shows a database, FIGS. 52, 53, 54A and 54B show the procedure of candidate-itemset Ck generating, and FIG. 55 is a block diagram showing detailed candidate-itemset Ck generation.

The system configuration of this embodiment will be described. The followings are provided in the association rule discovering apparatus shown in FIG. 37: an accumulated database 1001 whose configuration is shown in FIG. 51, a large-itemset 1002 generated from the database 1001, an association rule set 1003 which is a set of verified association rules generated from the large-itemset 1002, a user input unit 1010 where the user inputs a specific parameter, and a large-itemset generating unit 1020 for generating a large-itemset from the database 1001. The large-itemset generating unit 1020 is composed of a candidate-itemset verifying unit 1021, a candidate-itemset generating unit 1022, and a hash-tree operating unit 1023. The candidate-itemset verifying unit 1021 verifies a candidate-itemset and selects a large-itemset. The candidate-itemset generating unit 1022 generates a candidate-itemset. The hash-tree operating unit 1023 divides the hash-tree into partial trees to be within the memory area arranged for the hash-tree. A hypothesis generating/testing unit 1040 also shown in FIG. 37 generates a hypothesis for obtaining an association rule and tests the generated hypothesis. The hypothesis generating/testing unit 1040 is composed of a candidate rule generating unit 1041 for generating a candidate for association rule and a confidence calculating unit 1042 for calculating a frequency of each candidate rule.

Now, the procedure of discovering an association rule according to the present embodiment is explained with reference to FIG. 38.

At a user input step 1200, a minimum frequency and a minimum confidence are obtained from the user through the user input unit 1010.

Figure 52:
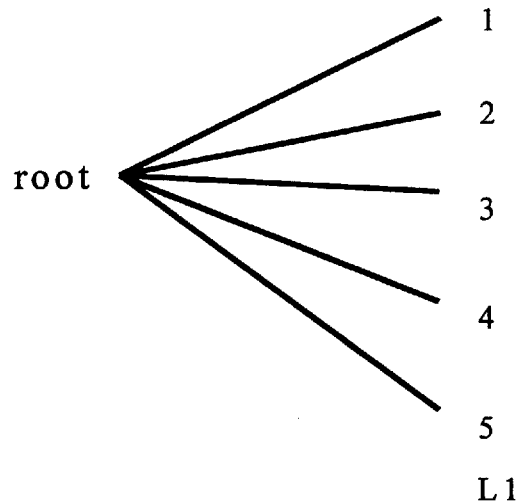
FIG. 52 shows a hash-tree used for Embodiment 18 according to the present invention.

At an L1 generating step 1210, the candidate-itemset verifying unit 1021 selects a record from the database 1001 one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are registered in a hash-tree as a large-itemset L1. FIG. 52 shows the case that each frequency of five items, 1, 2, 3, 4, and 5 is more than the minimum frequency and the five items are registered in the hash-tree.

Both ends of each branch of the hash-tree are called nodes and generally item numbers are correspondingly assigned to the nodes. At the beginning end of the hash-tree, no item number is assigned to the node, which is called a root. The number of branches, from the root to the last node, is called a branch length. Therefore, each branch length in FIG. 52 is 1. A node closer to the root than the other one at each branch is called a parent node, and farther one is called a child node.

At a Ck generating step 1220, a candidate-itemset Ck is generated from a large-itemset Lk−1 of k−1 long, by the candidate-itemset generating unit 1022. k is initially 2 (k=2).

Now, the case of C3 being generated from L2 will be explained. FIG. 53 illustrates a hash-tree made up to the state of L2. The detail of the Ck generating step is shown in a block diagram of FIG. 55 having two-step procedures: a join step 1121 and a prune step 1122.

Referring to FIGS. 53 and 54A, the join step 1121 is described with reference to a node (called an original node here) at a branch end of k−1 long. New branches are extended in order to make child nodes for the original node. The child nodes should have item numbers larger than the item number assigned to the original node out of item numbers assigned to other nodes having the same parent node as the original node. The node shown as root→1→3, in FIG. 53 is expressed by [1, 3]. (This expression is used hereinafter for representing a node in the hash-tree). Concerning the node [1,3], nodes [1,4] and [1,5] which have the same parent node as the node [1,3] and whose item numbers 4 and 5 are larger than 3, are joined to the node [1,3] to be [1,3,4] and [1,3,5]. Concerning [1,4], [1,5] is joined to be [1,4,5]. No new branch is extended for the node [1,5] because there is no larger item number than 5 for [1].

As stated above, preliminary candidate-itemsets made of three items are generated for the Ck generation. The above procedure is illustrated in FIG. 54A as a state before pruning.

Now, the prune step 1122 is explained. In the above join step 1121, a branch indicating an itemset whose length is extended to k has been made. Then, every (k−1)-itemset, made by deleting one item from the k-itemset, is checked whether the (k−1)-itemset is included in Lk−1 or not. Only when all the (k−1)-itemsets are included in Lk−1, the k-itemset is left to be utilized. If there is at least one (k−1)-itemset which is not included in Lk−1, the k-itemset is deleted.

For instance, in the case of checking [1,3,4], three 2-itemsets [1,3], [1,4], and [3,4] are checked to be in L2 or not. Referring to FIGS. 54A and 54B, as all of these three 2-itemsets are included in L2, [1,3,4] is left. In the case of checking [1,3,5], three 2-itemsets [1,3], [3,5], and [1,5] are checked to be in L2 or not. Since [3,5] does not exist in L2, [1,3,5] is deleted.

All the k-itemsets made in the join step 1121 are checked at the prune step 1122. A hash-tree after the pruning is shown in FIG. 54B.

In the initial state shown in FIG. 52, k equals 2 (k=2). A candidate-itemset C2 is generated from the large-itemset L1 through the preliminary candidate-itemset. Then, the generated candidate-itemset Ck is stored in the candidate-itemset generating unit 1022.

Now, a hash-tree dividing step 1230 will be executed. When the Ck generating step 1220 is finished, candidate-itemsets of k long are stored in the hash-tree. Then the hash-tree is divided into partial trees to be within the memory area (allowable memory amount of hash-tree) by the hash-tree dividing unit 1023. This procedure will be described below.

First, a hash-tree-amount-checking-set is generated. This set is initially null. A candidate-itemset Ck is read out from the candidate-itemset generating unit 1022 one by one, and added to the hash-tree-amount-checking-set. Every time when a new candidate-itemset Ck is added, total amount of nodes of the whole itemsets composing the hash-tree-amount-checking-set is calculated. The state of the hash-tree-amount-checking-set just before exceeding the allowable memory amount of hash-tree is memorized. Concretely, the second last added itemset, with respect to the last itemset by which the allowable memory amount of the partial hash-tree is just exceeded, is stored in the hash-tree operating unit 1023. Then, the hash-tree-amount-checking-set is reset to be null. The allowable memory amount of hash-tree may be decided based on a fraction (such as one-tenth, one-ninth) of the computer practical memory amount. The first partial tree is composed of itemsets from the first added itemset to the second last added itemset.

Next, candidate-itemsets are newly added to the null hash-tree-amount-checking-set one by one until the allowable memory amount of the hash-tree is exceeded. Namely the candidate-itemsets, from the last itemset, by which the allowable memory amount of the first partial tree is just exceeded, to the next itemset one by one, are added in order. In other words, the last itemset, by which the allowable memory amount is exceeded in making the first partial tree, is not used for the first partial tree but used for being added to the second partial tree as the first itemset. Then, the second last added itemset just at exceeding the allowable memory amount is stored in the hash-tree operating unit 1023. The second partial tree is composed of itemsets from the first added itemset to the second last added itemset. Again, the hash-tree-amount-checking-set is reset to be null. In this way, the third, the fourth, . . . , partial trees are composed until every candidate-itemset has been assigned to one of partial trees. FIG. 39B shows partial trees made by dividing the hash-tree of FIG. 39A. In this case, it is operated not to include a candidate-itemset whose number of items is less than k, in the partial tree. The hash-tree operating unit 1023 stores last itemsets of each partial tree.

An Lk generating step 1240 will be described in detail. A record is selected from the database one by one to count the number(frequency) of k-itemsets in the candidate-itemsets in the first partial tree. Then, only k-itemsets whose frequencies are more than the minimum frequency are left to be elements of Lk. Matching is performed between the record and the hash-tree in counting the number of k-itemsets.

Now, the matching will be explained. First, a record is selected from the database one by one, and checking is performed for the selected record along the first hash-tree from the root. Then, it is checked whether an item corresponding to a child node of the root exists in the record or not. If such an item does not exist in the record, the matching for the record is finished to check the next record. When such an item exists in the record, it is checked whether an item corresponding to a next child node (grandchild node of the root) exists in the record or not.

This operation is repeatedly performed. If a child node does not have any branch at its lower level in the hash-tree, such a child node is called a leaf. In checking a record, when a node's child node is a leaf and an item corresponding to the leaf exists in the record, the frequency counting for the leaf node is increased, which means that the matching for the record is completed. At the time of all the matching procedures having been completed for every record, the frequency count value for each leaf node represents the frequency of each k-itemset (an itemset from the root to the leaf node).

As stated above, the frequency of each k-itemset is counted. A large-itemset Lk is generated by selecting k-itemsets having frequencies more than the minimum frequency as elements of the large-itemset Lk, and is stored in the large-itemset 1002.

Concerning the second partial tree, similar to the case of the first partial tree, matching between the record and the hash-tree is performed and only k-itemsets whose frequencies are more than the minimum frequency are left to be elements of Lk. Similar to the above, the frequency counting is performed in all the partial trees, and large-itemsets are selected to be stored in the large-itemset 1002.

If, at the Lk generating step, no k-itemset is selected to be an element of Lk, it goes to a candidate rule generating step 1260. When there is a k-itemset to be included Lk, one is added to k and it goes back to the Ck generating step 1220.

At the candidate rule generating step 1260, the candidate rule generating unit 1041 generates a candidate for the association rule from the large-itemsets 1002 generated through the previous steps. k candidate rules are generated from a k-itemset in Lk. In the RHS of the k candidate rules, an item out of items in k-itemset is described. In the LHS of the k candidate rules, k−1 items made by deleting the item in RHS from the items in k-itemset are described. This candidate rule generating process is performed for all the k-itemsets in Lk when k is equal to or more than 2 (k>=2).

At a rule testing step 1270, the confidence calculating unit 1042 calculates a confidence of each candidate rule. When the confidence of a candidate rule is larger than the minimum confidence, the candidate rule is added the an association rule set. As stated above, the confidence of the candidate rule A1, A2, . . . , Ak→B is calculated by the following expression:

confidence=s(A1,A2, . . . ,Ak,B)/s(A1,A2, . . . ,Ak)

where $s(\theta)$ is a frequency of itemset $\theta$

As each LHS corresponds to a large-itemset, the frequency has been already obtained at this point.

As stated above, the association rule discovering apparatus and method according to the present embodiment includes the hash-tree dividing step for dividing a hash-tree into partial trees to be within a specific amount memory, and the Lk generating step for performing matching between each divided partial tree and the database and selecting a large-itemset Lk.

Therefore, the paging of the hash-tree can be suppressed, which makes the process time reduced.

Embodiment 19.

Figure 40:
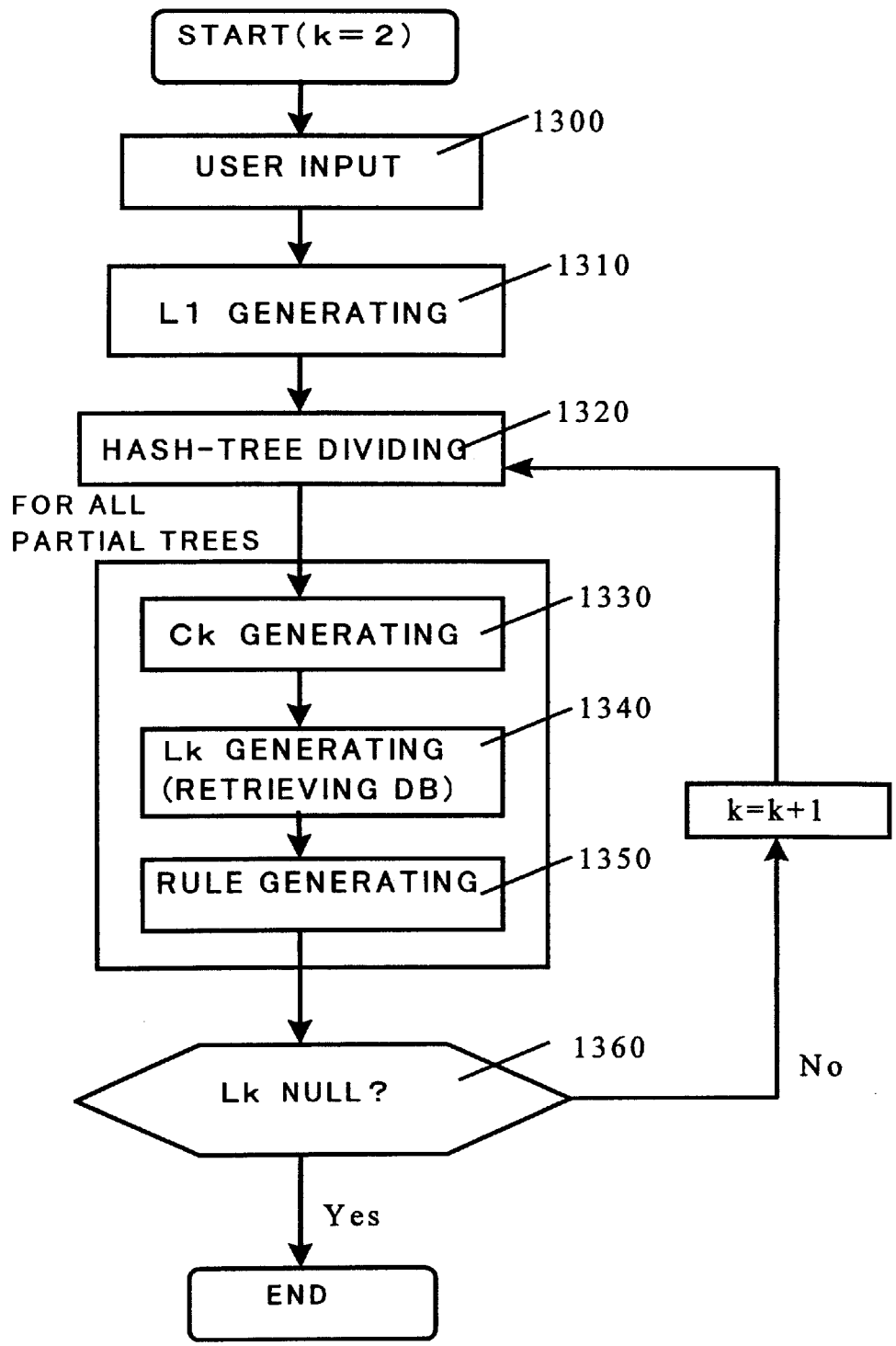
FIG. 40 shows a block diagram of Embodiment 19 according to the present invention.

Referring to FIGS. 37, 40 and 41, an association rule discovering apparatus and method according to Embodiment 19 will now be explained.

FIG. 37 shows a system of association rule discovering apparatus of the present embodiment, FIG. 40 is a block diagram of the present embodiment, and FIG. 41 shows the procedures from reading a large-itemset file step to generating a rule step.

The unit operations of Embodiment 19 shown in FIG. 37 are the same as those of the identical name units of Embodiment 18 except that the operations of the candidate-itemset verifying unit 1021 and the hash-tree operating unit 1023 are different in Embodiments 18 and 19.

In Embodiment 18, the item numbers selected for L1 elements are not changed, meaning the original numbers have been used. In this Embodiment 19, item numbers are re-assigned to the selected items at L1, in order of frequency from large to small.

Now, the procedure of discovering an association rule according to the present embodiment is explained with reference to FIG. 40.

At a user input step 1300, a minimum frequency and a minimum confidence are obtained from the user through the user input unit 1010.

At an L1 generating step 1310, the same operation as the L1 generating step 1210 of Embodiment 18 is performed and then item numbers are re-assigned to items in order of frequency from large to small.

The L1 generating step 1310 will be explained in detail.

The candidate-itemset verifying unit 1021 selects a record from the database 1001 one by one, counts appearing times of each item in the record, and increases a counting number (frequency) of the item. If a new item appears, a counting area for the new item is newly provided.

After all the items in all the records have been counted, only the items each of which has a total counted frequency more than the minimum frequency are re-assigned new item numbers in order of the frequency from large to small and registered in a hash-tree as a large-itemset L1.

Namely, the hash-tree is composed of numbers from 1 to n (n: the number of items whose frequencies are more than the minimum frequency). An optional number in the numbers from 1 to n is assigned to a node in the hash-tree.

At a hash-tree dividing step 1320, the hash-tree operating unit 1023 divides the hash-tree storing Lk−1 which is a set of large-itemsets of k−1 long.

First, a hash-tree-amount-checking-set is generated. This set is initially null. Itemsets are added to the hash-tree-amount-checking-set one by one in order of item numbers from small to large. Every time when a new itemset is added, total amount of nodes of the whole itemsets composing the hash-tree-amount-checking-set is calculated. The state of the hash-tree-amount-checking-set just before exceeding the specific value (allowable memory amount of initial hash-tree) is stored.

Concretely, the second last added itemset, with respect to the last itemset by which the allowable memory amount of initial hash-tree is just exceeded, is stored in the hash-tree operating unit 1023. Then, the hash-tree-amount-checking-set is reset to be null.

The allowable memory amount of initial hash-tree may be decided based on a fraction of the allowable memory amount of hash-tree. Similar to Embodiment 18, the allowable memory amount of hash-tree may be decided based on a fraction of the computer practical memory amount.

Next, itemsets which have not been used yet are newly added to the null hash-tree-amount-checking-set one by one in order of item numbers from small to large until the allowable memory amount of initial hash-tree is exceeded. This procedure is repeated in order to divide Lk−1 into continuous large-itemsets each of which is within the allowable memory amount of initial hash-tree, and to make each partial tree by using the each large-itemset.

Operations from a Ck generating step 1330 to a rule generating step 1350 are performed at each partial tree.

The Ck generating step 1330 is performed by the candidate-itemset generating unit 1022. As the nodes of each partial tree are not enough to extend its branches, it is impossible to perform the join step like Embodiment 18. Then, with respect to some end node, nodes having numbers more than the original node (end node) number and equal to or less than n are newly generated, and linking is performed between the end node and new nodes.

At the join step in the Ck generating step of Embodiment 18, with respect to a node (called an original node here), new branches are extended in order to make child nodes for the original node. In that case, the child nodes should have item numbers larger than the item number of the original node out of item numbers of other nodes having the same parent node as the original node. In this Embodiment 19, however, new numbers are assigned regardless of the parent node, meaning continuous item numbers from 1 to n are assigned, which makes the operation easy.

Referring to (1) of FIG. 41, when there are five items whose frequencies are more than the minimum frequency, three nodes 3, 4, and 5 are set at the lower level of the large-itemset [1, 2]. Namely, three candidate-itemsets [1, 2, 3], [1, 2, 4], and [1, 2, 5] are generated. The similar procedure is performed for [1, 3] to extend its branches. (2) of FIG. 41 shows the last state of this step. The prune step like Embodiment 18 is not performed in this Embodiment 19.

The operation of an Lk generating step 1340 is the same as Embodiment 18. The matching between the record and the hash-tree is performed in counting the number (frequency) of each k-itemset. Only k-itemsets whose frequencies are more than the minimum frequency are left to be elements of Lk. (3) of FIG. 41 shows an example indicating that two large-itemsets are left.

At a rule generating step 1350, k rules based on large-itemsets having length k in the partial tree are tested. With respect to the large-itemset [1, 2, 3], for instance, three rules 1, 2→3, 1, 3→2 and 2, 3→1 are tested. Though frequencies of k large-itemsets having length k−1 are needed for testing the above rules, the k large-itemsets are not necessarily obtained in the partial trees to which the large-itemsets having length k belong. Therefore, it is necessary to add nodes which are not included in the partial tree, to the partial tree. Not only large-itemsets of k−1 long belonging to the partial tree but also large-itemsets of k−1 long not belonging to the partial tree should be included in a memory. This is the reason for deciding the allowable memory amount of initial hash-tree used at the hash-tree dividing step to be less than the practical allowable memory amount of hash-tree. (4) of FIG. 41 shows the partial tree to which nodes are added, and the dotted lines in the figure show the branches to the added nodes. Similar to Embodiment 18, as each LHS corresponds to a large-itemset, the frequency has been already obtained at this point.

The operations from the Ck generating step to the rule generating step are performed for all the partial trees. When the total number of large-itemsets of k long generated at all the partial trees is zero, the program goes to the end. If the total number is not zero, one is added to k to go back to the hash-tree dividing step.

As stated above, the association rule discovering apparatus and method of the present embodiment includes the L1 generating step for assigning optional continuous numbers to items equal to or more than lower limit value Smin. The Ck generating step, the Lk generating step, the candidate rule generating step and the rule testing step are performed for each of divided partial trees.

Therefore, the paging of hash-tree is suppressed to happen and the processing time is reduced.

In addition, the present embodiment includes the L1 generating step for assigning continuous numbers from 1, to items whose frequencies equal to or more than lower limit value Smin, in order of the frequency from large to small.

Accordingly, a candidate-itemset Ck can be easily generated even at the partial trees.

Embodiment 20.

Referring to FIGS. 42 through 45, an association rule discovering apparatus and method according to Embodiment 20 will now be explained.

Figure 42:
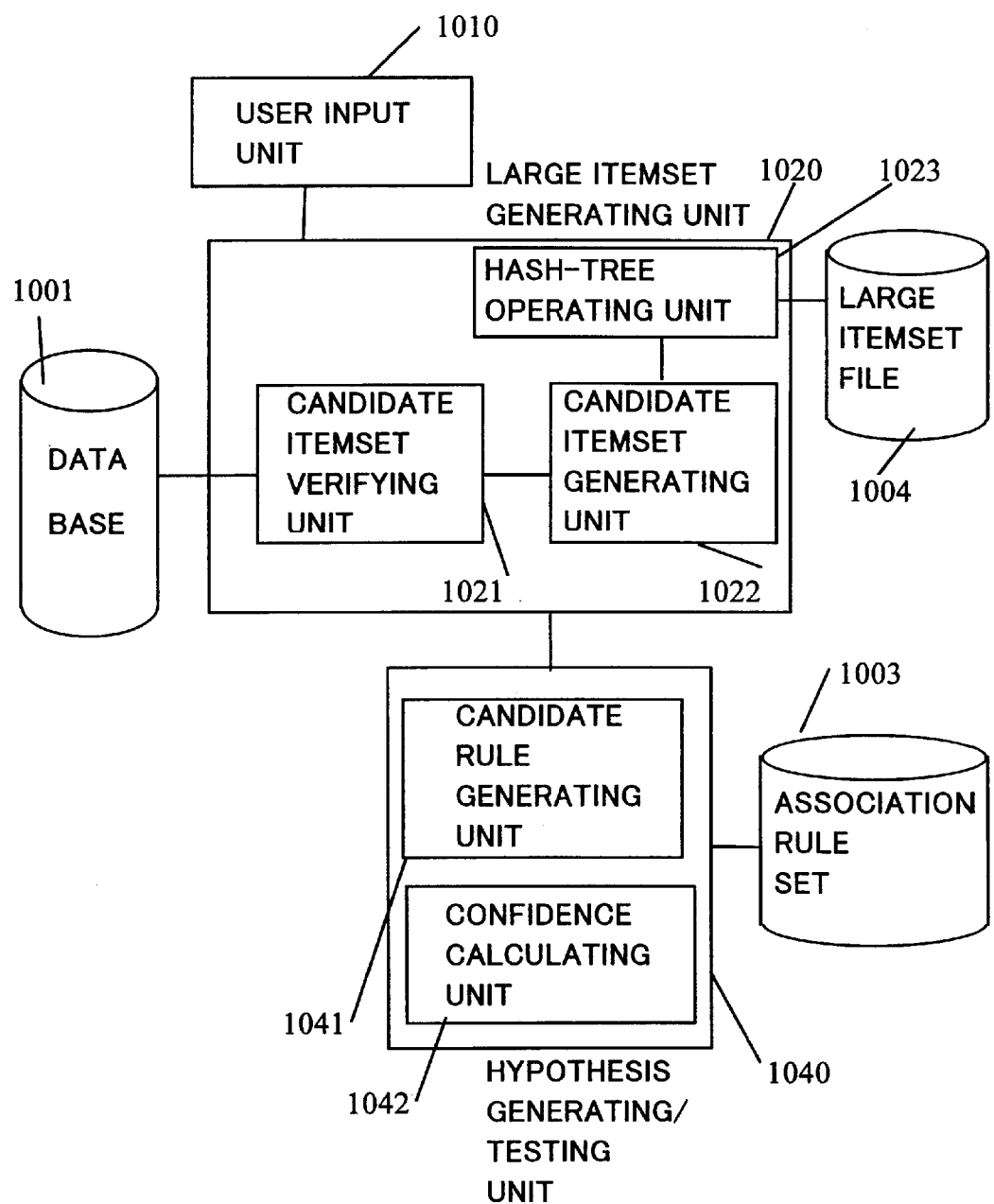
FIG. 42 shows a system of Embodiments 20, 21, 22 and 24 according to the present invention.
Figure 43:
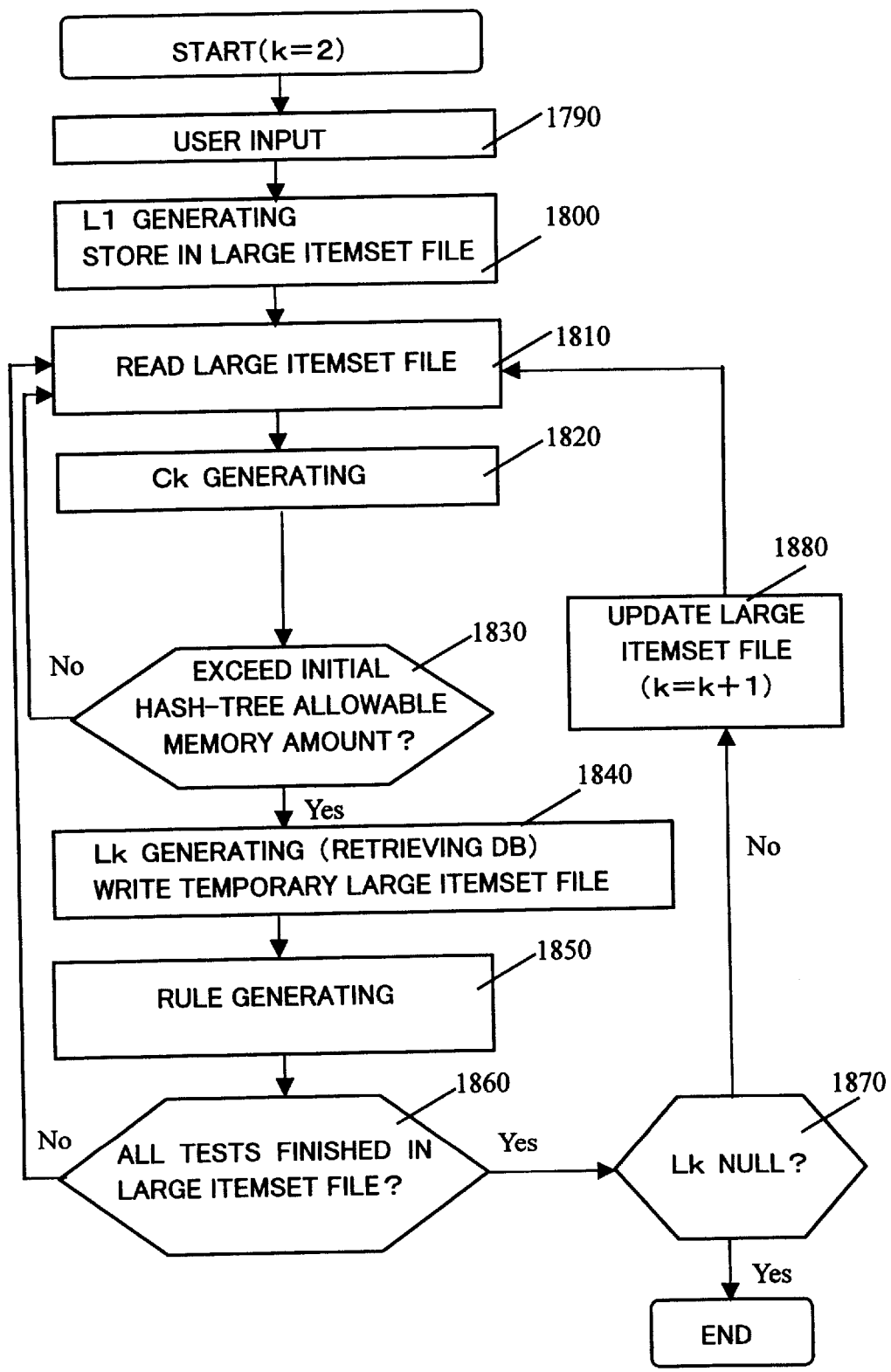
FIG. 43 shows a block diagram of Embodiments 20, 21 and 22 according to the present invention.
Figure 45:
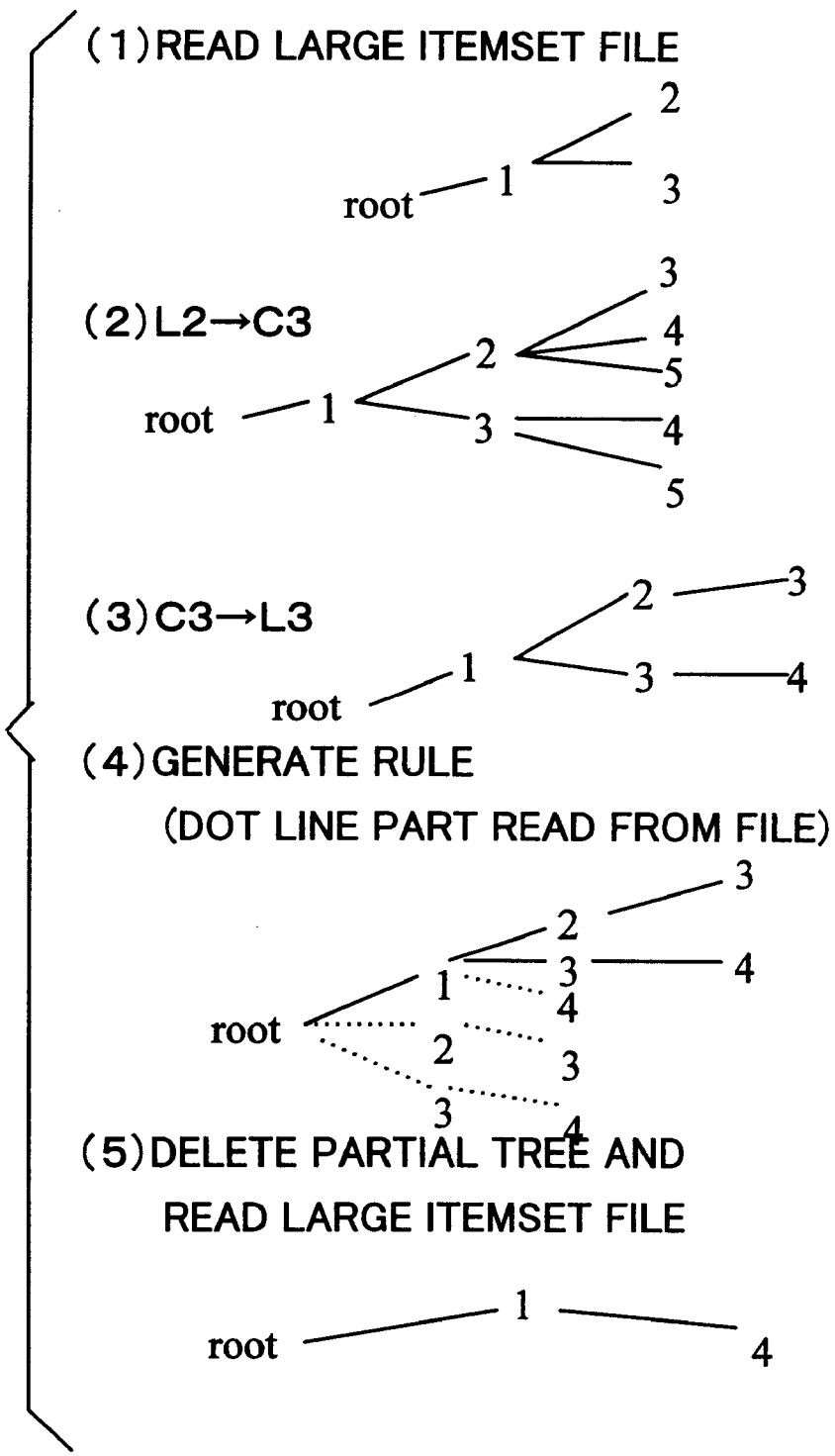
FIG. 45 shows states of hash-tree used in Embodiment 20 according to the present invention.

FIG. 42 shows a system of the present embodiment, FIG. 43 is a block diagram showing the present embodiment, FIG. 44 shows a large-itemset file according to the present embodiment and FIG. 45 shows the procedures from reading a large-itemset step to generating a rule step.

The unit operations of Embodiment 20 shown in FIG. 42 are the same as those of the identical name units of Embodiment 19 shown in FIG. 37 except that the operations of the candidate-itemset verifying unit 1021, the hash-tree operating unit 1023 and the candidate rule generating unit 1041 are different in Embodiments 19 and 20. The hash-tree operating unit 1023 manages large-itemsets by using a large-itemset file 1004, and generates or cancels hash-trees.

Now, the procedure of discovering an association rule according to the present embodiment is explained with reference to FIG. 43.

At an L1 generating step 1800, the same operation as the L1 generating step 1210 of Embodiment 18 is performed and then item numbers are re-assigned to items in order of frequency from large to small.

The L1 generating step 1800 will be explained in detail. The candidate-itemset verifying unit 1021 selects a record from the database 1001 one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are re-assigned new item numbers in order of the frequency from large to small and registered in a hash-tree as a large-itemset L1.

Namely, the hash-tree is composed of numbers from 1 to n (n: the number of items whose frequencies are more than the minimum frequency). The numbers from 1 to n are assigned to nodes of the hash-tree.

The generated L1 is stored in the large-itemset file 1004 by the hash-tree operating unit 1023. As shown in FIG. 44, the large-itemset file 1004 stores items composing a large-itemset and their frequencies. A large-itemset of 2 long is stored in the case of FIG. 44 and the first line of FIG. 44 shows that the large-itemset is [1, 2] and its frequency is 10. The large-itemset file 1004 generated at the L1 generating step 1800 stores large-itemsets of 1 long.

At a large-itemset file reading step 1810, a large-itemset of k−1 long is read from the read position in the large-itemset file and is added to the hash-tree. Then, the read position in the large-itemset file is forwarded by one large-itemset. Just after the L1 generation, the read position is located at the top of the file and the hash-tree initially includes no large-itemset. To explain the below concretely, [1, 2] has been registered in the hash-tree just before the large-itemset file reading step 1810 is executed. Then, at the large-itemset file reading step 1810, [1, 3] is selected from the largeitemset file 1004 and added to the hash-tree as shown in (1) of FIG. 45.

A Ck generating step 1820 is performed by the candidate-itemset generating unit 1022. As the nodes of each partial tree are not enough to extend its branches, it is impossible to perform the join step like Embodiment 18. Then, with respect to some end node, nodes having numbers, more than the end node number and equal to or less than n, are newly generated and linked to the end node, similar to Embodiment 19.

As new numbers, continuous item numbers from 1 to n, are assigned, the operation easily performed.

When there are five items whose frequencies are more than the frequency in the case of the large-itemset [1, 2], three nodes 3, 4, and 5 are set at the lower level of the large-itemset [1, 2]. Namely, three candidate-itemsets [1, 2, 3], [1, 2, 4], and [1, 2, 5] are generated. (2) of FIG. 45 shows this state of the hash-tree. The prune step like Embodiment 18 is not performed in this Embodiment 20.

At a step 1830, the amount of hash-tree is checked. If the amount exceeds the allowable memory amount of initial hash-tree, it goes to an Lk generating step 1840. If the hash-tree amount has not exceeded the allowable memory amount of partial hash-tree, it goes back to the large-itemset file reading step 1810.

The allowable memory amount of initial hash-tree may be decided based on a fraction of the allowable memory amount of hash-tree. Similar to Embodiment 18, the allowable memory amount of hash-tree may be decided based on a fraction of the computer practical memory amount.

When it goes back to the large-itemset file reading step 1810, if all the large-itemsets have been already read, it goes to the Lk generating step 1840.

The Lk generating step 1840 is performed by the candidate-itemset verifying unit 1021. The operation of the Lk generating step 1840 is the same as that of Embodiment 1. Matching between the record and the hash-tree is performed in order to count the number of k-itemsets. Then, only k-itemsets whose frequencies are more than the minimum frequency are left to be elements of Lk. The generated large-itemset of k long is stored in a temporary large-itemset file in the large-itemset file 1004. (3) of FIG. 45 shows the hash-tree state in the case that large-itemsets more than the minimum frequency are [1, 2, 3] and [1, 3, 4].

At a rule generating step 1850, k rules based on large-itemsets having length k in the hash-tree are tested. With respect to the large-itemset [1, 2, 3], for instance, three rules 1, 2→3, 1, 3→2 and 2, 3→1 are tested. Though frequencies of k large-itemsets having length k−1 are needed for testing the above rules, the k large-itemsets are not necessarily obtained in the hash-tree of the present state. Therefore, the candidate rule generating unit 1041 reads large-itemsets of k−1 long not included in the hash-tree, from the large-itemset file 1004 through the hash-tree operating unit 1023. As the frequency of the large-itemset of k long is more than the minimum frequency, a frequency of large-itemset of k−1 long, which is made by deleting one item from the large-itemset of k, is more than the frequency of large-itemset of k long. The large-itemsets of k−1 long are stored in the large-itemset file 1004.

Not only large-itemsets of k−1 long belonging to the partial tree but also large-itemsets of k-long not belonging to the partial tree should be included in a memory. This is the reason for deciding the allowable memory amount of initial hash-tree used at the hash-tree dividing step to be less than the practical allowable memory amount of hash-tree. (4) of FIG. 45 shows the hash-tree at this state and the dotted lines in the figure show the branches to the added nodes.

When the operations from the Ck generating step to the rule generating step have finished, if all the large-itemsets in the large-itemset file have not been read yet, it goes back to the large-itemset file reading step 1810. If all the large-itemsets in the large-itemset file have been already read and the number of large-itemsets of k long in the temporary large-itemset file is zero, the program becomes finished.

If the number of large-itemsets of k long in the temporary large-itemset file is not zero, one is added to the value k and the temporary large-itemset file is defined as a large-itemset file by changing the file name. Then, it goes back to the large-itemset file reading step with setting the read position in the file to be the top position.

When the rule generating step 1850 is finished, the hash-tree of (4) in FIG. 45 is cancelled and [1, 4], which is the next of the previous read position [1, 3] in the large-itemset file, is read to compose the hash-tree of (5) in FIG. 45.

Supposing that the allowable memory amount of initial hash-tree is Wi and the allowable memory amount of hash-tree is W, it can be defined Wi=W/k. This is because that the number of large-itemsets of k−1 long which are needed at the rule generating step, is equal to or less than k times the number of large-itemsets which are generated at the large-itemset generating step.

If the value of k is the same as previous k value used at this step before and if the final amount of hash-tree made at the rule generating step before is less than W, it is acceptable to revise the allowable memory amount of initial hash-tree (Wi) by adding a value (the value: a fraction of difference between W and the value lower than W).

As stated above, the association rule discovering apparatus and method of the present embodiment includes the following steps: At the L1 generating step, data of the large-itemset L1 is stored in the large-itemset file after optional continuous item numbers are assigned to items. At the large-itemset file reading step, data of (k−1)-itemsets in the large-itemset Lk−1 is read from the large-itemset file and the data is stored in the hash-tree. At the amount checking step, amount of hash-tree storing a candidate-itemset Ck is compared with a specific amount less than the allowable amount of hash-tree, it is indicated to go back to the large-itemset file reading step when the amount of hash-tree is less than the specific amount, and it is indicated to go to the next step when the amount of hash-tree is more than the specific value.

Accordingly, the paging is suppressed and the process time is reduced.

At the rule generating step of the present embodiment, the frequencies of (k−1)-itemsets are read from the large-itemset file. Therefore, it is not necessary to retrieve the database, which reduces the process time.

At the large-itemset file reading step of the present embodiment, an itemset is read one by one. Then, checking the amount of itemset is easily performed. In the present embodiment, the specific amount is defined to be one-kth of the allowable amount, consequently no more memory than practically needed is secured. Accordingly, the memory can be effectively utilized.

Embodiment 21.

Referring to FIGS. 42 through 44, an association rule discovering apparatus and method according to Embodiment 21 will now be explained.

FIG. 42 shows a system of the present embodiment, FIG. 43 is a block diagram showing the present embodiment, and FIG. 44 shows a large-itemset file according to the present embodiment.

In Embodiment 20, the order of storing large-itemsets L1 in the large-itemset file is not specified. In this Embodiment 21, large-itemsets L1 having length 1 are stored in the large-itemset file in the order of numbers from 1 to n.

The operation of the L1 generating step 1800 in FIG. 43 is the same as Embodiment 20. Large-itemsets of 1 long are stored in the large-itemset file 1004 in the order of 1 to n.

The L1 generating step 1800 will be explained in detail. The candidate-itemset verifying unit 1021 selects a record from the database 1001 one by one, counts appearing times of each item in the record, and increases a counting number (frequency) of the item. If a new item appears, a counting area for the new item is newly provided. After all the items in all the records have been counted, only the items each of which has a total counted frequency more than the minimum frequency are reassigned new item numbers in order of the frequency from large to small and registered in a hash-tree as a large-itemset L1. Then, items are stored in the large-itemset file in order of the item numbers from 1 to n.

Namely, the hash-tree is composed of numbers from 1 to n (n: the number of items whose frequencies are more than the minimum frequency). The numbers from 1 to n are assigned to nodes of the hash-tree.

Even when the length (k−1) of large-itemset in the large-itemset file is extended, large-itemsets are sorted and stored in the order of numbers from 1 to n. Operations after this are the same as Embodiment 20.

At the rule generating step 1850, large-itemsets of k−1 long not included in the hash-tree are read from just after the read position where the previous reading of large-itemset in the file has finished, which makes the process speed up.

In the present embodiment, it is not necessary for the large-itemset file to have data of frequencies of large-itemsets. If the file does not have the data, at the rule testing, the candidate rule generating unit 1041 adds nodes for large-itemsets of k−1 long not included in the hash-tree. Then, frequencies of large-itemsets of k long can be obtained by newly calculating the database.

In order to make the process speed up, at the rule testing, it is acceptable to compare the amount of the data file in the database with the amount of the large-itemset file. If the data file amount is smaller than the large-itemset file amount, frequencies are obtained by newly calculating the database. If the large-itemset file amount is smaller than the data file amount, frequencies are obtained by retrieving corresponding large-itemsets from the large-itemset file.

As stated above, according to the association rule discovering apparatus and method of the present embodiment, the following effects can be obtained.

Since large-itemsets in the large-itemset file are sorted in order from 1 to n, the read position, from which new large-itemsets in the large-itemset file are read in the rule generating step, can be specified. Namely, the process time is reduced.

A frequency of (k−1)-itemset is obtained by matching with the database, which makes the process time reduced because it is not necessary to write the frequency for the large-itemset.

At the rule generating step, the sizes of the large-itemset file and the database are compared, and frequencies of (k−1)-itemsets are obtained based on the smaller sized one. Therefore, frequencies are effectively obtained and the process time is shortened because unnecessary retrieving of the record is reduced.

Embodiment 22.

Referring to FIGS. 42, 43 and 46, an association rule discovering apparatus and method according to Embodiment 22 will now be explained.

FIG. 42 shows a system of the present embodiment, FIG. 43 is a block diagram showing the present embodiment, and FIG. 46 shows the procedure of generating a candidate rule according to the present embodiment.

The unit operations of Embodiment 22 shown in FIG. 42 are the same as those of the identical name units of Embodiment 21 except that the operations of the candidate-itemset generating unit 1022 and the hash-tree operating unit 1023 are different in Embodiments 21 and 22.

In reading the large-itemset file step of Embodiment 21, only the amount of hash-tree is taken into account and items composing branches are not taken into consideration. In this Embodiment 22, itemsets having common items except the last item in the large-itemset of the large-itemset file are collectively read.

Now, the procedure of discovering an association rule according to the present embodiment is explained with reference to FIG. 43

Operations performed in the steps of FIG. 43 are the same as those performed at the identical name steps of the above stated Embodiment except the large-itemset file reading step 1810 and the Ck generating step 1820. Then, only these two steps are described below. At the large-itemset file reading step 1810 performed by the hash-tree operating unit 1023, itemsets having common items except the last item in the large-itemset are collectively read from the read position in the large-itemset file. Namely, common items except the last item are necessarily included in the same hash-tree.

Figure 46A:
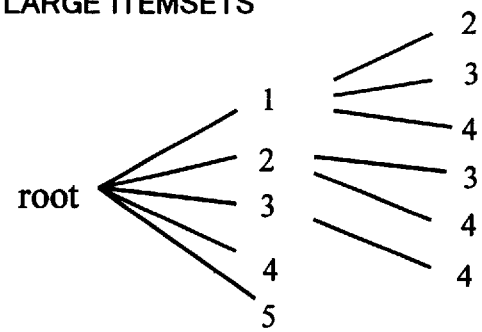
FIG. 46A shows a state of hash-tree used in Embodiment 22 according to the present invention.

FIG. 46A shows the case that the large-itemsets of 2 long are stored in the hash-tree when five items are more than the minimum frequency.

Figure 46B:
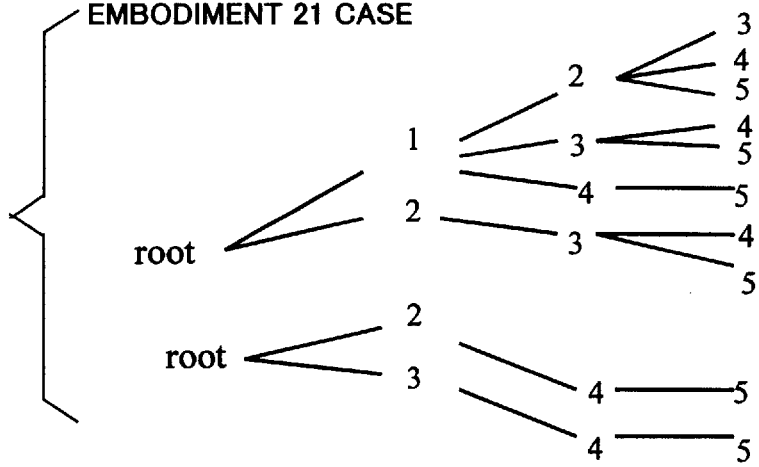
FIG. 46B shows another state of hash-tree used in Embodiment 22 according to the present invention.

In Embodiment 21, as shown in FIG. 46B, a hash-tree by the first loop and a hash-tree by second loop can be composed. [2, 3] and [2, 4] are allocated to separate hash-trees. As the end node 3 of [2, 3] does not know the existence of other node (4, in this case) having the same parent node (2, in this case), branch extension such as the join step in FIG. 55 of Embodiment 18 can not be performed. Therefore, all the nodes, more than 3 and equal to or less than 5, meaning 4 and 5 are set at the lower level of 3. Similarly, node 5, more than 4 and equal to or less than 5, should be set at the end node 4 of [2, 4].

Figure 46C:
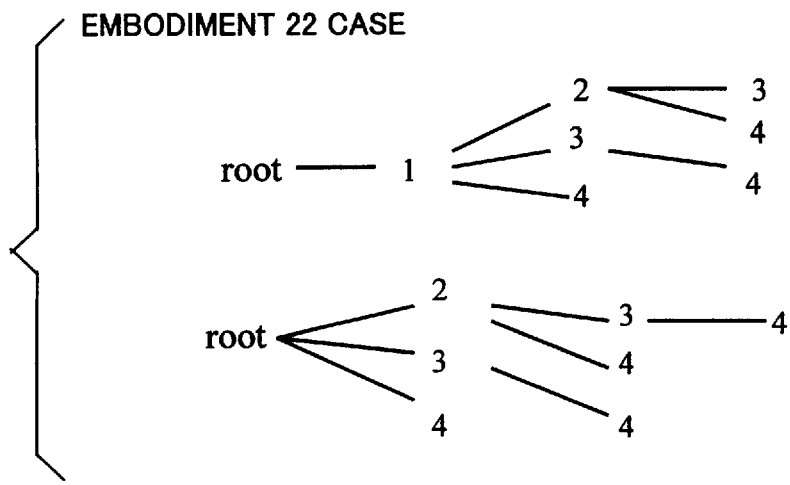
FIG. 46C shows another state of hash-tree used in Embodiment 22 according to the present invention.

According to this Embodiment 22, on the other hand, [2, 3] and [2, 4] are allocated to the same hash-tree, as shown in FIG. 46C. In this state, branches can be extended by using the procedure of join step stated in FIGS. 53 and 54 of Embodiment 18. Then, at the lower level of the end node 3 of [2, 3], the item number 4 being more than the end node 3 and having the same parent node 2, is provided. However, at the lower level of the end node 4 of [2, 4], no node is added because the item number being more than the end node 4 and having the same parent node 2 as the node 4, does not exist. According to this method, the number of candidate-itemsets Ck is lessened, which makes the large-itemset Lk generating process speed up.

As stated above, common items except the last item in the large-itemset are collectively read. In this case, it is also acceptable to compare the amount of itemsets collectively read with the allowable memory amount of initial hash-tree and to treat the itemsets collectively read as a special tree if the amount of itemsets is more than the allowable memory amount of initial hash-tree.

At the Ck generating step 1820, with respect to hash-trees composed of itemsets (not special trees), branches can be extended by using the procedure of join step stated in FIG. 53 and 54 of Embodiment 18. With respect to the special tree, the special tree is divided into partial trees to be within the allowable memory amount of initial hash-tree. Then, nodes having numbers more than the original node (end node) number and equal to or less than n are newly generated for the end node in each partial tree and linking is performed between the end node and new nodes.

As stated above, according to the association rule discovering apparatus and method of the present embodiment, the following effects can be obtained.

At the large-itemset file reading step, itemsets having common items in (k−1)-itemset except the last item are simultaneously read and stored in the same hash-tree. Therefore, the number of candidate-itemsets is lessened, which reduces the process time.

When the amount of itemsets having common items except the last item is more than the specific amount, the large-itemset is divided into plural partial hash-trees to be within the specific amount. Consequently, the possibility of paging can be lessened and the process time is reduced.

At the Ck generating step, nodes having item numbers more than the original node (end node) number are newly generated for the end node to extend the hash-tree. Accordingly, it is easy to generate a candidate-itemset Ck even at the partial trees.

Embodiment 23.

Figure 47:
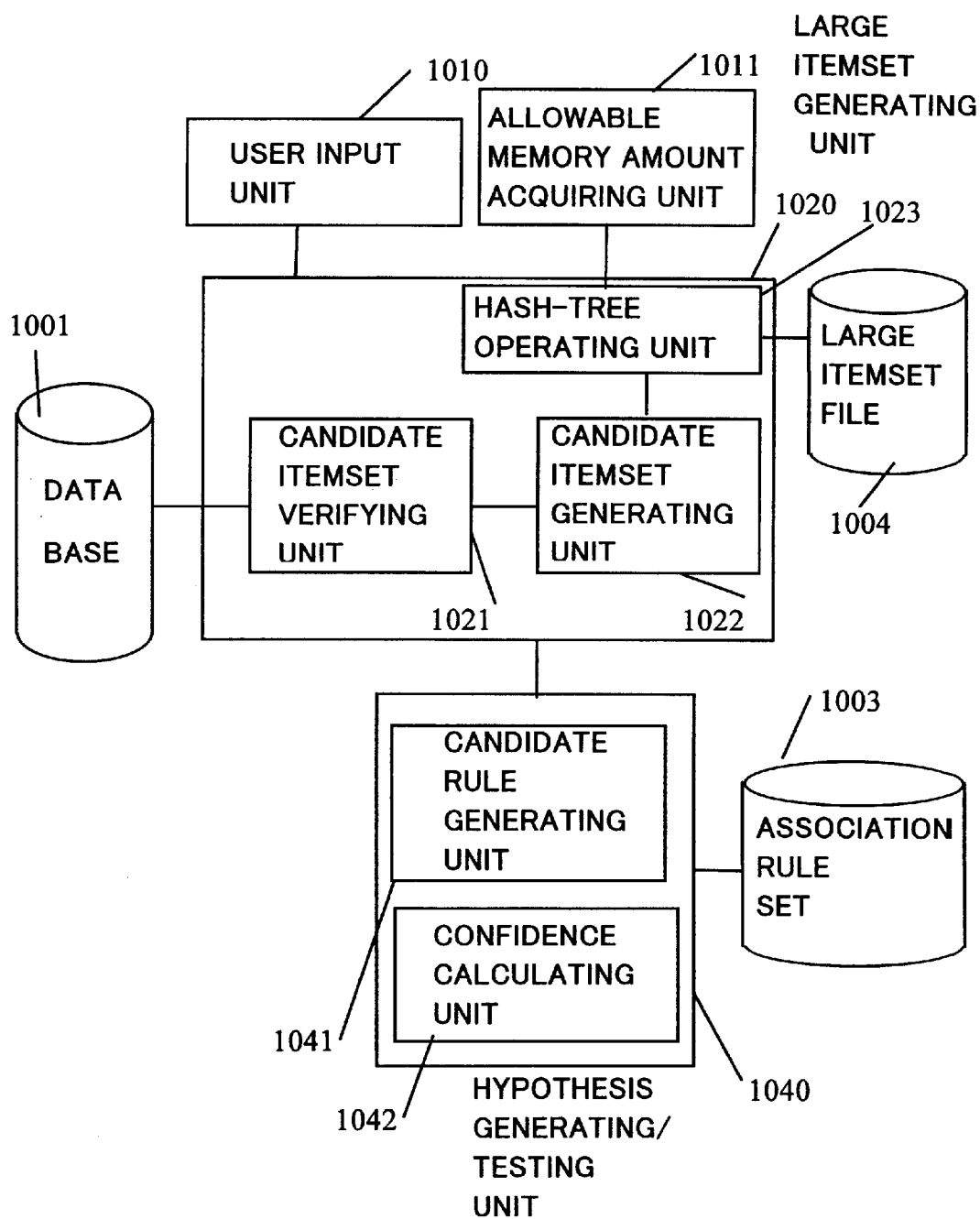
FIG. 47 shows a system of Embodiment 23 according to the present invention.
Figure 48:
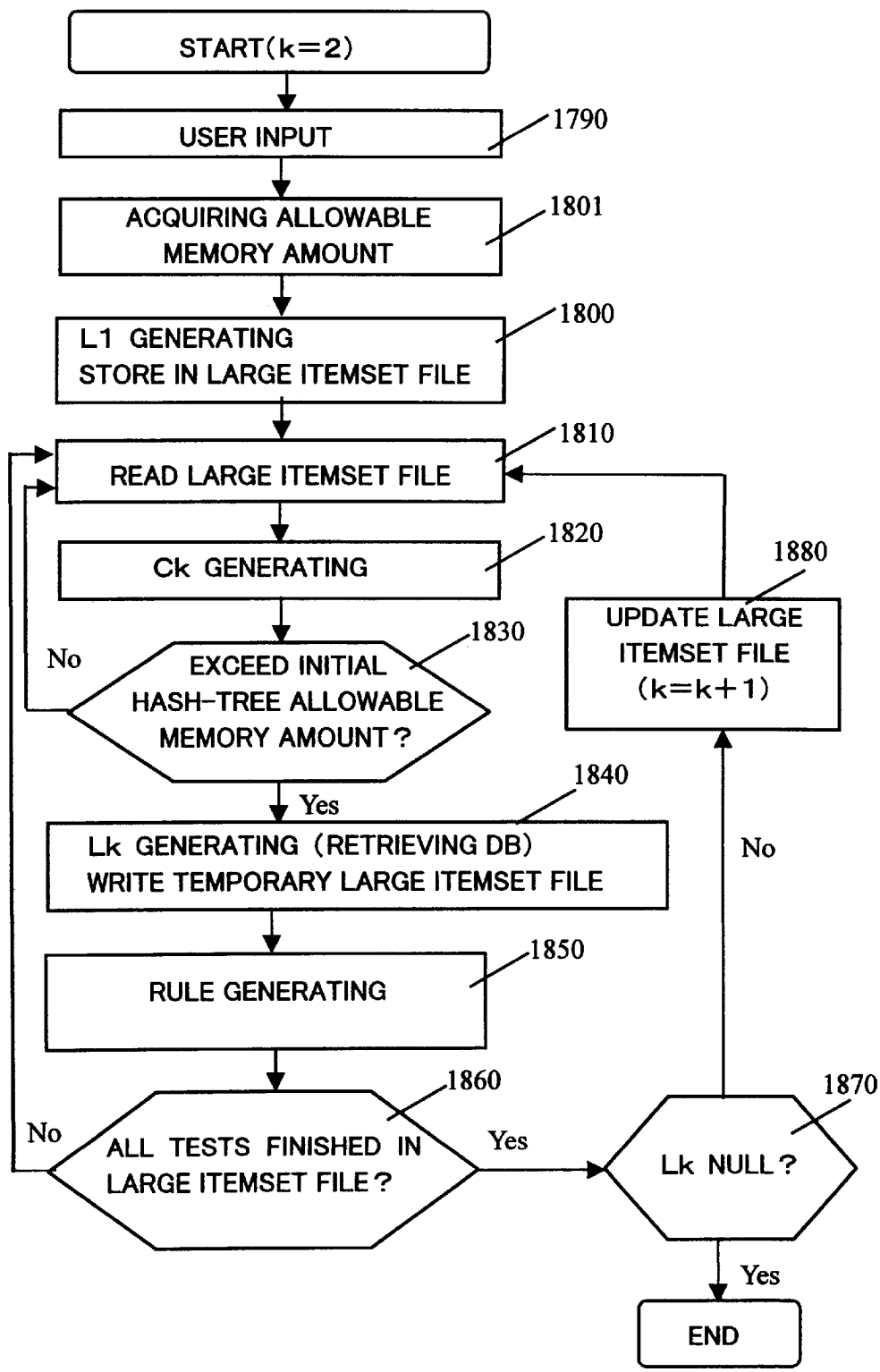
FIG. 48 shows a block diagram of Embodiment 23 according to the present invention.

Referring to FIGS. 47 and 48, an association rule discovering apparatus and method according to Embodiment 23 will now be explained.

FIG. 47 shows a system of the present embodiment. The unit operations in FIG. 47 are the same as those of the identical name units in FIG. 42 of the above stated Embodiment except an allowable memory amount acquiring unit 1011.

In the above embodiments the allowable memory amount of hash-tree has been set in the system in advance. In this Embodiment 23, the allowable memory amount of hash-tree is specified by the user.

Now, the procedure of discovering an association rule according to the present embodiment is explained with reference to the block diagram FIG. 48. The operations of Embodiment 23 shown in FIG. 48 are the same as those of the identical name steps of the above stated Embodiment shown in FIG. 43 except an allowable memory amount acquiring step 1801.

At the allowable memory amount acquiring step 1801, the user specifies an allowable memory amount of hash-tree which is used in dividing into partial trees, extending branches and testing rules. The allowable memory amount of initial hash-tree, used for amount checking after the Ck generating step, is calculated to be a fraction of the allowable memory amount of hash-tree. The user optionally sets and inputs the allowable memory amount of hash-tree, based on a past program history, for instance. Regarding the input method, it is acceptable to input the amount through a dialog box or to specify the amount as a parameter in the case of operating the program through a command line.

It is also acceptable to obtain a memory amount which is empty at the time of the allowable memory amount acquiring step, through the operating system by means of a system call, in order to decide the allowable memory amount of hash-tree. In this case, the allowable memory amount of hash-tree is to be a fraction of the empty memory amount, and the allowable memory amount of initial hash-tree is to be a fraction of the allowable memory amount of hash-tree.

Figure 49:
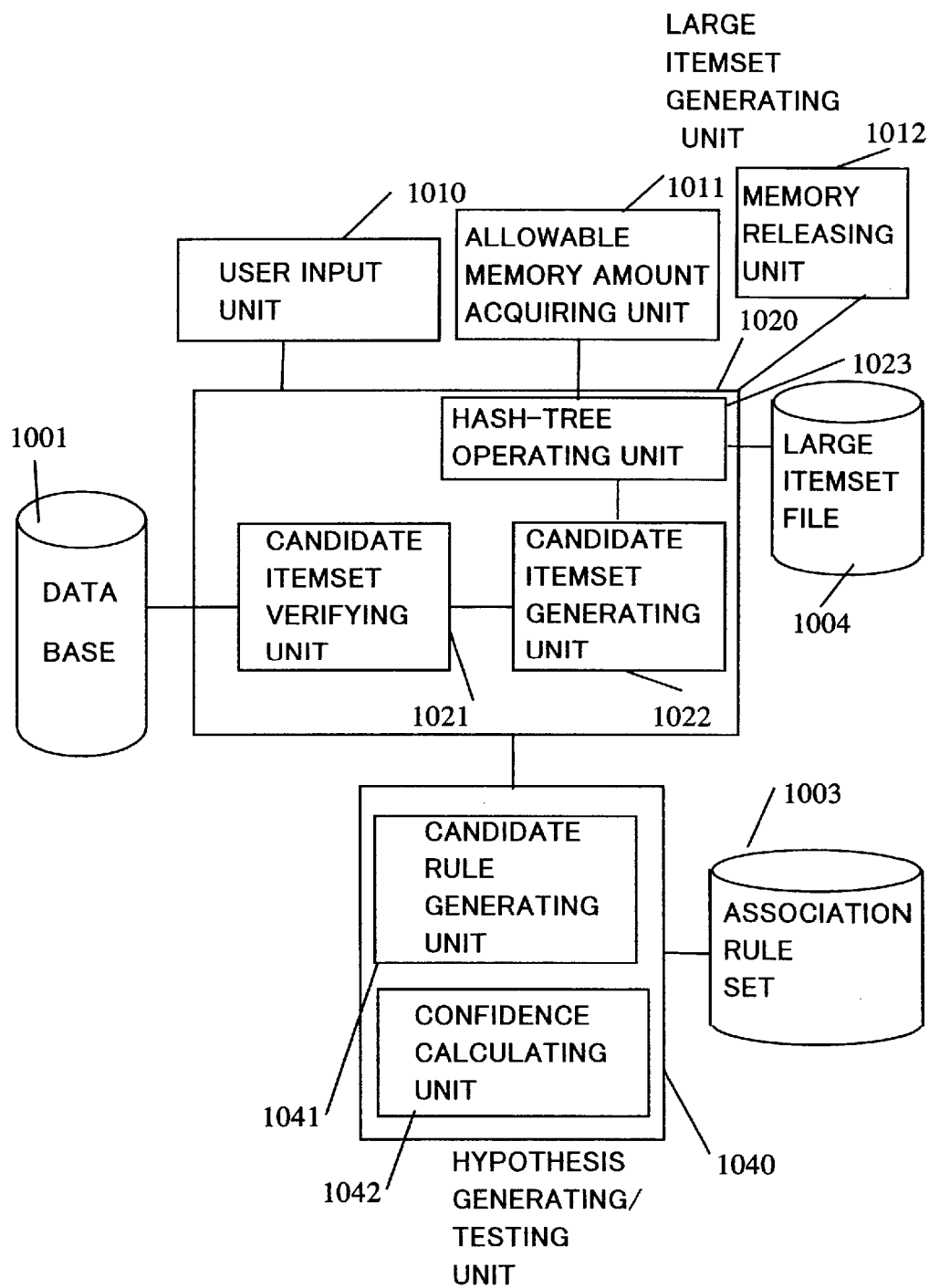
FIG. 49 shows another system of Embodiment 23 according to the present invention.

It is also acceptable to provide a memory releasing unit 1012 for securing the allowable memory amount of hash-tree as shown in FIG. 49. Namely, it is also acceptable to execute a program for generating a process to secure a large amount of memory, releasing the memory, and consequently ending the program, before obtaining the allowable memory amount through the operating system. Then, the memory area which has been occupied by the operating system but not practically used is released. Consequently, the association rule discovering program can secure more allowable memory amount of hash-tree.

As explained above, according to the association rule discovering apparatus and method of the present embodiment, the following effects can be obtained.

Since the allowable memory amount user deciding step is explained in the present embodiment, it is possible to set the memory based on the user experience.

Since the step for acquiring the allowable memory amount through the operating system is explained in the present embodiment, it is possible to secure the certain memory amount.

As the step for executing the program to secure and release a memory area is explained in the present embodiment, it is possible to use the memory amount which has been occupied by the operating system. Therefore, more memory area can be secured for the hash-tree.

Embodiment 24.

Figure 50:
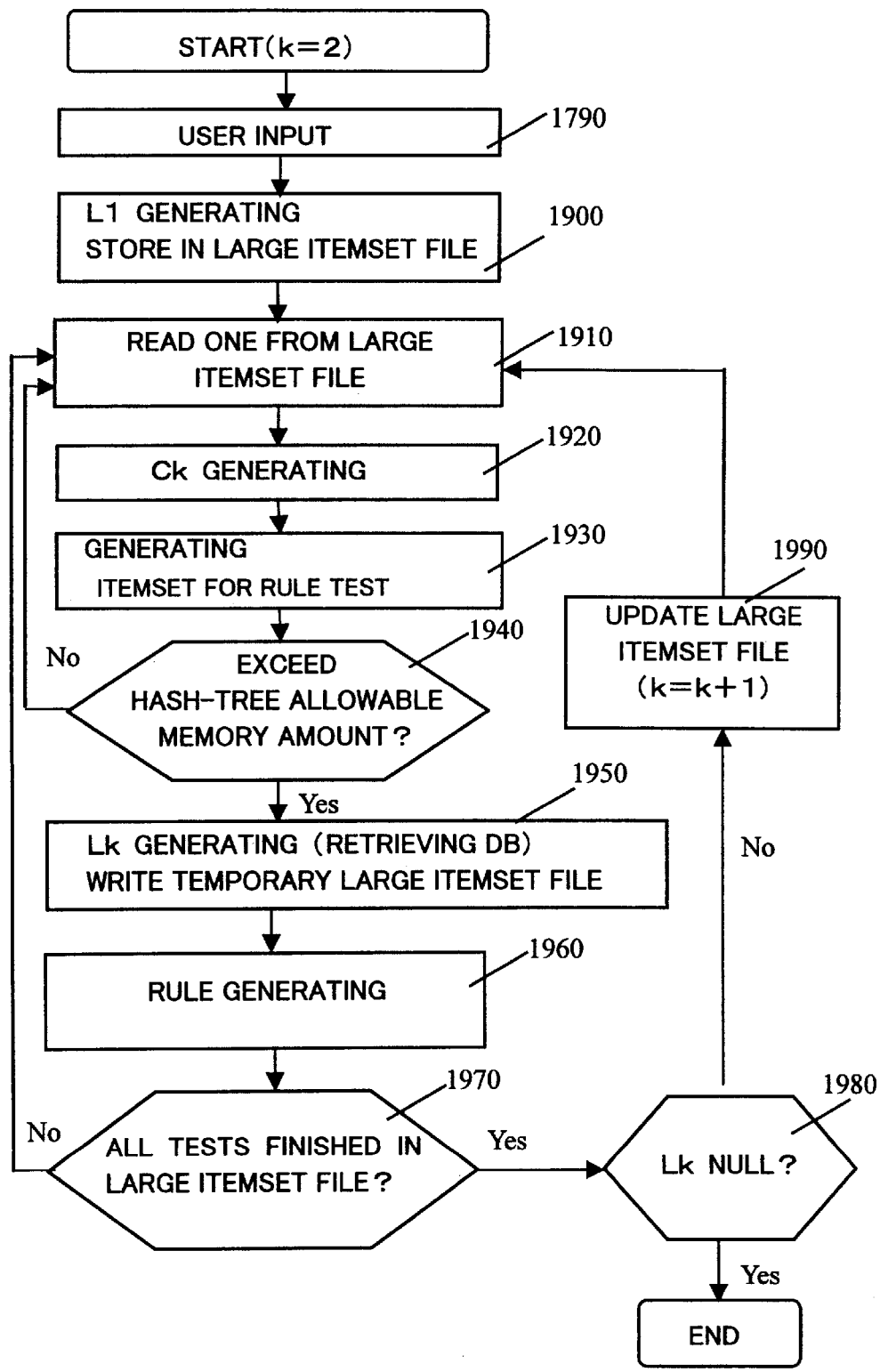
FIG. 50 shows a block diagram of Embodiment 24 according to the present invention.

Referring to FIGS. 42 and 50, an association rule discovering apparatus and method according to Embodiment 24 will now be explained.

FIG. 42 shows a system of the present embodiment and FIG. 50 shows a block diagram of the present embodiment. The unit operations of Embodiment 24 shown in FIG. 42 are the same as those of the identical name units of Embodiment 20 shown in FIG. 42 except that operations of the candidate-itemset verifying unit 1021, the candidate-itemset generating unit 1022 and the hash-tree operating unit 1023 are different in Embodiments 20 and 24.

In Embodiment 20, it is checked whether or not the amount after the Ck generation is more than the allowable memory amount of initial hash-tree, and (k−1)-itemsets are added to the hash-tree in the rule generating step. In this Embodiment 24, (k−1)-itemsets are added to the hash-tree just after the Ck generation, and the amount of the hash-tree is checked to be more than the allowable memory amount of hash-tree or not.

Now, the procedure of discovering an association rule is explained with reference to FIG. 50.

The operation of L1 generating step 1900 of this Embodiment is the same as the L1 generating step 1800 of Embodiment 20 except that the large-itemset file does not have data on each large-itemset frequency in this embodiment.

At a large-itemset file reading step 1910, a large-itemset of k−1 long is read from the read position in the large-itemset file and is added to the hash-tree. Then, the read position in the large-itemset file is forwarded by one large-itemset. When this program is started, the read position is located at the top of the file and the hash-tree initially includes no large-itemset.

At a Ck generating step 1920, with respect to an end node, nodes having numbers more than the end node number and equal to or less than n, are newly generated and linked to the end node.

When there are five items more than the frequency in the case of the large-itemset [1, 3], two nodes 4 and 5 are set at the lower level of the large-itemset [1, 3]. Namely, two candidate-itemsets [1, 3, 4] and [1, 3, 5] are generated.

At an itemset-for-rule-test generating step 1930, some itemsets whose frequencies are necessary for generating a rule based on the itemset added at the previous step, are added. In the case that two candidate-itemsets [1, 3, 4] and [1, 3, 5] have been generated at the previous step, frequencies of five itemsets [1, 3], [3, 4], [1, 4], [1, 5] and [3, 5] are needed for generating rules based on the two candidate-itemsets [1, 3, 4] and [1, 3, 51. Then, if an itemset (or itemsets) in the five itemsets is not included in the hash-tree, the itemset (or the itemsets) is added to the hash-tree. This (or these) itemset is called an auxiliary candidate-item set. After this step, the amount of the hash-tree is checked. If the amount exceeds the allowable memory amount of hash-tree, it goes to an Lk generating step 1950. If the hash-tree amount has not exceeded the allowable memory amount of hash-tree, it goes back to the large-itemset file reading step 1910. This allowable memory amount of hash-tree may be decided based on a fraction (ex. one-tenth) of the computer practical memory amount.

At an Lk generating step 1950 performed by the candidate-itemset verifying unit 1021, frequencies of candidate-itemsets of k−1 long and candidate-itemsets of k long in the hash-tree are calculated by retrieving the database. Then, the generated large-itemset of k long is added to the temporary large-itemset file. The candidate-itemset of k−1 long corresponds to the auxiliary candidate-itemset. The respect different from the Lk generating step in Embodiment 20 is that the frequency of the candidate-item set of k−1 long (that is the auxiliary candidate-itemset of k−1 long) is also calculated, and the data on a frequency of each large-itemset is not included in the temporary large-itemset file.

At a rule generating step 1960, k rules based on each one of large-itemsets having length k in the hash-tree are tested. With respect to the large-itemset [1, 2, 4], for instance, three rules 1, 2→4, 1, 4→2 and 2, 4→1 are tested. As k large-itemsets of k−1 long have been already included in the hash-tree by this time (because the large-itemset of k−1 long were the auxiliary candidate-itemset of k−1 long at just before the step 1950), it is not necessary to read them from the large-itemset file.

When the operations up to the rule generating step have finished, if all the large-itemsets in the large-itemset file have not been read yet, it goes back to the large-itemset file reading step 1910 after canceling the hash-tree. If all the large-itemsets in the large-itemset file have been already read and the number of large-itemsets of k long in the temporary large-itemset file is zero, the program becomes finished. If the number of large-itemsets of k long in the temporary large-itemset file is not zero, one is added to the value k and the temporary large-itemset file is defined to be the large-itemset file by changing the file name. Then, it goes back to the large-itemset file reading step after canceling the hash-tree. This procedure is the same as the identical name one in FIG. 43 of Embodiment 20.

According to the association rule discovering apparatus and method of the present embodiment, as stated above, the itemset-for-rule-test generating step is included after the Ck generating step and before the amount checking step. At the itemset-for-rule-test generating step, an auxiliary candidate-itemset is generated by deleting one item from the candidate-itemset Ck generated at the Ck generating step, and stored in the hash-tree. At the Lk generating step, the frequency of k-itemset in the candidate-itemset Ck and the frequency of the auxiliary candidate-itemset are obtained by matching with the database. Accordingly, the rule discovering speed is enhanced.

Embodiment 25.

In the process of generating a large-itemset according to the present embodiment, a memory for a set of records is secured and records to be included the memory are read from the database or data file. Then, matching process is performed for the read record set.

Figure 59:
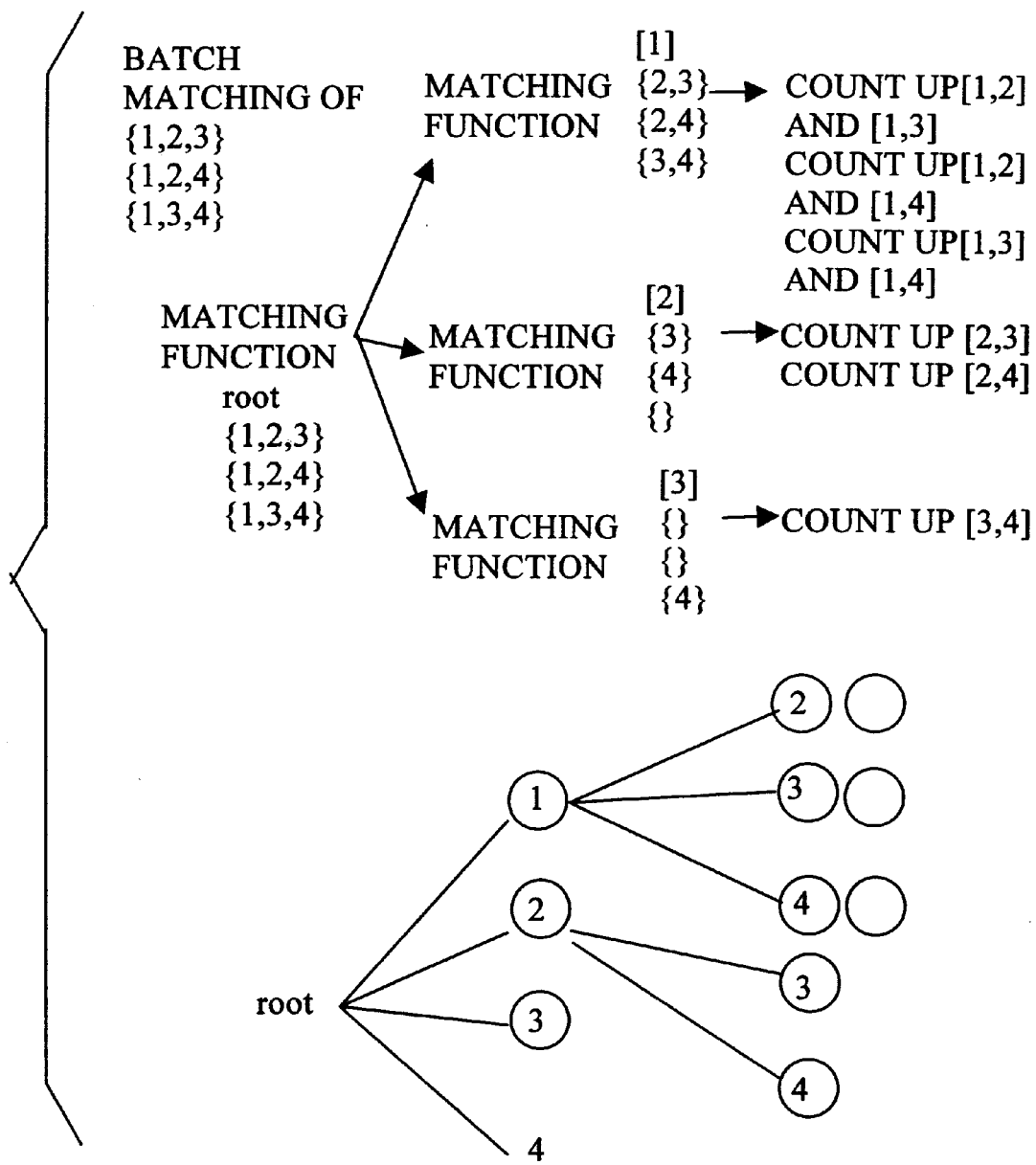
FIG. 59 shows a state applying a matching function used for Embodiment 25 according to the present invention.

The matching function is recursively utilized similar to the related art, however, a hash-tree node and a set of partial sequences (P) are used as parameters of the function. The partial sequence set (P) specifies a partial sequence in each record in the record set. For instance, in the case of reading the record set {1, 2, 3} {1, 2, 4} {1, 3, 4} as shown in FIG. 59 in the memory, the following partial sequence set can be shown as an example: {3} {2,4} {1,3,4} wherein {3} indicates the partial sequence made of the third of the record {1, 2, 3}, {2, 4} indicates the partial sequence made of the second and after the second of the record {1, 2, 4}, and {1, 3, 4} indicates the partial sequence made of the first and after the first of the record {1, 3, 4}. The matching process between the record set and the hash-tree is executed by inputting the root as a node and a partial sequence set made of partial sequences composed of the first and after the first of each record, and utilizing this matching function stated above.

Figure 58:
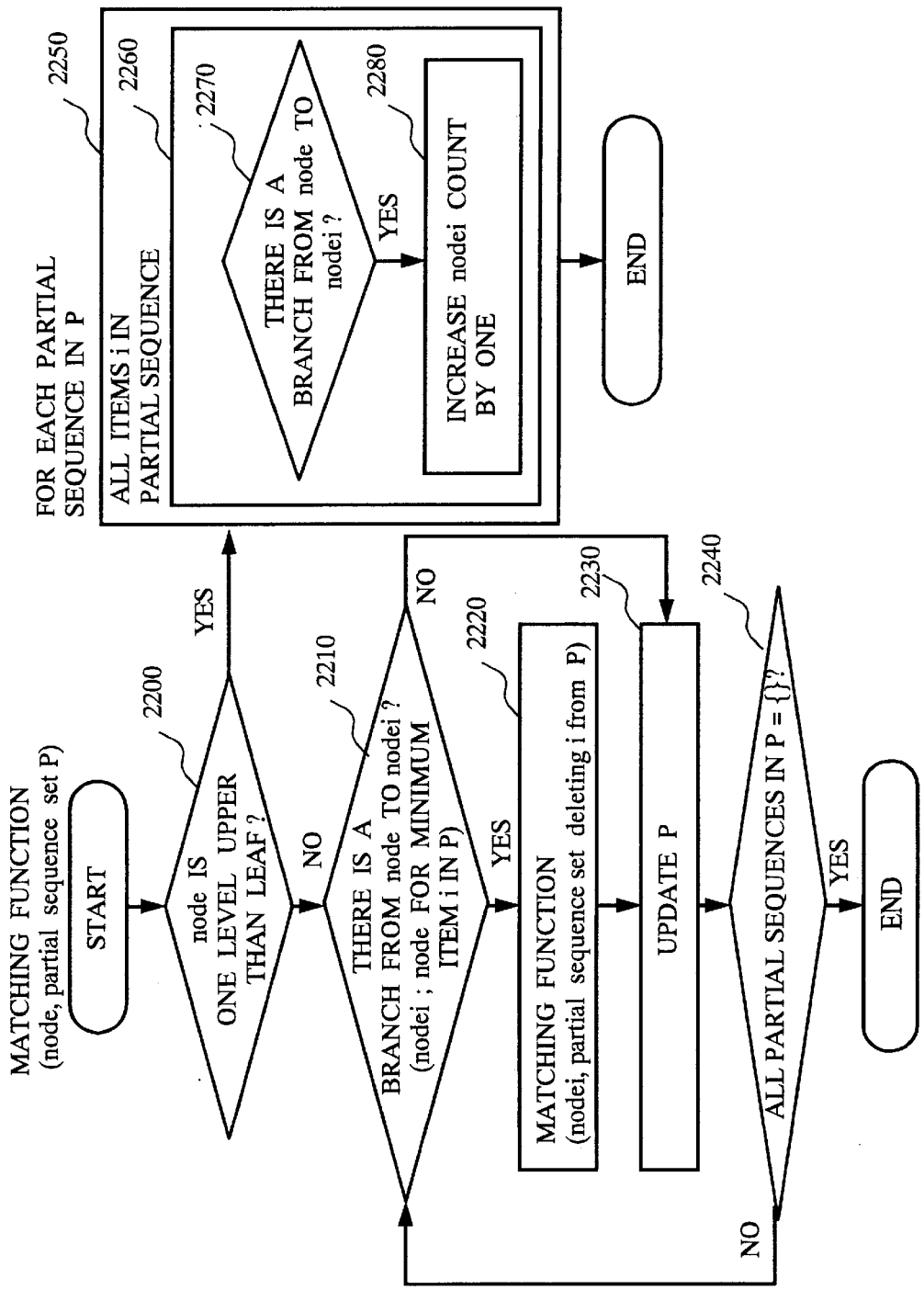
FIG. 58 is a block diagram applying a matching function used for Embodiment 25 according to the present invention.

FIG. 58 is a block diagram of matching function according to the present embodiment. At a step 2200, it is checked whether an input hash-tree node is one level upper than a leaf node or not.

If the input hash-tree node is not one level upper than the leaf node, a step 2210 is performed. At the step 2210, the minimum value (i) of an item in a partial sequence set (P) is obtained. Then, a new partial sequence set is made by using partial sequences, in which if the item of the minimum value (i) is included, the item is deleted from the partial sequence and if the item of the minimum value (i) is not included, a partial sequence { } is used. Further, the minimum value (i) is applied to the hash function in order to examine whether a corresponding node (nodei) exists in the lower level or not.

When the corresponding node (nodei) exists in the lower level at the step 2210, a matching function where the node (nodei) and a new generated partial sequence set are used as parameters is recursively utilized at a step 2220. Then, at a step 2230, the original partial sequence set (P) is updated by deleting the item of minimum value (i) from each of the partial sequences. The process of the steps 2210, 2220, and 2230 is repeatedly performed until it is judged at a step 2240 that all the partial sequences in the partial sequence set (P) have been deleted, meaning no item exists ({ }) in the partial sequence.

When the node input at the step 2200 is one level upper than a leaf node, the process of a step 2260 is performed for each partial sequence in the partial sequence set (P). At the step 2260, the hash function is repeatedly applied to each item (i) in each partial sequence. Then, if the corresponding leaf node (nodei) exists at a step 2270, the frequency of the leaf node is increased by one at a step 2280.

FIG. 59 shows the case that the hash-tree root and a set of partial sequences {1, 2, 3} {1, 2, 4} {1, 3, 4} (the partial means from the first to third in this case) of the record set {1, 2, 3} {1, 2, 4} {1, 3, 4} are used as parameters of the matching function. As the height of the hash-tree is 2, generating a partial sequence set process is performed.

At the step 2210, a partial sequence set {2, 3} {2, 4} {3, 4} is generated by deleting the minimum item 1 from the original partial sequence set. It is judged that the node [1] exists at the lower level of the root. At the step 2220, the matching function where the node[1] and the partial sequence set {2, 3} {2, 4} {3, 4} are used is recursively utilized. At the step 2230, the original partial sequence set is updated to {2, 3} {2, 4} {3, 4}. At the step 2240, as all the partial sequences in the partial sequence set are not { }, it goes back to the step 2210.

Then, again at the 2210, the minimum item in the updated partial sequence set at this time is 2. It is judged that the node [2] exists at the lower level of the root. At the step 2220, the matching function where the node[2] and the partial sequence set {3} {4} { } are used is recursively utilized. At the step 2230, the original partial sequence set is updated to {3} {4} {3, 4}.

In this way the loop is performed, at the step 2220, the matching function where the node[3] and the partial sequence set { } { } {4} are used is recursively utilized. At the step 2230, the original partial sequence set is updated to { } {4} {4}.

When 4 is deleted from the partial sequence set, the partial sequence set becomes { } { } { }. Then, the process loop is finished.

Now, the matching function where the node [1] and the partial sequence set {2, 3} {2, 4} {3, 4} are used will be explained. At the step 2200, this node [1] is judged to be one level upper than a leaf node. At the step 2250, the hash function is applied to each of the items 2, 3, 2, 4, 3, 4, in each partial sequence set. At the step 2280, the frequency of the corresponding node is increased.

The same process is performed for the node [2] and the partial sequence set {3} {4} { }, and the node [3] and the partial sequence set { } { } {4}.

As stated above, according to the association rule discovering apparatus and method of the present embodiment, the matching is performed by using the record set in the database and the hash-tree storing the candidate-itemset Ck, and also the Lk generating step for selecting the large-itemset Lk is included.

Since the hash function can be once applied to common items in the plural records which are collectively treated, the times of the process for recursively utilizing the hash function is lessened, which enables the high speed matching.

Regarding the association rule discovering methods described in Embodiments 1 through 25, it is possible for memory means can be read through the computer, to store a program for treating procedures of the methods.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A method for discovering an association rule existing between itemsets composed of one or more items, from a database storing a plurality of records composed of one or more items, where k is an integer greater than or equal to 2, and n indicates an integer from 1 to k, when an itemset is composed of n items and a frequency, meaning a number of records including the n items, of the itemset has not been checked, the itemset is defined as a candidate-itemset Cn, and when a frequency of the candidate-itemset Cn is greater than or equal to a lower limit value Smin, the candidate-itemset Cn is defined as a large-itemset Ln, the method comprising the steps of:

(a) generating a large-itemset, this step including the steps of:

(a1) generating a large-itemset L1 by counting a frequency meaning a number of records including each item, and defining an itemset composed of items made of the each item having a frequency greater than or equal to than the lower limit value Smin as the large-itemset L1;

(a2) generating a candidate-itemset Ck by using a large-itemset Lk−1 and the large-itemset L1; and (a3) generating a large-itemset Lk by selecting the large-itemset Lk from the candidate-itemset Ck; and (b) generating and testing a hypothesis, this step including the steps of:

(b1) generating a candidate association rule by using the large-itemset Lk−1 and the large-itemset L1, where the large-itemset Lk−1 is defined as a condition itemset called a left hand side (LHS) and the large-itemset L1 is defined as a conclusion itemset called a right hand side (RHS); and (b2) testing whether or not the candidate association rule is to be applied as the association rule; and (c) inputting at least a significance level used for a chi-square test, and the step of testing the rule includes processes of calculating $x^2$ statistics (chi-squared statistics) based on a frequency of LHS, a frequency of RHS, a frequency of BS (both right and left hand sides) and a total number of records, and performing the chi-square test in which the $x^2$ statistics and the significance level are used as parameters.

2. The method for discovering an association rule of claim 1, wherein the step of generating and testing the hypothesis includes the step of discriminating the association rule to be one of a positive association rule and a negative association rule.

3. The method for discovering an association rule of claim 1, wherein the step of generating the large-itemset includes the step of deciding a limit frequency for calculating the lower limit value Smin based on a frequency of each item.

4. The method of discovering an association rule of claim 1, wherein the step of generating the large-itemset includes the step of deciding a minimum frequency by defining a smallest frequency in frequencies calculated for the each item, as the lower limit value of Smin.

5. The method for discovering an association rule of claim 1, wherein the step of generating and testing the hypothesis further includes the step of deciding a boundary for calculating a frequency limit value of the large-itemset L1 used in the step of generating the candidate association rule, by using a frequency of the large-itemset Lk−1, being a pair to the large-itemset L1 and used in the step of generating the candidate association rule, and wherein the step of testing the rule includes the process of performing the chi-square test only for a candidate association rule generated based on the large-itemset L1 having a frequency within the boundary and the large-itemset Lk−1 being a pair to the large-itemset L1.

6. The method for discovering an association rule of claim 1, said method further comprising inputting a parameter necessary for obtaining the association rule;

wherein the step of inputting includes the process of user's inputting at least a condition regarding an item in one of the LHS and RHS.

7. The method for discovering an association rule of claim 1, said method further comprising inputting a parameter necessary for obtaining the association rule;

wherein the step of inputting includes the process of inputting at least an item, as the condition, at least one of which is necessarily included in the LHS of the association rule, and inputting at least an item, as the condition, at least one of which is included in the RHS of the association rule.

8. The method of discovering an association rule of claim 1, said method further comprising inputting a parameter necessary for obtaining the association rule;

wherein the step of inputting includes the process of inputting at least an item, as the condition, all of which are necessarily included in the LHS of the association rule, and inputting at least an item, as the condition, all of which are necessarily included in the RHS of the association rule.

9. The method for discovering an association rule of claim 1, said method further comprising inputting a parameter necessary for obtaining the association rule;

wherein the step of inputting includes the process of inputting at least a specific item in the plurality of records in the database in order to specify a domain which is a set of records including the specific item, and the step of generating the large-itemset includes the step of restricting the domain in order to select only the records included in a specified domain, and in order to use a total number of the records included in the specified domain hereinafter instead of a total number of the plurality of records in the database.

10. An apparatus for generating an association rule existing between itemsets composed of one or more items, from a database storing a plurality of records composed of one or more items, where k is an integer greater than or equal to 2, and n indicates an integer from 1 to k, when an itemset is composed of n items and a frequency, meaning a number of records including the n items, of the itemset has not been checked, the itemset is defined as a candidate-itemset Cn, and when a frequency of the candidate-itemset Cn is greater than or equal to a lower limit value Smin, the candidate-itemset Cn is defined as a large-itemset Ln, the apparatus comprising:
  a memory; and
  a processor coupled to the memory, the processor configured to:
    (a) generate a large-itemset, the processor further configured to:
      (a1) generate a large-itemset L1 by counting a frequency meaning a number of records including each item, and defining an itemset composed of items made of the each item having a frequency greater than or equal to the lower limit value Smin as the large-itemset L1;
      (a2) generate a candidate-itemset Ck by using a large-itemset Lk−1 and the large-itemset L1; and
      (a3) generate a large-itemset Lk by selecting the large-itemset Lk from the candidate-itemset Ck; and
    (b) generate and test a hypothesis, the processor further configured to:
      (b1) generate a candidate association rule by using the large-itemset Lk−1 and the large-itemset L1, where the large-itemset Lk−1 is defined as a condition itemset called a left hand side (LHS) and the large-itemset L1 is defined as a conclusion itemset called a right hand side (RHS); and
      (b2) test a rule for testing whether or not the candidate association rule is to be one of applied and not-applied as the association rule; and
    (c) input at least a significance level used for a chi-square test,
  wherein the processor in testing the rule is further configured to calculate chi-squared statistics based on a frequency of LHS, a frequency of RHS, a frequency of both RHS and LHS, and a total number of records, and performing the chi-square test in which the chi-squared statistics and the significance level are used as parameters.

11. The apparatus for discovering an association rule according to claim 10, wherein the processor in generating and testing the hypothesis is further configured to discriminate the association rule to be one of a positive association rule and a negative association rule.

12. The apparatus for discovering an association rule according to claim 10, wherein the processor in generating the large-itemset is further configured to decide a limit frequency for calculating the lower limit value Smin based on a frequency of each item.

13. The apparatus for discovering an association rule according to claim 10, wherein the processor in generating the large-itemset is further configured to decide a minimum frequency by defining a smallest frequency in frequencies calculated for the each item, as the lower limit value of Smin.

14. The apparatus for discovering an association rule according to claim 10, wherein the processor in inputting at least a significance level is further configured to input at least a condition regarding an item in one of the LHS and RHS.

15. The apparatus for discovering an association rule according to claim 10, wherein the processor in generating and testing the hypothesis is further configured to decide a boundary for calculating a frequency limit value of the large-itemset L1 used in generating the candidate association rule, by using a frequency of the large-itemset Lk−1, being a pair to the large-itemset L1 and used in the step of generating the candidate association rule, and wherein the processor in testing the rule is further configured to perform the chi-square test only for a candidate association rule generated based on the large-itemset L1 having a frequency within the boundary and the large-itemset Lk−1 being a pair to the large-itemset L1.

16. The apparatus for discovering an association rule according to claim 10, wherein the processor in inputting at least a significance level is further configured to input at least an item, as the condition, at least one of which is necessarily included in the LHS of the association rule, and input at least an item, as the condition, at least one of which is included in the RHS of the association rule.

17. The apparatus for discovering an association rule according to claim 10, wherein the processor in inputting at least a significance level is further configured to input at least an item, as the condition, all of which are necessarily included in the LHS of the association rule, and input at least an item, as the condition, all of which are necessarily included in the RHS of the association rule.

18. The apparatus for discovering an association rule according to claim 10, wherein the processor in inputting at least a significance level is further configured to input at least a specific item in the plurality of records in the database in order to specify a domain which is a set of records including the specific item, and in generating the large-itemset is further configured to restrict the domain in order to select only the records included in a specified domain, and in order to use a total number of the records included in the specified domain hereinafter instead of a total number of the plurality of records in the database.

* * * * *